(12) United States Patent
Noh et al.

(10) Patent No.: US 12,232,163 B2
(45) Date of Patent: Feb. 18, 2025

(54) METHOD AND APPARATUS FOR INTERFERENCE MANAGEMENT IN COMMUNICATION SYSTEM

(71) Applicant: ELECTRONICS AND TELECOMMUNICATIONS RESEARCH INSTITUTE, Daejeon (KR)

(72) Inventors: Hoon Dong Noh, Daejeon (KR); Moon Sik Lee, Daejeon (KR); Jae Woo Park, Daejeon (KR); Jae Seung Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 349 days.

(21) Appl. No.: 17/882,001

(22) Filed: Aug. 5, 2022

(65) Prior Publication Data
US 2023/0057259 A1 Feb. 23, 2023

(30) Foreign Application Priority Data

Aug. 5, 2021 (KR) .................. 10-2021-0103389
Aug. 5, 2022 (KR) .................. 10-2022-0097786

(51) Int. Cl.
*H04B 17/336* (2015.01)
*H04J 11/00* (2006.01)
(Continued)

(52) U.S. Cl.
CPC .......... *H04W 72/56* (2023.01); *H04B 17/336* (2015.01); *H04J 11/0056* (2013.01);
(Continued)

(58) Field of Classification Search
CPC ...... H04B 17/0082–409; H04J 11/0023–0066; H04L 5/0001–26; H04W 8/22–245; H04W 24/02–10; H04W 28/02–26; H04W 36/0005–385; H04W 48/02–20; H04W 52/36–367;
(Continued)

(56) References Cited

U.S. PATENT DOCUMENTS 8,811,198 B2    8/2014 Bhushan et al.
8,825,046 B2    9/2014 Borran et al.
(Continued)

FOREIGN PATENT DOCUMENTS

WO    2020/145867 A1    7/2020

*Primary Examiner* — Timothy J Weidner
(74) *Attorney, Agent, or Firm* — Rabin & Berdo, P.C.

(57) ABSTRACT

An operation method of a first device may comprise: receiving, from a second device, first configuration information signaled for CLI-related procedures; receiving, from the second device, second configuration information signaled for operating a multiplexing operation of the first device; in response to recognizing, with respect to a first resource, a collision between first DL-UL configuration information indicated by the first configuration information and second DL-UL configuration information indicated by the second configuration information, comparing priorities of the first DL-UL configuration information and the second DL-UL configuration information; and determining a DL-UL configuration applied to the first resource based on the compared priorities.

18 Claims, 22 Drawing Sheets

(51) Int. Cl.
| | |
|---|---|
| *H04L 5/00* | (2006.01) |
| *H04W 24/10* | (2009.01) |
| *H04W 28/02* | (2009.01) |
| *H04W 72/0446* | (2023.01) |
| *H04W 72/27* | (2023.01) |
| *H04W 72/50* | (2023.01) |
| *H04W 72/56* | (2023.01) |
| *H04W 74/08* | (2024.01) |
| *H04W 74/0833* | (2024.01) |
| *H04W 84/02* | (2009.01) |
| *H04W 88/08* | (2009.01) |
| *H04W 88/12* | (2009.01) |
| *H04W 92/02* | (2009.01) |
| *H04W 92/12* | (2009.01) |
| *H04W 92/20* | (2009.01) |

(52) U.S. Cl.
CPC ........... *H04L 5/0073* (2013.01); *H04W 24/10* (2013.01); *H04W 28/0247* (2013.01); *H04W 72/0446* (2013.01); *H04W 72/27* (2023.01); *H04W 72/535* (2023.01); *H04W 74/0841* (2013.01); *H04W 74/0875* (2013.01); *H04W 84/02* (2013.01); *H04W 88/085* (2013.01); *H04W 88/12* (2013.01); *H04W 92/02* (2013.01); *H04W 92/12* (2013.01); *H04W 92/20* (2013.01)

(58) Field of Classification Search
CPC ......... H04W 72/02–569; H04W 74/002–0891; H04W 84/005–22; H04W 88/005–188; H04W 92/02–24

See application file for complete search history.

(56) References Cited

U.S. PATENT DOCUMENTS

| | | |
|---|---|---|
| 9,385,801 B2 | 7/2016 | Chung et al. |
| 2018/0198539 A1 | 7/2018 | Kim et al. |
| 2019/0150213 A1 | 5/2019 | Kim |
| 2020/0314817 A1 | 10/2020 | Sun et al. |
| 2021/0127453 A1 | 4/2021 | You et al. |
| 2021/0153189 A1 | 5/2021 | Jo et al. |
| 2022/0279532 A1* | 9/2022 | Barac .................... H04W 72/27 |
| 2023/0070642 A1* | 3/2023 | Ma ........................ H04W 72/23 |

* cited by examiner

FIG. 10

| CORESET pool ID | serving cell ID | | | | | | BWP ID | | Oct 1 |
|---|---|---|---|---|---|---|---|---|---|
| $T_7$ | $T_6$ | $T_5$ | $T_4$ | $T_3$ | $T_2$ | $T_1$ | $T_0$ | | Oct 2 |
| $T_{15}$ | $T_{14}$ | $T_{13}$ | $T_{12}$ | $T_{11}$ | $T_{10}$ | $T_9$ | $T_8$ | | Oct 3 |
| $T_{(N-2)\times8+7}$ | $T_{(N-2)\times8+6}$ | $T_{(N-2)\times8+5}$ | $T_{(N-2)\times8+4}$ | $T_{(N-2)\times8+3}$ | $T_{(N-2)\times8+2}$ | $T_{(N-2)\times8+1}$ | $T_{(N-2)\times8}$ | | Oct N | user plane protocol stack control plane protocol stack user plane protocol stack for CA user plane protocol stack for DC

METHOD AND APPARATUS FOR INTERFERENCE MANAGEMENT IN COMMUNICATION SYSTEM

CROSS-REFERENCE TO RELATED APPLICATIONS

This application claims priority to Korean Patent Applications No. 10-2021-0103389 filed on Aug. 5, 2021 and No. 10-2022-0097786 filed on Aug. 5, 2022 with the Korean Intellectual Property Office (KIPO), the entire contents of which are hereby incorporated by reference.

BACKGROUND

1. Technical Field

The present disclosure relates to a technique for interference management in a communication system, and more particularly, to a technique for efficient interference management in a multiplexing mode for coverage extension and communication capacity increasement in a wireless communication system.

2. Related Art

With the development of information and communication technology, various wireless communication technologies are being developed. Representative wireless communication technologies include long-term evolution (LTE) and new radio (NR) defined as the $3^{rd}$ generation partnership project (3GPP) standards. The LTE may be one of the $4^{th}$ generation (4G) wireless communication technologies, and the NR may be one of the $5^{th}$ generation (5G) wireless communication technologies.

In the communication technologies for the 5G or later generation, a higher data rate, larger communication capacity, lower latency, wider coverage, and the like may be required than in the communication technologies of the previous generations. In order to achieve such the requirements, an integrated access and backhaul (IAB) network technology is being studied. An IAB node constituting the IAB network may be composed of two elements: a distributed unit (i.e., IAB-DU) and a mobile terminal (i.e., IAB-MT). In addition, an IAB node may configure a dual connectivity (DC) with a parent node or a child node.

In an exemplary embodiment of the communication system, an IAB-DU and an IAB-MT within one IAB node may perform simultaneous transmission and reception based on a predetermined multiplexing mode (e.g., non-TDM mode, simultaneous DU/MT operation mode, etc.). When the IAB node supports the simultaneous DU/MT operation mode, transmission/reception of the IAB-DU and transmission/reception of the IAB-MT may generate cross link interference (CLI). In order to improve communication quality, the IAB node may need to measure the generated CLI and report it to an upper node.

In an exemplary embodiment of the communication system, a scheme in which a communication node measures and reports CLI occurring in a dynamic time division duplexing (TDD) environment may be used. However, the CLI measurement and reporting scheme assuming the dynamic TDD environment as described above may not be suitable to be applied to a communication node (e.g., IAB node) that further supports various multiplexing modes other than the dynamic TDD. Accordingly, a technique capable of improving interference control performance through CLI measurement and reporting suitable for the communication node that further supports multiplexing modes other than dynamic TDD may be required.

Matters described as the prior arts are prepared to promote understanding of the background of the present disclosure, and may include matters that are not already known to those of ordinary skill in the technology domain to which exemplary embodiments of the present disclosure belong.

SUMMARY

In order to solve the above-identified problems, exemplary embodiments of the present disclosure are directed to providing a method and an apparatus for improving interference management performance through efficient CLI measurement and reporting in a communication node supporting a multiplexing mode.

An operation method of a first device, according to an exemplary embodiment of the present disclosure for achieving the above-described objective, may comprise: receiving, from a second device, first configuration information signaled for CLI-related procedures; receiving, from the second device, second configuration information signaled for operating a multiplexing operation of the first device; in response to recognizing, with respect to a first resource, a collision between first downlink (DL)-uplink (UL) configuration information indicated by the first configuration information and second DL-UL configuration information indicated by the second configuration information, comparing priorities of the first DL-UL configuration information and the second DL-UL configuration information; and determining a DL-UL configuration applied to the first resource based on the compared priorities.

The comparing of the priorities may comprise determining that the priority of the second DL-UL configuration information is higher than the priority of the first DL-UL configuration information, wherein the DL-UL configuration applied to the first resource is determined based on the second DU-UL configuration information.

The determining of the DL-UL configuration applied to the first resource may comprise changing interpretation of the first DL-UL configuration information based on the second DL-UL configuration information.

The determining of the DL-UL configuration applied to the first resource may comprise, when the second DL-UL configuration information indicates an uplink-flexible-downlink (UFD) pattern for the first resource, changing the interpretation of the first DL-UL configuration information to indicate that UL symbol(s) are positioned in a staring part of the first resource and DL symbol(s) are positioned in an ending part of the first resource.

The comparing of the priorities may comprise determining that the priority of the first DL-UL configuration information is higher than the priority of the second DL-UL configuration information.

The first configuration information may be intended DL-UL configuration information, and the second configuration information may be gNodeB (gNB)-distributed unit (DU) cell resource configuration information.

An operation method of a first device, according to an exemplary embodiment of the present disclosure for achieving the above-described objective, may comprise: receiving, from a second device, first configuration information signaled for CLI-related procedures; receiving, from the second device, second configuration information signaled for operating a multiplexing operation of the first device; in response to recognizing, with respect to a first resource, a collision between first downlink (DL)-uplink (UL) configuration information indicated by the first configuration information and first 'hard, soft, not-available (HSNA)' configuration information indicated by the second configuration information, comparing priorities of the first DL-UL configuration information and the first HSNA configuration information; and performing configuration for the first resource based on the compared priorities.

The comparing of the priorities may comprise determining that the priority of the first HSNA configuration information is higher than the priority of the first DL-UL configuration information, wherein the configuration for the first resource is performed at least based on the first HSNA configuration information.

The performing of the configuration for the first resource may comprise, when the first resource is configured as a hard resource based on the first HSNA configuration information, determining to perform the CLI-related procedures based on the first resource.

The performing of the configuration for the first resource may comprise, when the first resource is configured as a soft resource or a not-available resource based on the first HSNA configuration information, determining not to perform the CLI-related procedures based on the first resource.

The performing of the configuration for the first resource may comprise: when the first resource is configured as a soft resource based on the first HSNA configuration information, identifying whether an availability indicator (AI) for allowing use of the first resource is received; and in response to identifying that the AI for allowing use of the first resource is received, determining to perform the CLI-related procedures based on the first resource.

The comparing of the priorities may comprise determining that the priority of the first DL-UL configuration information is higher than the priority of the first HSNA configuration information.

The performing of the configuration for the first resource may comprise, when the first resource is configured as a UL resource based on the first DL-UL configuration information, determining that the first resource is a hard resource regardless of the first HSNA configuration information.

A first device, according to an exemplary embodiment of the present disclosure for achieving the above-described objective, may comprise: a processor; a memory electronically communicating with the processor; and instructions stored in the memory, wherein when executed by the processor, the instructions cause the first device to: receive, from a second device, first configuration information signaled for CLI-related procedures; receive, from the second device, second configuration information signaled for operating a multiplexing operation of the first device; in response to recognizing, with respect to a first resource, a collision between first downlink (DL)-uplink (UL) configuration information indicated by the first configuration information and second DL-UL configuration information indicated by the second configuration information, compare priorities of the first DL-UL configuration information and the second DL-UL configuration information; and determine a DL-UL configuration applied to the first resource based on the compared priorities.

In the comparing of the priorities, the instructions may further cause the first device to determine that the priority of the second DL-UL configuration information is higher than the priority of the first DL-UL configuration information, wherein the DL-UL configuration applied to the first resource is determined based on the second DU-UL configuration information.

In the determining of the DL-UL configuration applied to the first resource, the instructions may further cause the first device to change interpretation of the first DL-UL configuration information based on the second DL-UL configuration information.

In the determining of the DL-UL configuration applied to the first resource, the instructions may further cause the first device to, when the second DL-UL configuration information indicates an uplink-flexible-downlink (UFD) pattern for the first resource, change the interpretation of the first DL-UL configuration information to indicate that UL symbol(s) are positioned in a staring part of the first resource and DL symbol(s) are positioned in an ending part of the first resource.

In the comparing of the priorities, the instructions may further cause the first device to determine that the priority of the first DL-UL configuration information is higher than the priority of the second DL-UL configuration information.

According to the exemplary embodiments of the interference management method and apparatus in the communication system, when a collision occurs between configurations indicated by intended TDD DL-UL configuration information signaled for CLI mitigation and gNB-DU cell resource configuration information signaled for IAB operations, a communication node operating in a simultaneous DU/MT operation mode may apply a predetermined priority or change an interpretation scheme for some of the configurations. Accordingly, the collision between the signaling for CLI mitigation and the signaling for IAB operations can be efficiently resolved without a separate signaling burden, and interference management performance based on CLI measurement and/or reporting can be improved.

BRIEF DESCRIPTION OF DRAWINGS

FIG. 10 is a conceptual diagram illustrating an exemplary embodiment of a TCI state activation/deactivation MAC CE in a communication system.

DETAILED DESCRIPTION OF THE EMBODIMENTS

Figure 1:
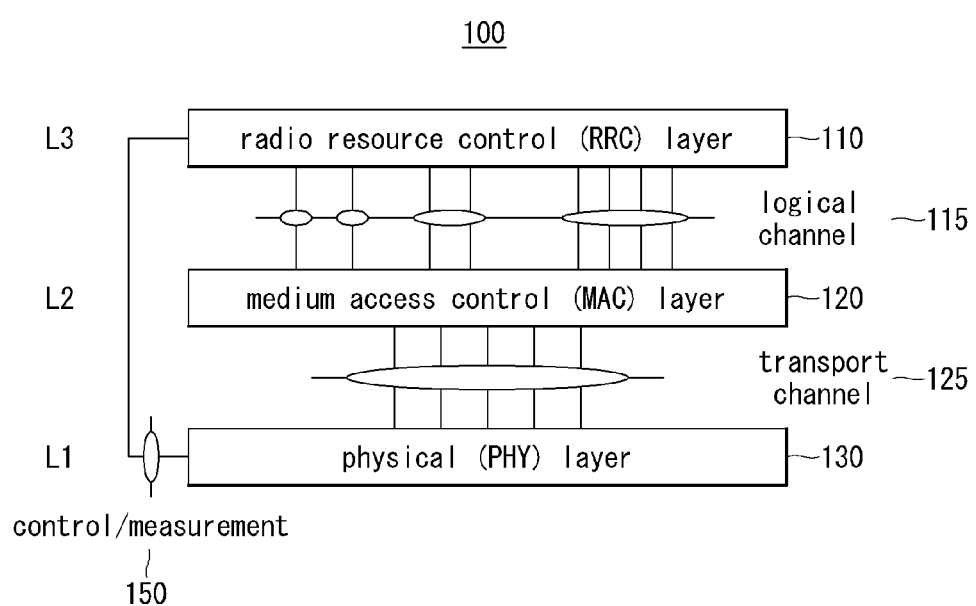
FIG. 1 is a conceptual diagram illustrating an exemplary embodiment of a radio interface protocol structure in a communication system.

Exemplary embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

In exemplary embodiments of the present disclosure, "at least one of A and B" may refer to "at least one A or B" or "at least one of one or more combinations of A and B". In addition, "one or more of A and B" may refer to "one or more of A or B" or "one or more of one or more combinations of A and B".

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. Here, the communication system may have the same meaning as a communication network.

Throughout the present disclosure, a network may include, for example, a wireless Internet such as wireless fidelity (WiFi), mobile Internet such as a wireless broadband Internet (WiBro) or a world interoperability for microwave access (WiMax), 2G mobile communication network such as a global system for mobile communication (GSM) or a code division multiple access (CDMA), 3G mobile communication network such as a wideband code division multiple access (WCDMA) or a CDMA2000, 3.5G mobile communication network such as a high speed downlink packet access (HSDPA) or a high speed uplink packet access (HSUPA), 4G mobile communication network such as a long term evolution (LTE) network or an LTE-Advanced network, 5G mobile communication network, beyond 5G (B5G) mobile communication network (e.g., 6G mobile communication network), or the like.

Throughout the present disclosure, a terminal may refer to a mobile station, mobile terminal, subscriber station, portable subscriber station, user equipment, access terminal, or the like, and may include all or a part of functions of the terminal, mobile station, mobile terminal, subscriber station, mobile subscriber station, user equipment, access terminal, or the like.

Here, a desktop computer, laptop computer, tablet PC, wireless phone, mobile phone, smart phone, smart watch, smart glass, e-book reader, portable multimedia player (PMP), portable game console, navigation device, digital camera, digital multimedia broadcasting (DMB) player, digital audio recorder, digital audio player, digital picture recorder, digital picture player, digital video recorder, digital video player, or the like having communication capability may be used as the terminal.

Throughout the present specification, the base station may refer to an access point, radio access station, node B (NB), evolved node B (eNB), base transceiver station, mobile multihop relay (MMR)-BS, or the like, and may include all or part of functions of the base station, access point, radio access station, NB, eNB, base transceiver station, MMR-BS, or the like.

Hereinafter, preferred exemplary embodiments of the present disclosure will be described in more detail with reference to the accompanying drawings. In describing the present disclosure, in order to facilitate an overall understanding, the same reference numerals are used for the same elements in the drawings, and duplicate descriptions for the same elements are omitted.

FIG. 1 is a conceptual diagram illustrating an exemplary embodiment of a radio interface protocol structure in a communication system.

Referring to FIG. 1, an exemplary embodiment of a radio interface protocol structure 100 of a communication system may be configured to include a radio resource control (RRC) layer 110, a medium access control (MAC) layer 120, a physical (PHY) layer 130, and the like. An exemplary embodiment of the radio interface protocol structure 100 shown in FIG. 1 may correspond to various exemplary embodiments of interfaces such as an interface between a terminal and a base station, an interface between an IAB-node distributed unit (IAB-DU) and an IAB-node mobile terminal (IAB-MT) of an integrated access backhaul (IAB) network, an interface between an IAB-DU and a lower node, an interface between an IAB-MT and an upper node, an interface between a plurality of terminals, and the like.

In the vicinity of the PHY layer 130, the RRC layer 110, and the MAC layer 120, and the like may be disposed above the PHY layer 130. For example, the MAC layer 120 may be disposed above the PHY layer 130. The RRC layer 110 may be disposed above the MAC layer 120.

The MAC layer 120 may be connected to a higher layer (e.g., RRC layer 110) through logical channels 115. The PHY layer 130 may be connected to the higher MAC layer 120 through transport channels 125. The PHY layer 130 may transmit and receive control information or measurement information 150 to and from the RRC layer 110.

The PHY layer 130 may be referred to as a 'layer 1' or 'L1'. The MAC layer 120 may be referred to as a 'layer 2' or 'L2'. The RRC layer 110 may be referred to as a 'layer 3' or 'L3'. The RRC layer 110 and the MAC layer 120 may be collectively referred to as the 'higher layer'.

In the present disclosure, 'L1 signaling' refers to signaling such as downlink control information (DCI) transmitted on a physical downlink control channel (PDCCH), uplink control information (UCI) transmitted on a physical uplink control channel (PUCCH), and sidelink control information (SCI) transmitted on a physical sidelink control channel (PSCCH), which are channels of the PHY layer 130. Similarly, in the present disclosure, 'higher layer signaling' may include L2 signaling transmitted through a MAC control element (CE), L3 signaling transmitted through RRC signaling, and the like. Although omitted in FIG. 1 for convenience of description, information that can be included in an interface between base stations, or an interface (e.g., F1, next generation (NG) interfaces, etc.) between base station components such as a distributed unit (DU) and a central unit (CU) may also be collectively referred to as higher layer signaling as well as the L2 signaling or L3 signaling.

In a communication system to which the 5G communication technology, etc. is applied, one or more of numerologies of Table 1 may be used in accordance with various purposes, such as inter-carrier interference (ICI) reduction according to frequency band characteristics, latency reduction according to service characteristics, and the like.

TABLE 1

| $\mu$ | $\Delta f = 2^{\mu} \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Table 1 is merely an example for the convenience of description, and exemplary embodiments of the numerologies used in the communication system may not be limited thereto. Each numerology $\mu$ may correspond to information of a subcarrier spacing (SCS) $\Delta f$ and a cyclic prefix (CP). The terminal may identify a numerology $\mu$ and a CP value applied to a downlink bandwidth part (BWP) or an uplink BWP based on higher layer parameters such as subcarrierSpacing, cyclicPrefix, and/or the like.

Figure 2:
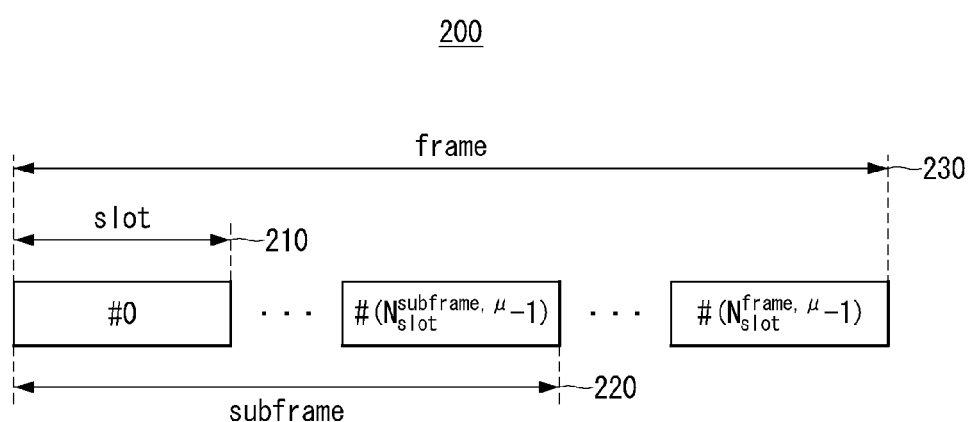
FIG. 2 is a conceptual diagram illustrating an exemplary embodiment of time resources in which radio signals are transmitted in a communication system.

FIG. 2 is a conceptual diagram illustrating an exemplary embodiment of time resources in which radio signals are transmitted in a communication system.

Referring to FIG. 2, time resources in which radio signals are transmitted in a communication system 200 may be represented with a frame 220 comprising one or more ($N_{slot}^{frame,\mu}/N_{slot}^{subframe,\mu}$) subframes, a subframe 220 comprising one or more ($N_{slot}^{subframe,\mu}$) slots, and a slot 210 comprising 14 ($N_{symb}^{slot}$) OFDM symbols. In this case, according to a configured numerology, as the values of $N_{symb}^{slot}$, $N_{slot}^{subframe,\mu}$, and $N_{slot}^{frame,\mu}$, values according to Table 2 below may be used in case of a normal CP, and values according to Table 3 below may be used in case of an extended CP. The OFDM symbols included within one slot may be classified into 'downlink', 'flexible', or 'uplink' by higher layer signaling or a combination of higher layer signaling and L1 signaling.

TABLE 2

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 3

| μ | $N_{symb}^{slot}$ | $N_{slot}^{frame,\mu}$ | $N_{slot}^{subframe,\mu}$ |
|---|---|---|---|
| 2 | 12 | 40 | 4 |

In the 5G NR communication system, the frame 230 may have a length of 10 ms, and the subframe 220 may have a length of 1 ms. Each frame 230 may be divided into two half-frames having the same length, and the first half-frame (i.e., half-frame 0) may be composed of subframes #0 to #4, and the second half-frame (i.e., half-frame 1) may be composed of subframes #5 to #9. One carrier may include a set of frames for uplink (i.e., uplink frames) and a set of frames for downlink (i.e., downlink frames).

Figure 3:
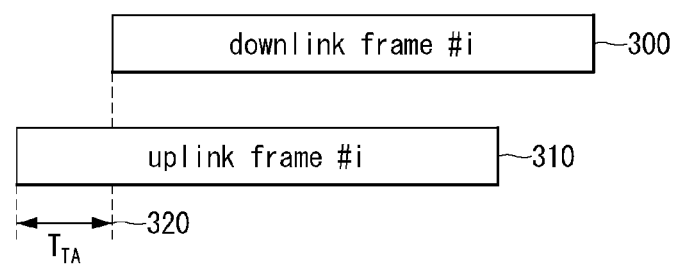
FIG. 3 is a conceptual diagram illustrating a time difference between a reception timing of an i-th downlink frame and a transmission timing of an i-th uplink frame in an exemplary embodiment of a communication system.

FIG. 3 is a conceptual diagram illustrating a time difference between a reception timing of an i-th downlink frame and a transmission timing of an i-th uplink frame in an exemplary embodiment of a communication system.

Referring to FIG. 3, a time difference between a reception timing of an i-th downlink frame 300 and a transmission timing of an i-th uplink frame 310 may be a $T_{TA}$ 320. Accordingly, the terminal may start transmission of the uplink frame #i 310 at a time earlier by $T_{TA}$ compared to the reception timing of the downlink frame #i 300. $T_{TA}$ may be referred to as a timing advance or timing adjustment TA. The base station may instruct the terminal to change a value of $T_{TA}$ through higher layer signaling or L1 signaling, and may configure the terminal to apply $T_{TA}$ in a manner defined as $T_{TA}=(N_{TA}\ N_{TA,offset})T_c$ In the case of 5G NR, $T_c$ may be defined as $$T_c = \frac{1}{(\Delta f_{max} \cdot N_f)},$$

$\Delta f_{max}$ may be defined as $\Delta f_{max}$=480 kHz, $N_f$ may be defined as $N_f$=4096, $N_{TA,offset}$ may be a value set by L3 signaling, and $N_{TA}$ may be a value determined by Equation 1 below by a value $T_A$ indicated by L2 signaling.

$$N_{TA} = \begin{cases} T_A \cdot 16 \cdot \frac{64}{2^\mu} \text{ (for random access response)} \\ N_{TA\_old} + \left((T_A - 31) \cdot 16 \cdot 64/2^\mu\right) \text{ (for other cases)} \end{cases} \quad \text{[Equation 1]}$$

Here, the description on $N_{TA,offset}$ and $N_{TA}$ may be an example for a specific situation, and various other options may exist, but in order not to obscure the gist of the description, all possible cases may not be listed in the present disclosure.

Figure 4:
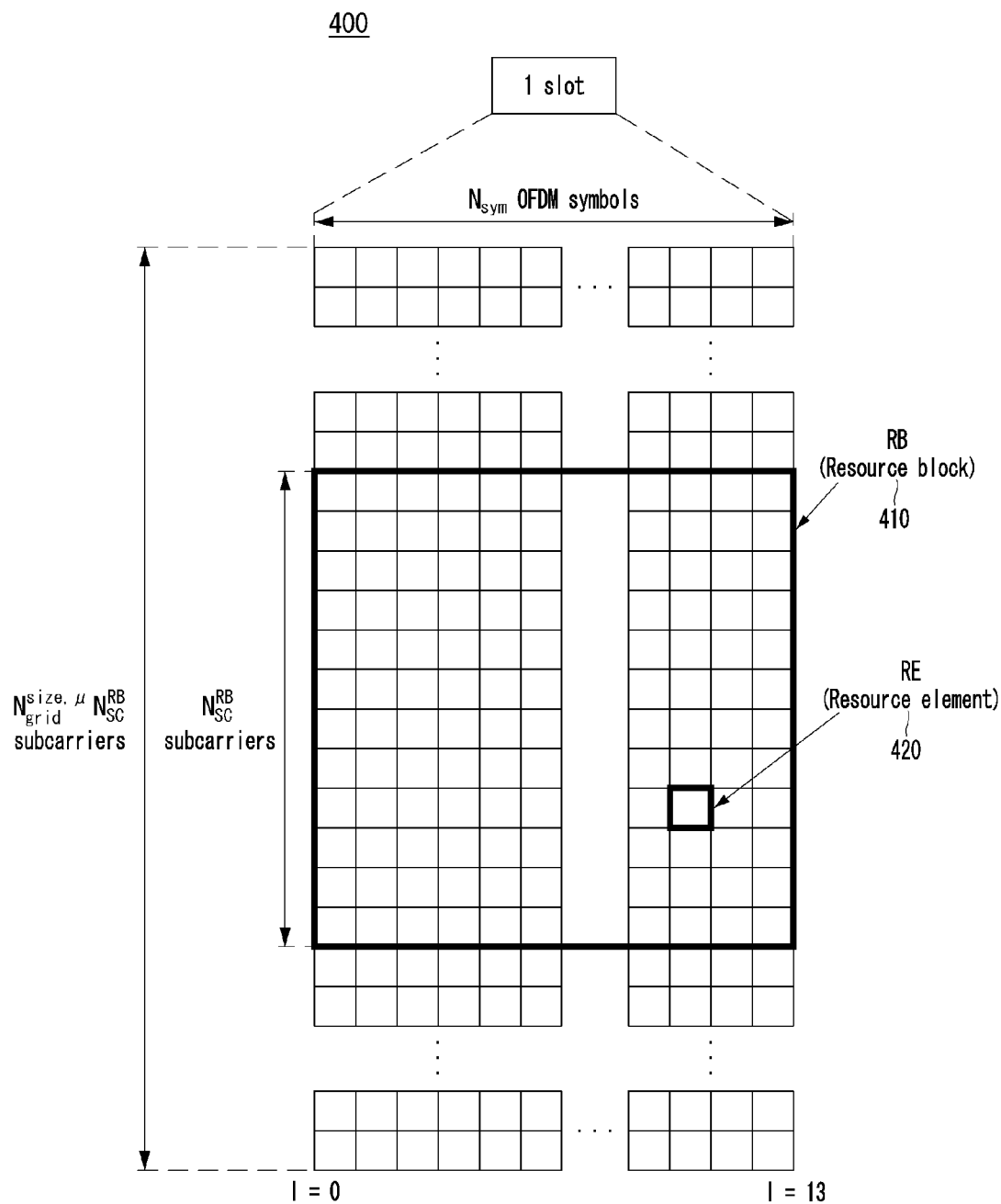
FIG. 4 is a conceptual diagram illustrating an exemplary embodiment of a time/frequency resource grid of a communication system.

FIG. 4 is a conceptual diagram illustrating an exemplary embodiment of a time/frequency resource grid of a communication system.

Referring to FIG. 4, a time/frequency resource grid 400 of a communication system may have $N_{grid}^{size,\mu} N_{sc}^{RB}$ subcarriers and $N_{slot}$ OFDMs. The resource grid may be defined for each numerology and each carrier. In this case, $N_{grid}^{start,\mu}$ may mean a position of a common resource block (CRB) indicated by higher layer signaling. $N_{grid}^{size,\mu}$ may mean the number of resource blocks (RBs) starting from the CRB, that is, a carrier bandwidth. $N_{grid}^{start,\mu}$ and/or $N_{grid}^{size,\mu}$ may have different values for each link direction (e.g., uplink, downlink, or sidelink) or for each numerology μ. Here, the numerology μ may be referred to by other terms, such as a SCS configuration, if necessary.

Each element in the resource grid for an antenna port p and a SCS configuration μ may be referred to as a resource element (RE) 420, and may be uniquely defined for each position $(k, l)_{p,\mu}$. In this case, k may be a frequency axis index, and l may indicate a symbol position on the time axis. RE $(k, l)_{p,\mu}$ may correspond to a physical resource used to transmit a physical channel or a signal complex value $a_{k,l}^{(p,\mu)}$. One RB 410 may be defined as consecutive $N_{sc}^{RB}$=12 subcarriers on the frequency axis.

The 5G NR communication system has introduced the concept of BWPs in order to reduce high implementation complexity and power consumption of terminals due to the widened carrier bandwidth compared to the 3G/4G communication system. One BWP may be composed of contiguous CRBs, a starting RB position $N_{BWP,i}^{start,\mu}$ of the BWP and the number $N_{BWP,i}^{size,\mu}$ of RBs constituting the BWP may satisfy Equations 2 and 3.

$$N_{grid,x}^{start,\mu} \leq N_{BWP,i}^{start,\mu} < N_{grid,x}^{start,\mu} + N_{grid,x}^{size,\mu} \quad \text{[Equation 2]}$$

$$N_{grid,x}^{start,\mu} < N_{BWP,i}^{start,\mu} + N_{BWP,i}^{size,\mu} \leq N_{grid,x}^{start,\mu} + N_{grid,x}^{size,\mu} \quad \text{[Equation 3]}$$

Up to four downlink BWPs within one component carrier (CC) may be configured for one terminal, and only one downlink BWP may be activated at a time. The terminal may not receive a physical downlink shared channel (PDSCH), a physical downlink control channel (PDCCH), a channel state information reference signal (CSI-RS), or the like outside the activated BWP.

Up to four uplink BWPs within one CC may be configured for one terminal, and only one uplink BWP may be activated at a time. The terminal may not transmit a physical uplink shared channel (PUSCH), a physical uplink control channel (PUCCH), a sounding reference signal (SRS), or the like outside the activated BWP.

Figure 5:
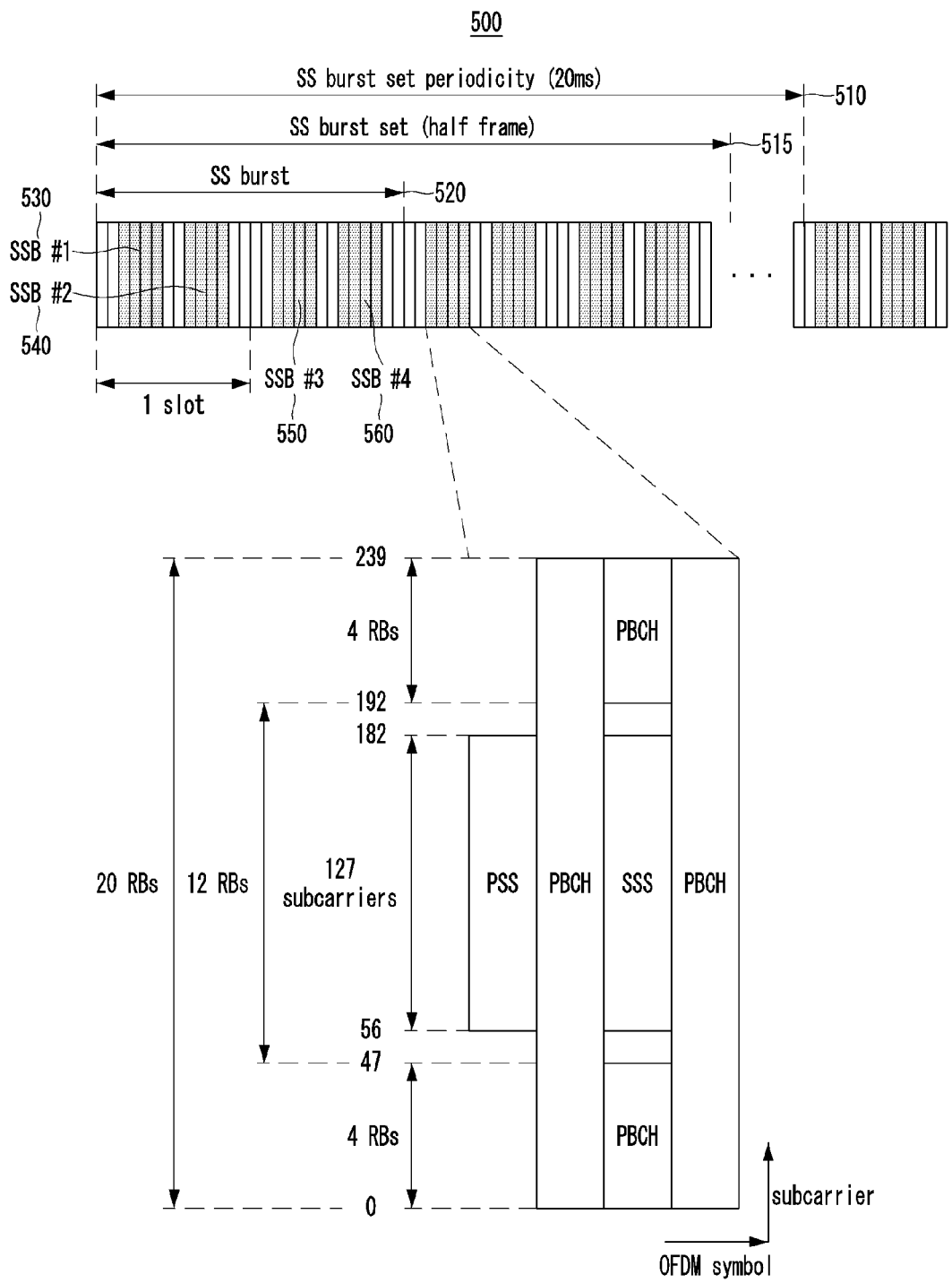
FIG. 5 is a conceptual diagram illustrating an exemplary embodiment of a synchronization signal and physical broadcast channel (SS/PBCH) block or synchronization signal block (SSB) of a communication system.

FIG. 5 is a conceptual diagram illustrating an exemplary embodiment of a synchronization signal and physical broadcast channel (SS/PBCH) block or synchronization signal block (SSB) of a communication system.

Referring to FIG. 5, an SS/PBCH block 500 of a communication system may be configured with a primary synchronization signal (PSS) transmitted in 127 subcarriers in the middle of a first OFDM symbol, a secondary synchronization signal (SSS) transmitted in 127 subcarriers in the middle of a third OFDM symbol, and a physical broadcast channel (PBCH) transmitted in second, third, and fourth OFDM symbols. The PBCH occupying the widest bandwidth may be transmitted over 20 RBs, which may be 3.6 MHz based on 15 kHz SCS. The base station transmits one SSB by applying the same beam. When the number of base station antennas increases or it is necessary to operate multiple beams such as applying one or more analog beams for high frequency support, the base station may support a multi-beam operation by transmitting multiple SSBs. Here, the term 'beam' may be expressed in various terms such as a transmission precoding or a spatial transmission (TX) filter when applied in practice. However, in order not to obscure the gist of the description, 'beam' is used hereinafter as a unified term.

For example, the base station may transmit a plurality of SSBs 530, 540, 550, and 560 to represent a plurality of beams (e.g., beam #1, beam #2, beam #3, beam #4). In this case, it may be possible that one or more SSBs are transmitted within one slot according to a pattern predetermined according to each numerology. The SSBs 530, 540, 550, and 560 to which different beams are applied may be bundled into one set by being included in an SS burst 520. The terminal may assume a half-frame window having a length of 5 ms at the time of monitoring SSBs. An SS burst set 515 configured by higher layer signaling within a half-frame may include one or more SS bursts 520. If RRC configuration values are unknown or unavailable when performing initial access (IA), the terminal may receive or measure the SSBs assuming that a periodicity of the SS burst set 510 is 20 ms. As an example, the terminal may receive SSB(s) with reference to SSB configuration information identical or similar to that shown in Table 4.

Figure 6:
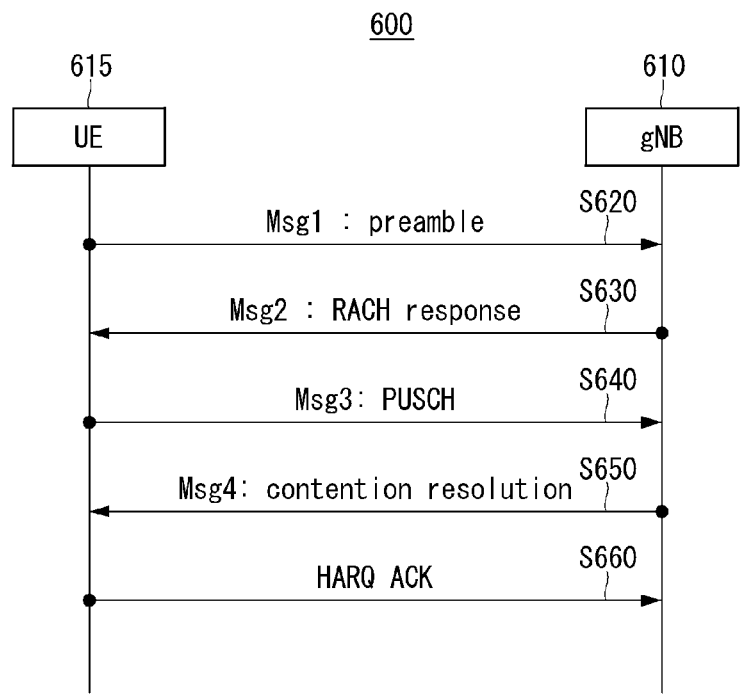
FIG. 6 is a sequence chart illustrating an exemplary embodiment of a random access procedure in a communication system.

FIG. 6 is a sequence chart illustrating an exemplary embodiment of a random access procedure in a communication system.

Referring to FIG. 6, in a random access procedure of a communication system 600, a terminal 615 may transmit a physical random access channel (PRACH) preamble, and the PRACH preamble may be referred to as 'Msg1' (S620). Through a transmission of the PRACH preamble, random access-radio network temporary identifier (RA-RNTI) may be determined. In this case, the RA-RNTI may be calculated by Equation 4.

$$\text{RA-RNTI} = 1 + s\_id + 14 \times t\_id + 14 \times 80 \times f\_id + 14 \times 80 \times 8 \times ul\_carrier\_id \quad \text{[Equation 4]}$$

In Equation 4, s_id may be an index of a first OFDM symbol of a corresponding PRACH occasion (e.g. 0≤s_id<14), t_id may be an index of a first slot of the PRACH occasion within a system frame (e.g., 0≤t_id<80), f_id may be an index of the PRACH occasion in the time domain (e.g., 0≤f_id<8), and ul_carrier_id may be a value according to a uplink carrier type used for the preamble transmission (e.g., 0 indicates a regular uplink carrier, 1 indicates a supplementary uplink carrier).

Before the terminal transmits the PRACH preamble, the terminal may have at least part of the following information by receiving system information from the base station on a PBCH or receiving RRC signaling from the base station.

TABLE 4

```
MIB ::=                       SEQUENCE {
    systemFrameNumber
    subCarrierSpacingCommon
    ssb-SubcarrierOffset      // SSB subcarrier offset (0~15)
    dmrs-TypeA-Position
    pdcch-ConfigSIB1
    cellBarred
    intraFreqReselection
    spare
}
MeasObjectNR ::=              SEQUENCE {
    ssbFrequency              // Absolute Radio Frequency Channel Number (ARFCN) of SSB
    ssbSubcarrierSpacing      // Numerology of SSB
    smtc1
        // first SSB measurement timing configuration (SMTC) configured with reference to SSB-MTC
    smtc2   // Second SMTC configured with reference to SSB-MTC
    ...
    ...
}
SSB-Index                     // SSB index within SS-burst
SSB-MTC ::=                   SEQUENCE {
        // timing occasion configuration for SSBs to be measured by terminal
    periodicityAndOffset          CHOICE {
        sf5                   // offset when a SSB reception window has a legnth of 5 subframes
        sf10                  // offset when a SSB reception window has a legnth of 10 subframes
        sf20                  // offset when a SSB reception window has a legnth of 20 subframes
        sf40                  // offset when a SSB reception window has a legnth of 40 subframes
        sf80                  // offset when a SSB reception window has a legnth of 80 subframes
        sf160                 // offset when a SSB reception window has a legnth of 160 subframes
    },
    duration                  // a lengh of a SSB recepion window (number of subframes)
}
SSB-MTC2 ::=                  SEQUENCE {
    pci-List                  // physical cell IDs (PCIs) following the SMTC configuration
    periodicity               // SMTC periodicity (number of subframes)
}
```

PRACH preamble format
Time/frequency resource information for RACH transmission
Index for a logical root sequence table
Cyclic shift $N_{Cs}$
Set type (unrestricted, restricted set A, restricted set B)

Referring again to FIG. 6, as a second procedure, the base station may provide a random access response (RAR) to the terminal, which may be referred to as 'Msg2' (S630). Particularly, the base station may calculate an RA-RNTI based on Equation 4 when the base station receives the PRACH preamble from the terminal in the step S620, and may transmit a DCI by using the RA-RNTI for scrambling. The terminal may monitor a PDCCH scrambled with the RA-RNTI in a period included in a RACH response window configured by the higher layer in a type 1 PDCCH common search space (CSS). The terminal may receive the PDCCH (or the DCI transmitted from the base station through the PDCCH), and may decode the PDCCH (or the DCI). If the terminal successfully decodes the PDCCH (or the DCI), the terminal may decode a PDSCH including the RAR transmitted from the base station in the step S630. If the terminal succeeds in decoding the RAR, the terminal may identify whether an RA preamble identifier (RAPID) in the RAR matches a RAPID pre-allocated to the terminal.

As a third procedure, the terminal may transmit a PUSCH to the base station, which may be referred to as 'Msg3' (S640). To this end, the terminal may determine whether to apply a transform precoding to transmission of the PUSCH (i.e., whether to apply discrete Fourier transform (DFT)-s-OFDM-based transmission or OFDM-based transmission) based on a higher layer parameter (e.g., msg3-transform-Precoding). Also, the terminal may determine a SCS to be used for transmission of the PUSCH according to a higher layer parameter (e.g., msg3-scs). In this case, the PUSCH of Msg3 may be transmitted through a serving cell to which the PRACH has been transmitted.

As a fourth procedure, the base station may transmit a contention resolution message to the terminal, which may be referred to as 'Msg4' (S650). The terminal may start a timer for receiving the contention resolution message, and may monitor a PDCCH scrambled with a temporary cell-RNTI (TC-RNTI) in the type 1 PDCCH CSS until the timer expires. If the terminal successfully decodes the PDCCH, the terminal may decode a corresponding PDSCH including a MAC CE, and set the TC-RNTI as a cell-RNTI (C-RNTI). After successfully decoding the Msg4, the terminal may report a hybrid automatic repeat request (HARQ) positive-acknowledgement (ACK) thereto to the base station, and may report whether the RACH procedure is successful to the base station (S660).

The RACH occasion (RO) may mean a time and frequency resource specified for reception of a RACH preamble, and the terminal may use the RO for PRACH transmission. As described above, in the 5G NR, multiple SSBs may be associated with different beams for the multi-beam operation, and the terminal may measure the multiple SSBs, and select an optimal SSB (i.e., optimal beam) based on one of various schemes such as a reference signal received power (RSRP), reference signal received quality (RSRQ), signal-to-noise ratio (SNR), signal-to-noise/interference ratio (SNIR), or the like. Thereafter, the terminal may determine a beam (i.e., TX spatial filter) to be used for PRACH transmission based on the beam (i.e., RX spatial filter) used when receiving the optimal SSB. In this case, a relationship between SSB(s) and RO(s) may be established for the purpose of allowing the base station or the network to know which SSB (i.e., beam) the terminal has selected. Through such the relationship, the base station may know the SSB (i.e., beam) selected by the terminal based on the RO in which the terminal has transmitted the PRACH. For example, the relationship between SSB(s) and RO(s) may be determined with reference to the higher layer configurations identical or similar to those shown in Table 5.

TABLE 5

```
RACH-ConfigCommon ::=                    SEQUENCE {
    rach-ConfigGeneric                   // set of RACH parameters
    totalNumberOfRA-Preambles            // the total number of RACH preambles (1~63)
    ssb-perRACH-OccasionAndCB-PreamblesPerSSB  CHOICE {
        oneEighth      // The number of preambles per SSB when one SSB is associated with eight ROs
        oneFourth      // The number of preambles per SSB when one SSB is associated with four ROs
        oneHalf        // The number of preambles per SSB when one SSB is associated with two ROs
        one            // The number of preambles per SSB when one SSB is associated with one RO
        two            // The number of preambles per SSB when two SSBs are associated with one RO
        four           // The number of preambles per SSB when four SSBs are associated with one RO
        eight          // The number of preambles per SSB when eigth SSBs are associated with one RO
        sixteen        // The number of preambles per SSB when sixteen SSBs are associated with one RO
    }
    groupBconfigured                     SEQUENCE {
        ra-Msg3SizeGroupA        // The size of a transport block fro contention-based RA of Group A
        messagePowerOffsetGroupB         // Threshold for preamble selection
        numberOfRA-PreamblesGroupA       // The number of CB preambles per SSB of Group A
    }
        ra-ContentionResolutionTimer     // Initial value of a contention resolution timer
        rsrp-ThresholdSSB                // Threshold for selection of an SSB and an associated RACH resource
        rsrp-ThresholdSSB-SUL            // Threshold for selection of an SSB and an associated RACH resource in
SUL
        prach-RootSequenceIndex                  CHOICE { // RACH root sequence index
            l839
            l139
        },
        msg1-SubcarrierSpacing       // SCS for Msg1 transmission
        restrictedSetConfig          // one of {unrestricted, restricted set A, restricted set B}
        msg3-transformPrecoder       // whether to apply transform precoding in transmisison of Msg3
        ...
    }
```

TABLE 5-continued

```
RACH-ConfigGeneric ::=            SEQUENCE {
    prach-ConfigurationIndex      // indicates a preamble format, etc.
    msg1-FDM                      // The number of ROs FDMed at a time
    msg1-FrequencyStart           // frequency-axis offset of the lowest RO with reference to PRB 0
    zeroCorrelationZoneConfig     // N-CS configuration
    preambleReceivedTargetPower      // Target power level at a network receiving node
    preambleTransMax
        // The maximum number of RA preambe transmissions performed unitl declaration of an RA
failure
    powerRampingStep              // Power ramping step
    ra-ResponseWindow             // Msg2 (RAR) window length (number of slots)
    ...,
}
```

Figure 7:
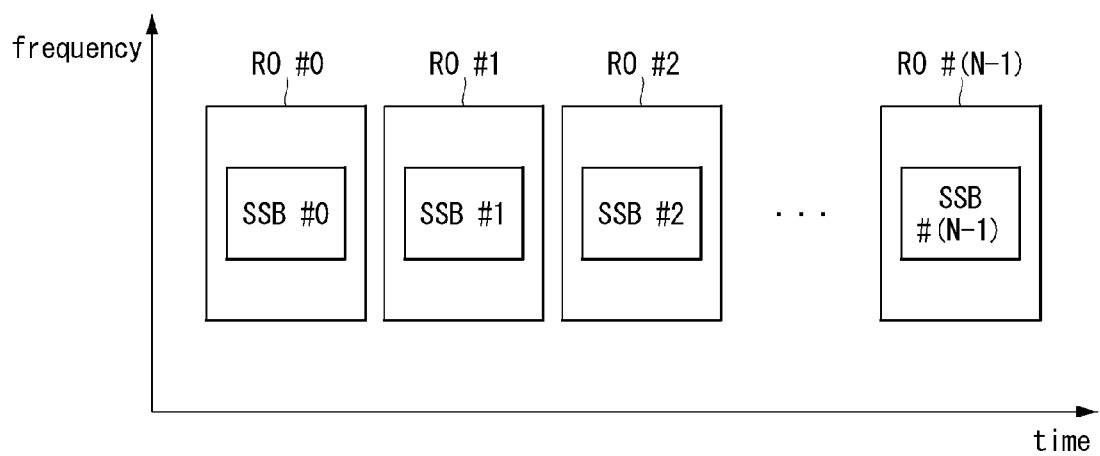
FIG. 7 is a conceptual diagram illustrating a first exemplary embodiment of SSB-RO association according to RACH configuration in a communication system.

FIG. 7 is a conceptual diagram illustrating a first exemplary embodiment of SSB-RO association according to RACH configuration in a communication system.

Referring to FIG. 7, in an SSB-RO mapping relation according to the RACH configurations, in a certain frequency band, N SSBs 710-1 to 710-$n$ having time resources which are separated from each other may be mapped to ROs 720-1 to 720-$n$ having time resources which are separated from each other on a one-to-one basis. For example, if a higher layer parameter msg1-FDM is set to 1 (i.e., msg1-FDM=one) and a higher layer parameter ssb-perRACH-OccasionAndCB-PreamblesPerSSB is set to 1 (e.g., ssb-perRACH-OccasionAndCB-PreamblesPerSSB=one), the N different SSBs 710-1 to 710-$n$ may be mapped to the N different ROs 720-1 to 720-$n$ on a one-to-one basis.

Figure 8:
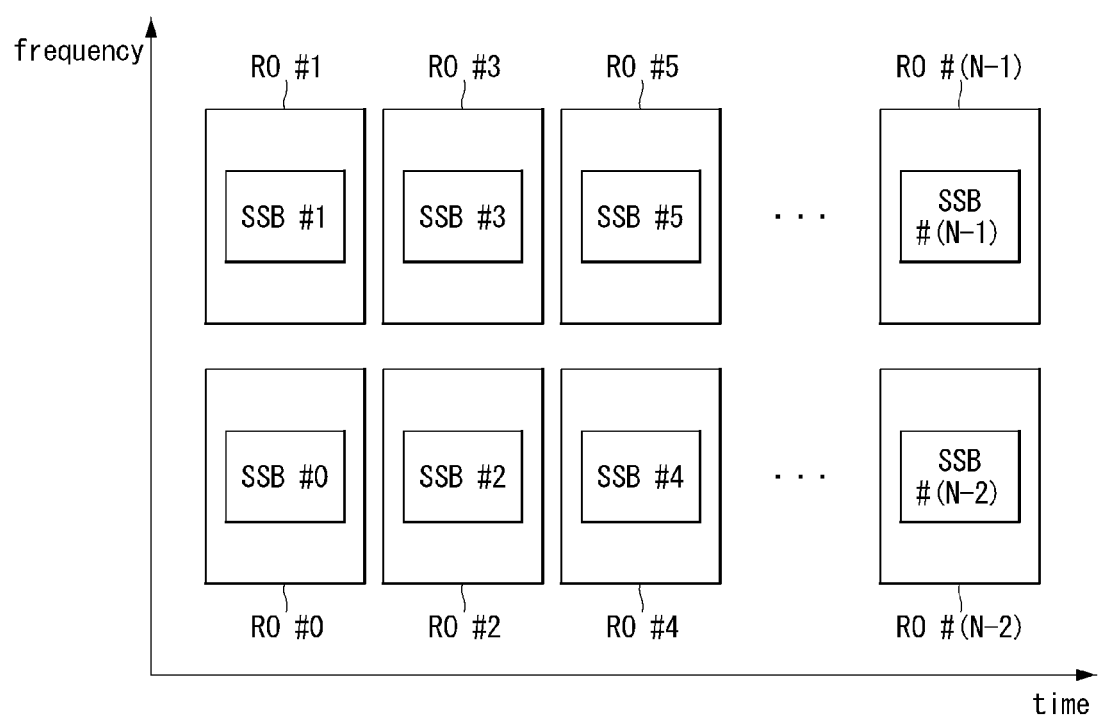
FIG. 8 is a conceptual diagram illustrating a second exemplary embodiment of SSB-RO association according to RACH configuration in a communication system.

FIG. 8 is a conceptual diagram illustrating a second exemplary embodiment of SSB-RO association according to RACH configuration in a communication system.

Referring to FIG. 8, in an SSB-RO mapping relation according to the RACH configurations, in a first frequency band, SSBs 810-1, 810-3, 810-5, . . . , and 810-($n$-1) having time resources which are separated from each other may be mapped to ROs 820-1, 820-3, 820-5, . . . , and 820-($n$-1) having time resources which are separated from each other on a one-to-one basis. In addition, in a second frequency band, SSBs 810-2, 810-4, 810-6, . . . , and 810-$n$ having time resources which are separated from each other may be mapped to ROs 820-2, 820-4, 820-6, . . . , and 820-$n$) having time resources which are separated from each other on a one-to-one basis. For example, if the higher layer parameter msg1-FDM is set to 2 (i.e., msg1-FDM=two), and higher layer parameter ssb-perRACH-OccasionAndCB-PreamblesPerSSB is set to 2 (e.g., ssb-perRACH-OccasionAndCB-PreamblesPerSSB=two), the N different SSBs 810-1 to 810-$n$ may be mapped to the N different ROs 820-1 to 820-$n$ which are frequency division multiplexed (FDMed) in a frequency domain, on a one-to-one basis.

Meanwhile, the 5G NR communication system may support DCI formats shown in Table 6 based on Release-16.

TABLE 6

| DCI format | Usage |
| --- | --- |
| 0_0 | Used for scheduling a PUSCH within one cell |
| 0_1 | Used for scheduling one or more PUSCHs within one cell, or indicating downlink feedback information for a configured grant (CG) PUSCH (i.e., CG-DFI) |
| 0_2 | Used for scheduling a PUSCH within one cell |
| 1_0 | Used for scheduling a PDSCH within one cell |
| 1_1 | Used for scheduling a PDSCH within one cell or triggering a one-shot HARQ-ACK codebook feedback |

TABLE 6-continued

| DCI format | Usage |
| --- | --- |
| 1_2 | Used for scheduling a PDSCH within one cell |
| 2_0 | Used for notifying a slot format, an available RB set, a channel occupancy time (COT) duration, and search space set group switching to a UE group |
| 2_1 | Used for notifying PRB(s) and OFDM symbol(s) assumed not to be intended to be used for transmission to a UE group |
| 2_2 | Used for transmission of a transmission power control (TPC) for a PUCCH and a PUSCH |
| 2_3 | Used for transmission of a TPC command group for SRS transmission by one or more UEs |
| 2_4 | Used for a UE to notify PRB(s) and OFDM symbol(s) for which UL transmission from the UE is cancelled to a UE group |
| 2_5 | Used for notifying availability of soft resources |
| 2_6 | Used for notifying power saving information outside a DRX active time to one or more UEs |
| 3_0 | Used for NR sidelink scheduling within one cell |
| 3_1 | Used for LTE sidelink scheduling within one cell |

A DCI may include downlink control information for one or more cells, and may be associated with one RNTI. The DCI may be encoded through the order of 1) information element multiplexing, 2) cyclic redundancy check (CRC) addition, 3) channel coding, and 4) rate matching, and decoding may also be performed in consideration of the above steps. In the above description, "a certain DCI is associated with one RNTI" may mean that CRC parity bits of the DCI are scrambled with the RNTI. Referring to Table 6, some DCI may include scheduling information of one or more PUSCHs for a certain cell.

For example, a CRC of the DCI format 0_1 may be scrambled with a C-RNTI, configured scheduling-RNTI (CS-RNTI), semi-persistent CSI RNTI (SP-CSI-RNTI), or modulation coding scheme cell RNTI (MCS-C-RNTI). The DCI format 0_1 may include at least one of the following information.

Identifier for DCI format (1 bit): Indicator indicating a UL DCI format, which is always set to 0 in the case of DCI format 0_1

Carrier indicator (0 or 3 bits): Indicator indicating a CC scheduled by the corresponding DCI DFI flag (0 or 1 bit): Configured grant downlink feedback information (CG-DFI) indicator.

If the DCI format 0_1 is used for CG-DFI indication (when the DFI flag is set to 1), at least one of the following fields may be used:

HARQ-ACK bitmap (16 bits), where the order of mapping HARQ process indexes within the bitmap is that the HARQ process indexes are mapped from the MSB to the LSB of the bitmap in ascending order. For each bit in the bitmap, a value of 1 indicates ACK, and a value of 0 indicates NACK.

TPC command for a scheduled PUSCH (2 bits)

All the remaining bits in the DCI format 0_1 are set to zero

If the DCI format 0_1 is not used for CG-DFI indication (when there is no DFI flag field or DFI flag field is set to 0), at least one of the following fields may be used:

UL/SUL indicator (0 or 1 bit): supplementary UL indicator.

Bandwidth part indicator (0, 1, or 2 bits): Indicator indicating a BWP to be activated among uplink BWPs configured for the terminal.

Frequency domain resource assignment: Indicator for allocating a frequency domain resource.

Time domain resource assignment: Indicator for allocating a time domain resource.

Frequency hopping flag (0 or 1 bit): Frequency axis hopping indicator

Modulation and coding scheme (5 bits)

New data indicator (NDI): Indicator indicating whether allocated data is new data or retransmission data.

Redundancy version (RV): Indicator indicating an RV value when channel coding is applied to allocated data HARQ process number (4 bits): Indicator indicating a HARQ process to be allocated to scheduled data TPC command for a scheduled PUSCH (2 bits): TPC indicator SRS resource indicator: Aperiodic SRS resource selection indicator Precoding information and number of layers: Indicator indicating precoding and the number of transport layers to be used in PUSCH transmission Antenna ports: Indicator for uplink antenna ports to be used for PUSCH transmission SRS request: Indicator indicating whether to transmit aperiodic SRS CSI request: Indicator indicating whether and how to report channel state information PTRS-DMRS association: Indicator indicating a relationship between an uplink phase-noise tracking reference signal (PTRS) antenna port and a demodulation reference signal (DMRS) antenna port DMRS sequence initialization: Indicator for a DMRS sequence initialization value during OFDM-based uplink transmission UL-SCH indicator: Indicator indicating whether or not an uplink shared channel (UL-SCH) is included in a PUSCH (a PUSCH that does not include a UL-SCH needs to include CSI)

Open-loop power control parameter set indication: Indicator indicating a set of open-loop power control (OPLC) parameter set Priority indicator: Uplink transmission priority indicator.

Invalid symbol pattern indicator: Indicator indicating whether to apply an invalid symbol pattern configured by a higher layer As another example, a CRC of the DCI format 1_1 may be scrambled with a C-RNTI, CS-RNTI, or MCS-C-RNTI, and the DCI format 1_1 may include at least one of the following information.

Identifier for DCI format (1 bit): Indicator indicating a DL DCI format, which is always set to 1 in the case of DCI format 1_1

Carrier indicator (0 or 3 bits): Indicator indicating a CC scheduled by the corresponding DCI Bandwidth part indicator (0, 1, or 2 bits): Indicator indicating a BWP to be activated among downlink BWPs configured for the terminal Frequency domain resource assignment: Indicator for allocating a frequency domain resource Time domain resource assignment: Indicator for allocating a time domain resource PRB bundling size indicator: Indicator indicating a type (i.e., static or dynamic) and a size of PRB bundling Rate matching indicator: Indicator indicating a rate matching pattern configured by a higher layer ZP CSI-RS trigger: Indicator for applying aperiodic zero-power (ZP) CSI-RS 'modulation and coding scheme', 'new data indicator', and 'redundancy version' fields for a transport block 1

'modulation and coding scheme', 'new data indicator', and 'redundancy version' fields for a transport block 2

HARQ process number: Indicator indicating a HARQ process to be allocated to scheduled data Downlink assignment index: DAI indicator for HARQ-ACK codebook generation in TDD operation.

TPC command for a scheduled PUCCH: Power control indicator for PUCCH transmission.

PUCCH resource indicator: Indicator indicating a PUCCH resource for transmitting HARQ-ACK information for an allocated PDSCH or a predetermined PDSCH set PDSCH-to-HARQ_feedback timing indicator: Indicator indicating a time axis offset between the allocated PDSCH and the PUCCH Antenna port(s): Indicator indicating antenna ports to be used for PDSCH transmission/reception Transmission configuration indication: Indicator indicating transmission configuration information (TCI) to be used for PDSCH transmission and reception SRS request: Indicator indicating whether to transmit aperiodic SRS DMRS sequence initialization: Indicator for a DMRS sequence initialization value used for PDSCH transmission and reception Priority indicator: PDSCH reception priority indicator As another example, certain DCI formats may be used to deliver the same control information to one or more terminals. For example, a CRC of the DCI format 2_3 may be scrambled with a transmit power control-sounding reference signal-RNTI (TPC-SRS-RNTI), and may include at least one of the following information.

Block number 1, Block number 2, . . . , Block number B: Indicators indicating resource regions to which the DCI format 2_3 is applied. A starting part of the block is configured by a higher layer parameter startingBitOfFormat2-3 or startingBitOfFormat2-3SUL-v1530.

When a terminal for which a higher layer parameter srs-TPC-PDCCH-Group is set to type A performs uplink transmission without a PUCCH and PUSCH or uplink transmission in which SRS power control is not tied to PUSCH power control, one block is configured by the higher layer, and the following fields are defined for the block.

SRS request (0 or 2 bits): Aperiodic SRS transmission indicator

TPC command number 1, TPC command number 2, . . . , TPC command number N: Indicators indicating uplink power control to be applied to a UL carrier indicated by a higher layer parameter cc-IndexInOneCC-Set.

When a terminal for which a higher layer parameter srs-TPC-PDCCH-Group is set to type B performs uplink transmission without a PUCCH and PUSCH or uplink transmission in which SRS power control is not tied to PUSCH power control, one or more blocks may be configured by the higher layer, and the following fields are defined for each block.

SRS request (0 or 2 bits): Aperiodic SRS transmission indicator.

TPC command (2 bits)

As another example, certain DCI formats may be used to deliver the same control information to one or more terminals. For example, a CRC of the DCI format 2_0 may be scrambled with an SFI-RNTI, and may be used for notifying information such as a slot format, a channel occupancy time (COT) duration, an available RB set, a search space set group switching, or the like. Specifically, the DCI format 2_0 may include at least one of the following information.

When a higher layer parameter slotFormatCombToAddModList is configured,
Slot format indicator 1, Slot format indicator 2, . . . , Slot format indicator N When a higher layer parameter availableRB-SetsToAddModList-r16 is configured,
Available RB set indicator 1, Available RB set indicator 2, . . . , Available RB set indicator N1

When a higher layer parameter co-DurationsPerCellToAddModList-r16 is configured,
COT duration indicator 1, COT duration indicator 2, . . . , COT duration indicator N2

When a higher layer parameter searchSpaceSwitchTriggerToAddModList-r16 is configured,
Search space set group switching flag 1, Search space set group switching flag 2, . . . , Search space set group switching flag M The size of the DCI format 2_0 may be set by higher layer signaling as one of 0 to 128 bits. For example, the DCI format 2_5 may be used to notify availability of soft-type resources of an IAB node. A CRC of the DCI format 2_5 may be scrambled with an availability indicator-RNTI (AI-RNTI), and may include the following information.

Availability indicator 1, Availability indicator 2, . . . , and Availability indicator N As the size of DCI format 2_5, one of values less than or equal to 128 bits may be set by higher layer signaling. The terminal may receive configuration information of a CORESET #0 and a search space #0, identical or similar to that shown in Table 7.

TABLE 7

| | |
|---|---|
| PDCCH-ConfigSIB1 ::=<br>   controlResourceSetZero<br>   searchSpaceZero<br>} | SEQUENCE { |
| ControlResourceSetZero<br>BWP | // indicates a configuration value (0~15) of a CORESET #0 within an initial |
| SearchSpaceZero<br>BWP | // indicates a configuration value (0~15) of a search space #0 within an initial |

The terminal may refer to the following higher layer configurations for cell-specific PDCCH monitoring, identical or similar to those shown in Tables 8 to 9.

TABLE 8

| | |
|---|---|
| PDCCH-ConfigCommon ::= | SEQUENCE { |
|   controlResourceSetZero // indicates a configuration value (0~15) of a CORESET #0 within an initial BWP | |
|   commonControlResourceSet | |
|     // configure a common CORESET by referring to CORESET configuration | |
|   searchSpaceZero  // indicates a configuration value (0~15) of a search space #0 within an initial BWP | |
|   commonSearchSpaceList | // configures a search sapce to be used for cell-specific PDCCH monitoring |
| by referring to up to four search space configurations | |
|     searchSpaceSIB1 | // search space configuration for SIB1 |
|     searchSpaceOtherSystemInformation | // search space configuration for SIB2 or other SIBs |
|     pagingSearchSpace | // search space configuration for paging |
|     ra-SearchSpace | // search space configuration for random access procedure |
|     ... | |
| } | |
| ControlResourceSet ::= | SEQUENCE { |
|   controlResourceSetId | // CORESET ID (a value other than 0 is used) |
|   frequencyDomainResources | // configuration of frequency resources of a CORESET |
|   duration | // configuration of a time-axis length (symbols) of a CORESET |
|   cce-REG-MappingType | CHOICE { // CCE-to-REG mapping configuration |
|     interleaved | SEQUENCE { |
|       reg-BundleSize | |
|       interleaverSize | |
|       shiftIndex | |
|     }, | |
|     nonInterleaved | |
|   }, | |
|   precoderGranularity | |
|   tci-StatesPDCCH-ToAddList | |
|     // indicates a QCL relation possible between a QCL reference RS and a PDCCH DMRS | |
|   tci-StatesPDCCH-ToReleaseList | |
|   tci-PresentInDCI | // indicates whether a TCI field exists within the DCI format 1_1 |
|   pdcch-DMRS-ScramblingID | // indicates a scrambling initialization value of a PDCCH DMRS |
|   ... | |
| } | |

TABLE 9

```
SearchSpace ::=                          SEQUENCE {
  searchSpaceId                          // search space ID
  controlResourceSetId                   // CORESET ID associated with the search space
  monitoringSlotPeriodicityAndOffset   CHOICE { // periodicity and offset of a PDCCH monitoring slot
    sl1                                  // performs PDCCH monitoring in every slot
    ...
                                         // (omitted) monitoring offset values when a PDCCH monitoring periodicity is one of 2 to 1280 slots
    sl2560                               // a monitoring offset value when a PDCCH monitoring periodicity is 2560 slots
  }
  duration    // the number of slots where a search space exists for each occasion
  수
  monitoringSymbolsWithinSlot
    // a position of a first symbol on which monitoring is to be performed within a PDCCH monitoring slot
  nrofCandidates                         SEQUENCE {
    aggregationLevel1                    // The number of PDCCH candidates in case of aggregation level 1
    aggregationLevel2                    // The number of PDCCH candidates in case of aggregation level 2
    aggregationLevel4                    // The number of PDCCH candidates in case of aggregation level 4
    aggregationLevel8                    // The number of PDCCH candidates in case of aggregation level 8
    aggregationLevel16                   // The number of PDCCH candidates in case of aggregation level 16
  }
  searchSpaceType                        CHOICE { // indicates a search space type (common or UE-specific) and DCI formats
    common                               SEQUENCE {
      dci-Format0-0-AndFormat1-0         SEQUENCE {
        ...
      }
      dci-Format2-0                      SEQUENCE {
        nrofCandidates-SFI               SEQUENCE {
          ...
        },
        ...
      }
      dci-Format2-1
      dci-Format2-2
      dci-Format2-3                      SEQUENCE {
        dummy 1
        dummy 2
      }
    },
    ue-Specific                          SEQUENCE {
      dci-Formats
      ...,
    }
  }
}
```

The terminal may refer to the following higher layer configurations for UE-specific PDCCH monitoring, identical or similar to those shown in Table 10.

TABLE 10

```
PDCCH-Config ::=                         SEQUENCE {
  controlResourceSetToAddModList
    // At most three CORESETs are configured by referring to CORESET configuration
  controlResourceSetToReleaseList
  searchSpacesToAddModList
    // At most ten search spaces are configured by referring to search space configuration
  searchSpacesToReleaseList
  downlinkPreemption       // downlink preemption indicator
  tpc-PUSCH                // configuraion of reception of a group TPC for PUSCH transmission
  tpc-PUCCH                // configuraion of reception of a group TPC for PUCCH transmission
  tpc-SRS                  // configuration of reception of a group TPC for SRS transmission
  ...,
}
```

The presence of one antenna port may mean a case in which a channel experienced by a symbol transmitted through the corresponding antenna port can be estimated or inferred from a channel experienced by another symbol transmitted through the same antenna port.

"Two different antenna ports are quasi co-located (QCLed)" may mean a case in which large-scale characteristics of a channel experienced by a symbol transmitted through one antenna port can be estimated or inferred from a channel experienced by a symbol transmitted through another antenna port. The large-scale characteristics of the channel may mean at least one of 'delay spread', 'Doppler spread', 'Doppler shift', 'average gain', 'average delay', and 'spatial Rx parameters'.

When time/frequency resources of a certain signal (e.g., QCL target RS) are insufficient and large-scale characteristics of a channel cannot be accurately measured with only the corresponding signal, information (i.e., QCL information) on another signal (e.g., QCL reference RS having sufficient time/frequency resources) having large-scale characteristics that can be reused for reception of the corresponding signal (i.e., QCL target RS) may be provided to the terminal to improve the channel measurement performance of the terminal. The NR communication system may support various QCL types as follows.

QCL-Type A: including {Doppler shift, Doppler spread, average delay, delay spread}.
QCL-Type B: including {Doppler shift, Doppler spread}
QCL-Type C: including {Doppler shift, average delay}
QCL-Type D: including {Spatial Rx parameters}

Figure 9:
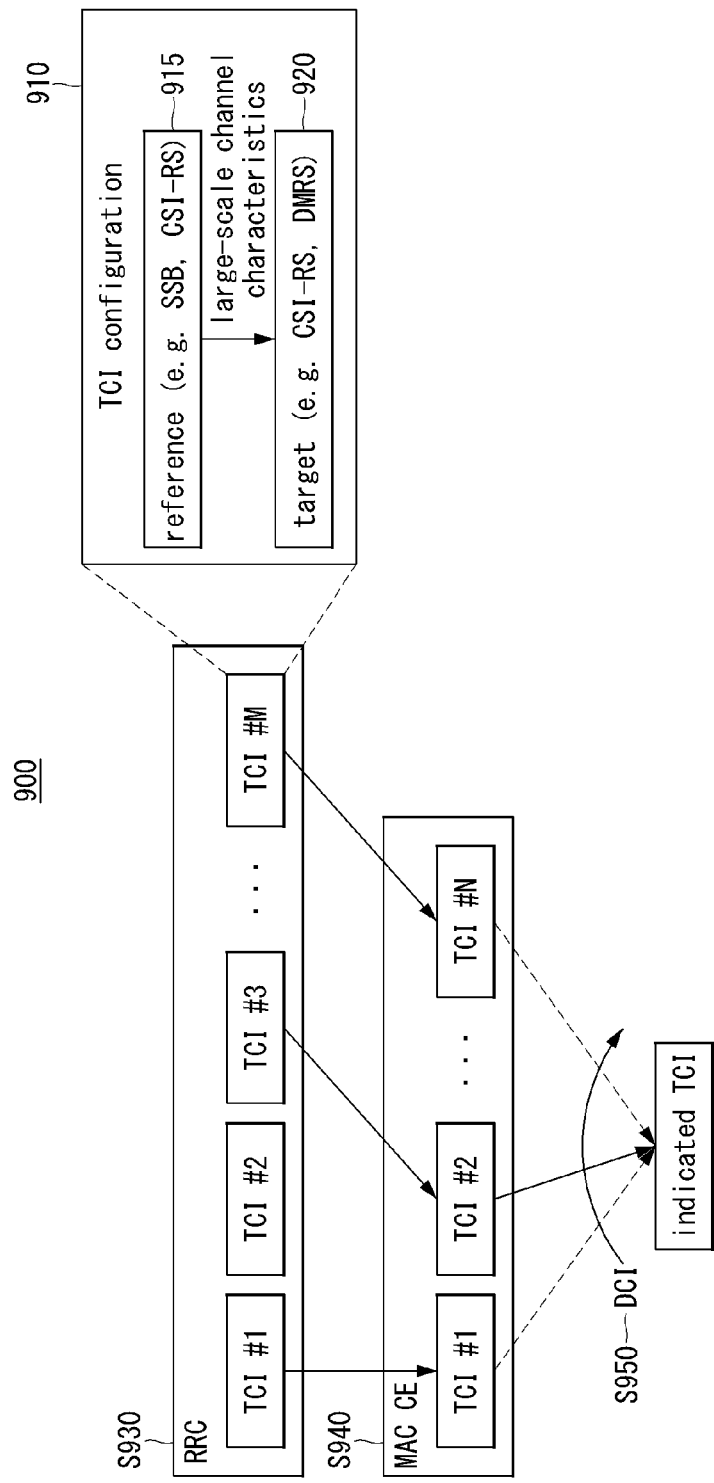
FIG. 9 is a conceptual diagram illustrating an exemplary embodiment of a QCL information transfer process through TCI state configuration and indication in a communication system.

FIG. 9 is a conceptual diagram illustrating an exemplary embodiment of a QCL information transfer process through TCI state configuration and indication in a communication system.

Referring to FIG. 9, in a process of transmitting QCL information through TCI state configuration and indication in a communication system 900, a base station may configure at most M TCI states to a terminal through higher layer (i.e., RRC) signaling, in accordance with a UE capability report and a maximum value (e.g., 4, 8, 64, or 128 depending on a frequency band) defined in a technical specification (S930). In this case, each TCI state configuration 910 may include information on a signal or channel (i.e., QCL reference 915) that provides large-scale channel characteristics to a signal or channel (i.e., QCL target 920) referring to the TCI. One TCI state configuration 910 may include up to two references (i.e., qcl-Type1 and qcl-Type2), the first reference may be one of the QCL-Type A, QCL-Type B, and QCL-type C (i.e., qcl-type1 E {QCL-type A, QCL-type B, QCL-type C}), and the second reference may be the QCL-type D if present (i.e., qcl-type 2=QCL-type D).

Allowing the base station to apply all the TCIs configured through the RRC signaling in real time may greatly increase implementation complexity of the terminal, the base station may transmit an activation message for some of the TCIs configured through the RRC signaling to the terminal through L2 signaling such as a MAC CE (S940). The base station may activate a maximum of N (<M) TCIs, and the terminal may receive a dynamic indication only for the activated TCI.

Thereafter, the base station may dynamically indicate to the terminal some of the activated N TCIs through L1 signaling such as a DCI (S950). The terminal may apply QCL information indicated by the corresponding TCI at a predetermined timing after receiving the L1 signaling, and may perform a reception operation for the signal or channel.

The TCI state indication steps including the 'RRC signaling (S930)', 'MAC CE signaling (S940)', and 'DCI signaling (S950)' of FIG. 9 may be partially omitted depending on a type of the QCL target RS. For example, when the QCL target is a PDSCH DMRS, and one or more TCI states are configured through RRC signaling, the base station may indicate the TCI state using all the steps of FIG. 9. However, when the QCL target is a PDSCH DMRS, and a single TCI state is configured through RRC signaling, the MAC CE signaling (S940) and the DCI signaling step (S950) may be omitted. Similarly, when the QCL target is a PDCCH DMRS, the DCI signaling step S940 may be omitted. Specifically, the terminal may obtain configuration information for the TCI states and QCL information with reference to the RRC signaling identical or similar to those shown in Table 11.

TABLE 11

```
TCI-State ::=         SEQUENCE { // TCI configuration (I.1-00)
  tci-StateId           // TCI state ID
  qcl-Type1             // first QCL reference configured by referring to QCL information
  qcl-Type2             // second QCL reference configured by referring to QCL information
  ...
}
QCL-Info ::=          SEQUENCE {
  cell                  // index of a cell in which QCL reference is transmitted
  bwp-Id                // index of a BWP in which QCL reference is transmitted
  referenceSignal         CHOICE {
    csi-rs              // index of a CSI-RS to be referred when QCL reference is a CSI-RS
    ssb                 // index of an SSB to be referred when QCL reference is an SSB
  },
  qcl-Type
    // QCL type to be applied to a QCL target (one of QCL-type A, QCL-type B, QCL-type C,
and QCL-type D)
  ...
}
```

The base station may instruct the terminal to activate or deactivate some of the TCI states configured by the RRC signaling through MAC CE signaling, or may instruct the terminal to apply a TCI state indicated by a MAC CE to the QCL target RS. For example, the base station may use the following MAC CE signaling according to the type of the QCL target RS.

TCI state activation/deactivation MAC CE for a UE-specific PDSCH DMRS

TCI state indication MAC CE for a UE-specific PDCCH DMRS

TCI state activation/deactivation MAC CE for an enhanced UE-specific PDSCH DMRS

FIG. 10 is a conceptual diagram illustrating an exemplary embodiment of a TCI state activation/deactivation MAC CE in a communication system.

Referring to FIG. 10, a first octet (Oct 1) in a TCI state activation/deactivation MAC CE for a UE-specific PDSCH DMRS may include a COREST pool ID field 1010, a serving cell ID field 1020, and a BWP ID field 1030, and a second octet (Oct 2) to an N-th octet (Oct N) may include $T_i$ fields 1040 indicating TCI state IDs i. The detailed meaning of each field may be as follows, and the sizes thereof may be variable.

Serving cell ID: a serving cell ID to which the MAC CE is applied

BWP ID: BWP ID to which the MAC CE is applied, which indicates a BWP in association with a BWP indication field within the DCI $T_i$: indicates a TCI state ID i. When this value is set to 0, it may mean that a TCI state whose TCI state ID is i is deactivated, and when this value is set to 1, it may mean that a TCI state whose TCI state ID is i is activated. The TCI states activated by 1 may be sequentially mapped to TCI indication field code points within the DCI.

CORESET pool ID: If a DCI scheduling a PDSCH is monitored in a CORESET that does not include a higher layer parameter coresetPoolIndex, the field may be ignored. If a DCI scheduling a PDSCH is monitored in a CORESET including the higher layer parameter coresetPoolIndex, $T_i$ indication may be applied only when a value of the CORESET pool ID matches a value of coresetPoolIndex of the CORESET.

Figure 11:
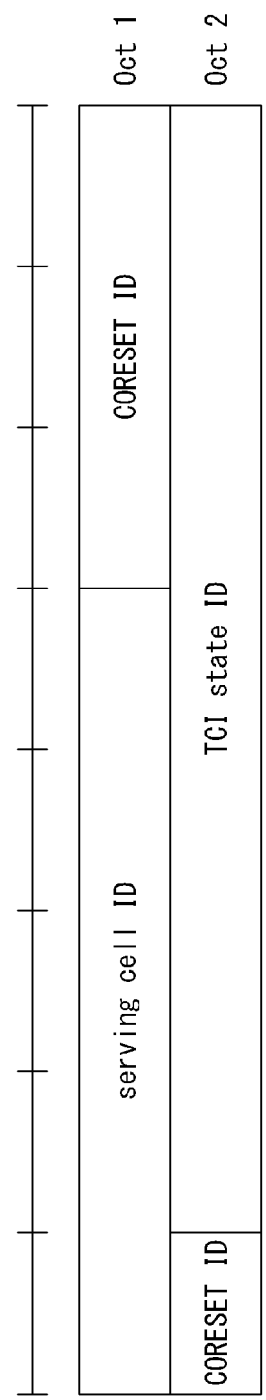
FIG. 11 is a conceptual diagram illustrating an exemplary embodiment of a TCI state indication MAC CE in a communication system.

FIG. 11 is a conceptual diagram illustrating an exemplary embodiment of a TCI state indication MAC CE in a communication system.

Referring to FIG. 11, a first octet (Oct 1) in a TCI state activation/deactivation MAC CE for a UE-specific PDSCH DMRS may include a serving cell ID field 1110 and a CORESET ID field 1120, and a second octet (Oct 2) may include a CORESET ID field 1130 and a TCI state ID field 1140. The sizes thereof may be variable.

Serving cell ID: a serving cell ID to which the corresponding MAC CE is applied.

CORESET ID: indicates a CORESET to which the MAC CE is applied. If this value is set to 0, a CORESET configured through controlResourceSetZero may be a CORESET #0.

TCI state ID: means a TCI state ID indicated by the corresponding MAC CE.

The base station may configure spatial relation information to the terminal through higher layer (e.g., RRC) signaling in order to indicate uplink beam information. The spatial relation information may mean a signaling structure for using spatial domain filters used for transmission and reception of a reference RS for spatial TX filters for uplink transmission of a target RS according to the corresponding spatial relation. The spatial reference RS may be a downlink signal such as SSB or CSI-RS, and may also be an uplink signal such as SRS. If the reference RS is a downlink signal, the terminal may use the spatial RX filter values used for receiving the reference RS as spatial TX filter values for transmitting the target RS according to the spatial relation. If the reference RS is an uplink signal, the terminal may use the spatial TX filter values used for transmitting the reference RS as the spatial TX filter values for transmitting the target RS according to the spatial relation.

The signaling structure for the spatial relation information may vary depending on the type of target RS. For example, when the target RS is an SRS, the base station may perform RRC configuration for each SRS resource based on message identical or similar to those shown in Table 12.

TABLE 12

```
SRS-SpatialRelationInfo ::=   SEQUENCE {
    servingCellId              // index of a serving cell in which a reference RS is transmitted
    referenceSignal               CHOICE {
        ssb-Index              // SSB index when a reference RS is SSB
        csi-RS-Index           // CSI-RS resource index when a reference RS is CSI-RS
        srs                       SEQUENCE {
            resourceId         // SRS resource index when a reference RS is SRS
            uplinkBWP          // index of a UL BWP in which SRS is transmitted when a reference RS is
SRS
        }
    }
}
```

For example, when the target RS is an SRS, the base station may perform RRC configuration for each SRS resource, identical or similar to those shown in Table 13.

TABLE 13

```
PUCCH-SpatialRelationInfo ::=      SEQUENCE {
    pucch-SpatialRelationInfoId    // spatial relation information ID for PUCCH
    servingCellId                  // index of a serving cell in which a reference RS is transmitted
    referenceSignal                   CHOICE {
        ssb-Index                  // SSB index when a reference RS is SSB
        csi-RS-Index               // CSI-RS resource index when a reference RS is CSI-RS
        srs                        // specifiy a SRS resource by referring to PUCCH-SRS configuration
    },
    pucch-PathlossReferenceRS-Id
        // index of a RS resource to be used for measurement of a pathloss of a PUCCH
    p0-PUCCH-Id   // index of confuring p0 for PUCCH power control
    closedLoopIndex   // configuration value of closed-loop power control
}
PUCCH-SRS ::= SEQUENCE {
    resource                       // SRS resource index
    uplinkBWP                      // index of a BWP in which SRS is transmitted
}
```

In the 5G NR communication system, a slot format may include downlink symbol(s), uplink symbol(s), and/or flexible symbol(s).

Figure 12:
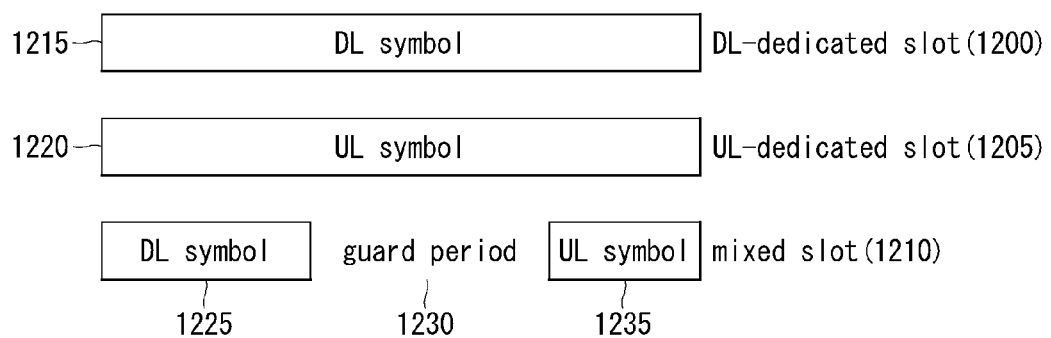
FIG. 12 is a conceptual diagram illustrating slot configurations according to slot formats in a communication system.

FIG. 12 is a conceptual diagram illustrating slot configurations according to slot formats in a communication system.

Referring to FIG. 12, in slot configurations according to slot formats in a communication system, a downlink dedicated slot 1200 may be a slot in which all symbols within the slot are configured only as downlink symbols 1215 according to a slot format. As another example, an uplink dedicated slot 1205 may be a slot in which all symbols within the slot are configured only as uplink symbols 1220 according to a slot format. As another example, in a downlink/uplink mixed slot 1210, some symbols within the slot may be configured as downlink symbols 1225, and some symbols within the slot may be configured as uplink symbols 1235 according to a slot format. In this case, specific symbols of the mixed slot 1210 including both the uplink and downlink symbols may be configured or indicated as a guard period 1230 for downlink-uplink switching, and the terminal may not perform transmission/reception during the guard period 1230.

In the 5G NR communication system, the base station may configure a 'slot format' over one or more slots for each serving cell to the terminal through a higher layer parameter tdd-UL-DL-ConfigurationCommon. In this case, the higher layer parameter tdd-UL-DL-ConfigurationCommon may include or refer to at least one of the following information.

- Reference subcarrier spacing: reference numerology $\mu_{ref}$
- Pattern 1: A first pattern.
- Pattern 2: A second pattern.

Here, the pattern 1 or pattern 2 may include at least one of the following configurations.

- Slot configuration periodicity (i.e., dl-UL-Transmission-Periodicity): Slot configuration periodicity P expressed in units of msec
- Number of downlink dedicated slots (i.e., nrofDownlinkSlots): The number $d_{slots}$ of slots composed only of downlink symbols
- Number of downlink symbols (i.e., nrofDownlinkSymbols): The number $d_{sym}$ of downlink symbols
- Number of uplink dedicated slots (i.e., nrofUplinkSlots): The number $\mu_{slots}$ of slots composed only of uplink symbols
- Number of uplink symbols (i.e., nrofUplinkSymbols): The number $u_{sym}$ of uplink symbols The slot configuration periodicity P msec of the first pattern may include $S=P \cdot 2^{\mu_{ref}}$ slots, and in this case, the numerology may follow $\mu_{ref}$. In addition, among the S slots, the first $d_{slots}$ slots may include only downlink symbols, and the last $\mu_{slots}$ slots may include only uplink symbols. In this case, $d_{sym}$ symbols after first $d_{slots}$ slots may be downlink symbols. In addition, $u_{sym}$ symbols before last $\mu_{slots}$ slots may be uplink symbols. The remaining symbols (i.e., $(S-d_{slots}-u_{slots}) \cdot N_{symb}^{slot}-d_{sym}-u_{sym}$ symbols) that are not designated as downlink symbols or uplink symbols in the pattern may be flexible symbols.

If the second pattern is configured and the slot configuration periodicity of the second pattern is $P_2$, a slot configuration periodicity $P+P_2$ msec configured with a combination of the first pattern and the second pattern may include first $S=P \cdot 2^{\mu_{ref}}$ slots and second $S_2=P_2 \cdot 2^{\mu_{ref}}$ slots. In this case, the positions and numbers of downlink symbols, uplink symbols, and flexible symbols in the second pattern may be configured with reference to the description of the first pattern based on configuration information of the second pattern. In addition, when the second pattern is configured, the terminal may assume that $P+P_2$ is a divisor of 20 msec.

The base station may override direction(s) of 'flexible symbol(s)' among symbols configured through the higher layer parameter tdd-UL-DL-ConfigurationCommon by using the higher layer parameter tdd-UL-DL-Configuration-Dedicated) based on the following information.

- Slot configuration set (i.e., slotSpecificConfigurationsToAddModList): A set of slot configurations
- Slot index (i.e., slotIndex): An index of a slot included in the set of slot configurations
- Symbol directions (i.e., symbols): The directions of the symbols indicated by the slot index (i.e., slotIndex). If all symbol directions are downlink (symbols=allDownlink), all symbols within the corresponding slot are downlink symbols. If all symbol directions are uplink (symbols=allUplink), all symbols within the corresponding slot are uplink symbols. If the symbol directions are explicit (symbols=explicit), nrofDownlinkSymbols may indicate the number of downlink symbols located in the first part of the corresponding slot, and nrofUplinkSymbols may indicate the number of uplink symbols located in the last part of the corresponding slot. If the nrofDownlinkSymbols or the nrofUplinkSymbols is omitted, the corresponding parameter may be regarded as indicating a value of 0. The remaining symbols within the slot become flexible symbols.

In the 5G communication system, the base station may indicate a slot format to the terminal based on L1 signaling. For example, when the terminal receives a higher layer parameter SlotFormatIndicator from the base station, the terminal may obtain configuration information a slot format indication-RNTI (i.e., SFI-RNTI). Meanwhile, when the terminal receives a higher layer parameter dci-PayloadSize from the base station, the terminal may obtain configuration information of a payload size of the DCI format 2_0. In addition, the terminal may additionally receive, from the base station, information on PDCCH candidate(s), CCE aggregation level, and search space set(s) of a CORESET for monitoring the DCI format 2_0. Each slot format indication (SFI) index field in the DCI format 2_0 may indicate a slot format to be applied to each slot in a slot set of a DL BWP and a UL BWP from a slot in which the terminal has detected the corresponding DCI format 2_0. In this case, the size of the slot set may be equal to or greater than a PDCCH monitoring periodicity of the DCI format 2_0. For example, when the slot set is composed of N slots, the DCI format 2_0 may include N SFI index fields, and each SFI index field may indicate a format value of Table 14 and Table 15 below. In Tables 14 and 15, 'D' may mean a downlink symbol, 'U' may mean an uplink symbol, and 'F' may mean a flexible symbol.

TABLE 14

| Slot for-mat | Symbol number within a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |

TABLE 14-continued

| Slot for-mat | Symbol number within a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 7 | D | D | D | D | D | D | D | D | D | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |
| 26 | D | D | F | F | F | F | F | F | F | F | F | U | U | U |
| 27 | D | D | D | F | F | F | F | F | F | F | F | U | U | U |
| 28 | D | D | D | D | D | D | D | D | D | D | D | D | F | U |
| 29 | D | D | D | D | D | D | D | D | D | D | D | F | F | U |
| 30 | D | D | D | D | D | D | D | D | D | D | F | F | F | U |
| 31 | D | D | D | D | D | D | D | D | D | D | D | F | U | U |
| 32 | D | D | D | D | D | D | D | D | D | F | F | F | U | U |
| 33 | D | D | D | D | D | D | D | D | F | F | F | U | U | U |
| 34 | D | F | U | U | U | U | U | U | U | U | U | U | U | U |
| 35 | D | D | F | U | U | U | U | U | U | U | U | U | U | U |
| 36 | D | D | D | F | U | U | U | U | U | U | U | U | U | U |
| 37 | D | F | F | U | U | U | U | U | U | U | U | U | U | U |
| 38 | D | D | F | F | U | U | U | U | U | U | U | U | U | U |
| 39 | D | D | D | F | F | U | U | U | U | U | U | U | U | U |

TABLE 15

| 40 | D | F | F | F | U | U | U | U | U | U | U | U | U | U |
|---|---|---|---|---|---|---|---|---|---|---|---|---|---|---|
| 41 | D | D | F | F | F | U | U | U | U | U | U | U | U | U |
| 42 | D | D | D | F | F | F | U | U | U | U | U | U | U | U |
| 43 | D | D | D | D | D | D | D | D | D | F | F | F | F | U |
| 44 | D | D | D | D | D | D | F | F | F | F | F | U | U | U |
| 45 | D | D | D | D | D | D | F | F | U | U | U | U | U | U |
| 46 | D | D | D | D | F | U | D | D | D | D | D | F | U | U |
| 47 | D | D | F | U | U | U | D | D | F | U | U | U | U | U |
| 48 | D | F | U | U | U | U | D | F | U | U | U | U | U | U |
| 49 | D | D | D | D | F | U | D | D | D | D | F | F | U | U |
| 50 | D | D | F | F | U | U | D | D | F | F | U | U | U | U |
| 51 | D | F | F | U | U | U | D | F | F | U | U | U | U | U |
| 52 | D | F | F | F | F | F | U | D | F | F | F | F | F | U |
| 53 | D | D | F | F | F | F | U | D | D | F | F | F | F | U |
| 54 | F | F | F | F | F | F | F | D | D | D | D | D | D | D |
| 55 | D | D | F | F | F | U | U | U | D | D | D | D | D | D |
| 56–254 | Reserved | | | | | | | | | | | | | |
| 255 | UE determines a slot format of a slot based on a higher layer parameter tdd-UL-DL-ConfigurationCommon or a higher layer parameter tdd-UL-DL-ConfigurationDedicated, and a detected DCI format (when exists). | | | | | | | | | | | | | |

In the 5G NR communication system, it may be possible to support flexible and dense wireless backhaul links for each cell through the IAB feature, without support of a wired network.

Figure 13:
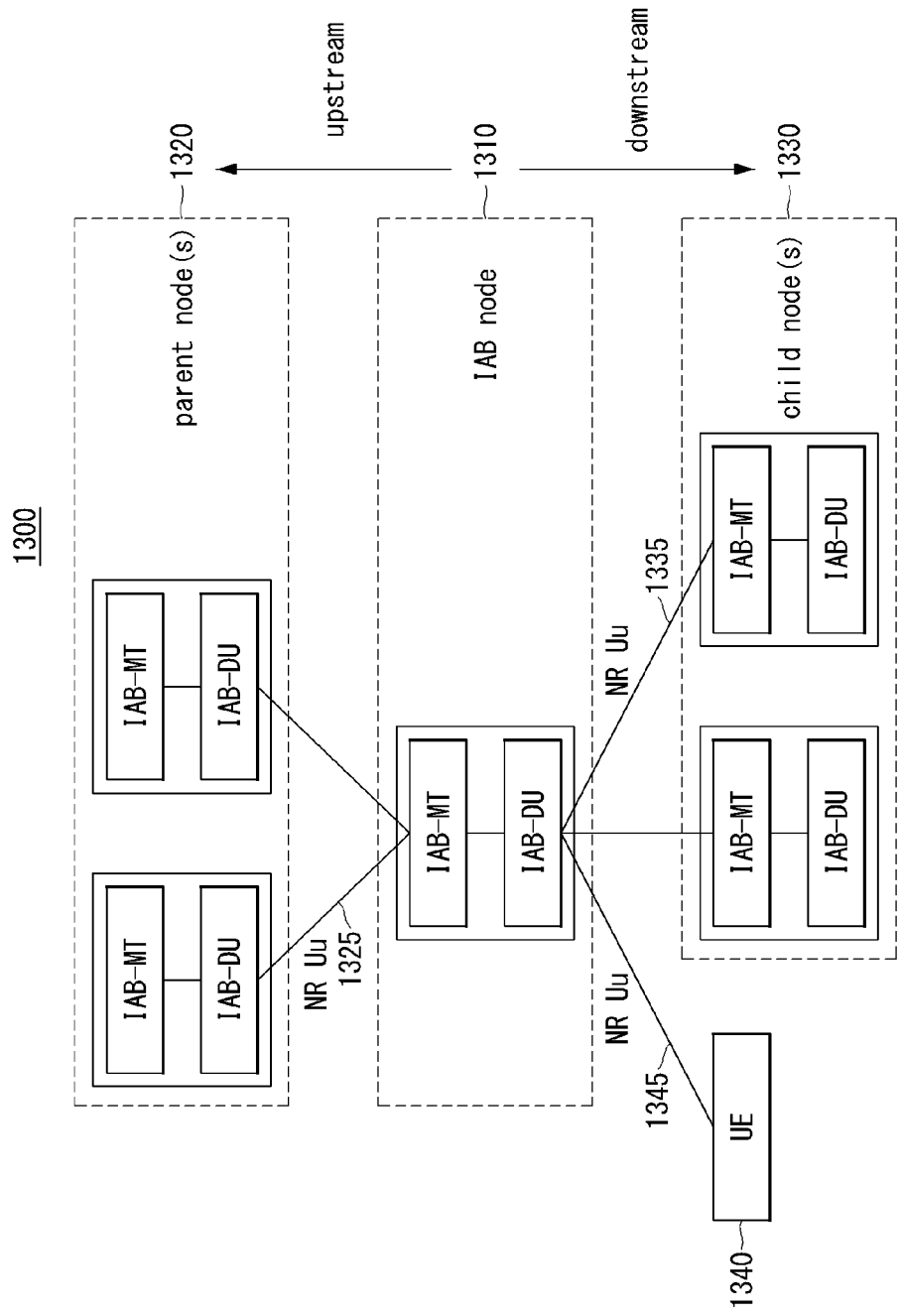
FIG. 13 is a conceptual diagram illustrating an exemplary embodiment of an IAB network in a communication system.

FIG. 13 is a conceptual diagram illustrating an exemplary embodiment of an IAB network in a communication system.

Referring to FIG. 13, a communication system 1300 may include one or more communication nodes. The communication nodes of the communication system 1300 may constitute an IAB network. For example, the communication system 1300 may include one or more IAB nodes. FIG. 13 shows an exemplary embodiment in which one IAB node communicates with one or more upper nodes and one or more lower nodes. However, this is only an example for convenience of description, and exemplary embodiments of the present disclosure are not limited thereto.

The communication system 1300 may include a plurality of IAB nodes. For example, the communication system 1300 may include a first IAB node 1310, one or more parent nodes 1320 corresponding to upper nodes of the first IAB node 1310, and/or one or more child nodes corresponding to lower nodes of the first IAB node 1310. Here, each of the one or more parent nodes 1320 may be referred to as a 'donor node'. The IAB node 1310, the one or more parent nodes 1320, and/or the one or more child nodes 1330 may constitute the IAB network. Each of the IAB nodes 1310, 1320, and 1330 constituting the IAB network may function as a type of repeater configured based on a front-haul structure. In the communication system 1300 to which the IAB network technology is applied, it is possible to support flexible and dense wireless backhaul links for each cell without support of a wired network.

Each of the IAB nodes 1310, 1320, and 1330 may include an IAB-DU and an IAB-MT. The IAB-MT may allow each IAB node to function as a terminal in communication with an upper node. For example, the first IAB node 1310 may communicate with the upper parent nodes 1320 through the IAB-MT. On the other hand, the IAB-DU may allow each IAB node to function as a base station or a cell in communication with a lower node. For example, the first IAB node 1310 may communicate with the lower child nodes 1330 or a terminal 1340 through the IAB-DU.

The IAB-MT of the first IAB node 1310 may be connected to the IAB-DUs of the parent nodes 1320 through Uu interfaces 1325. The IAB-DU of the first IAB node 1310 may be connected to the IAB-MTs of the child nodes 1330 through Uu interfaces 1335. The IAB-DU of the first IAB node 1310 may be connected to a terminal 1340 through a Uu interface 1345.

After the IAB node constituting the IAB network completely decodes a received signal, the IAB node may re-encode the decoded received signal, and amplify and transmit it. The IAB node may be classified as a type of regenerative relay. To this end, the IAB node may support a control plane (CP) and a user plane (UP) from the parent node to the terminal based on a protocol stack structure including the L1 and L2 layers, or higher layers.

The IAB node constituting the IAB network has an advantage of being able to perform various operations including operations as a base station and a terminal. On the other hand, the IAB node has disadvantages in that implementation complexity and production cost are relatively high, and a delay required for retransmission may be relatively large.

Figure 14:
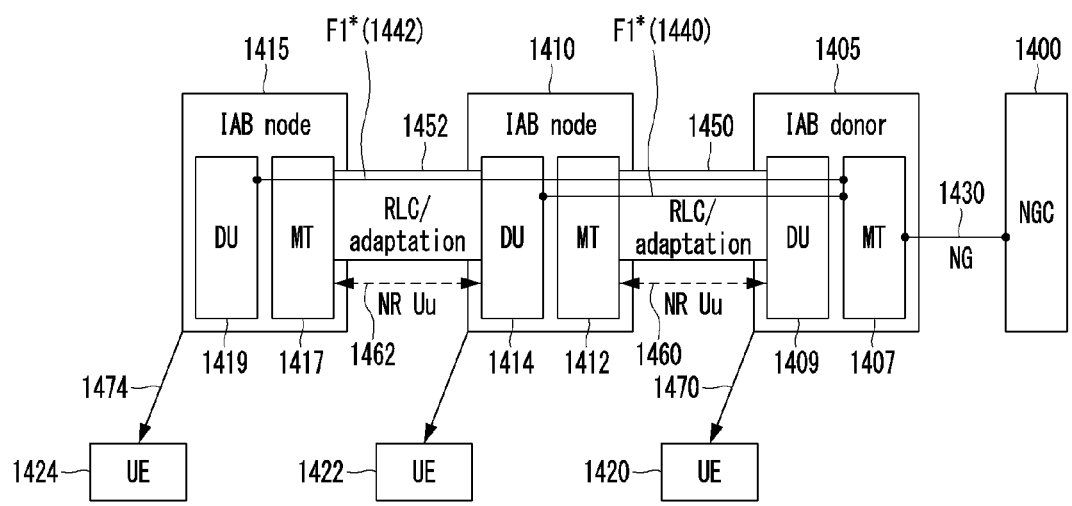
FIG. 14 is a block diagram illustrating an exemplary embodiment of a functional split structure of a central unit (CU) and a distributed unit (DU) in a communication system.

FIG. 14 is a block diagram illustrating an exemplary embodiment of a functional split structure of a central unit (CU) and a distributed unit (DU) in a communication system.

Referring to FIG. 14, in a CU-DU functional split structure in the IAB network, IAB nodes 1410 and 1415 in a two-hop chain are connected to an IAB donor 1405, and each of the IAB nodes 1410 and 1415 and terminals 1420, 1422, and 1424 may be connected to a next generation core (NGC) 1400 in a stand-alone (SA) mode. The IAB nodes 1410 and 1415 may include one DU and one MT, respectively. A certain IAB node (e.g., 1415) may be connected to the parent IAB node 1410 or the IAB donor 1405 via an MT 1417. As another example, a certain IAB node (e.g., 1410)

may establish a RLC channel with the MT 1417 of the child IAB node 1415 through a DU 1414. In this case, the RLC channels 1450 and 1452 established for the MTs 1412 and 1417 may additionally include some information for IAB operations in addition to the existing components of a RLC channel for a terminal. Accordingly, the RLC channels 1450 and 1452 may be collectively referred to as 'modified RLC* (RLC*)'.

One IAB node may be connected to DUs of one or more parent IAB nodes or IAB donors. In this case, the IAB node may include a plurality of DUs, but each DU of the IAB node may have an F1-C connection 1440 or 1442 with a single IAB donor CU-CP. Even if the IAB node has a plurality of UP connections, the IAB node may operate based on a single CP connection (i.e., the IAB node may operate by being connected to a single IAB donor), so that no confusion occurs in operations of the IAB node.

The IAB donor 1405 may include the DU for supporting MTs of terminals and child IAB nodes. The IAB donor 1405 may include the CU 1407 for DUs 1409, 1414, and 1419 of itself and all child IAB nodes. It may be assumed that a certain IAB donor has a single IAB donor, and an IAB donor that manages the corresponding IAB donor may be changed by a topology adaptation function. A DU of an IAB node may be connected to a CU of the corresponding IAB donor through an F1 interface or a modified F1 interface (modified F1, F1*) (e.g., 1440, 1442). F1*-user plane (U) may be operated on the RLC channels 1450 and 1452 between the corresponding IAB-MTs 1417 and 1412 and the DUs 1414 and 1409 of the parent IAB node or donor.

Hereinafter, for convenience of description, in the present disclosure, higher layer parameters or higher layer configurations may not be limited to the above-described L2 and L3 signaling, and may collectively include information transmitted or configured through the F1 interfaces 1440 and 1442, the NG interface 1430 for connecting the CU to the NGC, the X2 interface, and the like.

Although it may seem that the slot format configuration and indication methods described with reference to FIGS. 11 and 12 are limited to terminals performing communication with the base station, this is only an example for convenience of description, and exemplary embodiments of the present disclosure are not limited thereto. For example, the slot format configuration and indication methods described with reference to FIGS. 11 and 12 may be similarly applied to the case of IAB-DU and/or IAB-MT. For example, for each serving cell of the IAB-DU, the IAB-DU may receive a higher layer parameter IAB-DU-Resource-Configuration for IAB-DU resource configuration, thereby configuring a slot format in each slot set. On the other hand, the IAB-MT may receive configuration information of 'slot format' over one or more slots for each serving cell through a higher layer parameter tdd-UL-DL-ConfigurationDedicated-IAB-MT from at least one upper node of the IAB-MT. When the IAB-MT receives the higher layer parameter tdd-UL-DL-ConfigurationDedicated-IAB-MT, the received higher layer parameter may substitute the higher layer parameter tdd-UL-DL-ConfigurationDedicated in the above-described slot format configuration and indication method. Specifically, the higher layer parameter tdd-UL-DL-ConfigurationDedicated-IAB-MT may include the following information.

IAB-MT slot configuration set (i.e., slotSpecificConfigurationsToAddModList-IAB-MT): A set of slot configurations Slot index (i.e., slotIndex): Index of a slot included in the set of slot configurations IAB-MT symbol directions (i.e., symbols-IAB-MT): The direction of the slot indicated by the slot index.

If the IAB-MT symbol directions are all downlink (symbols-IAB-MT=allDownlink), all symbols within the corresponding slot are downlink symbols.

If the IAB-MT symbol directions are all uplink (symbols-IAB-MT=allUplink), all symbols within the corresponding slot are uplink symbols.

If the IAB-MT symbol directions are explicit (symbols-IAB-MT=explicit), the nrofDownlinkSymbols may indicate the number of downlink symbols located in the first part of the slot, and the nrofUplinkSymbols may indicate the number of uplink symbols located in the last part of the corresponding slot. If the nrofDownlinkSymbols or the nrofUplinkSymbols is omitted, the corresponding parameter may be regarded as indicating a value of 0. The remaining symbols within the slot become flexible symbols.

If the IAB-MT symbol directions are IAB-MT explicit (symbols-IAB-MT=explicit-IAB-MT), the nrofDownlinkSymbols may indicate the number of downlink symbols located in the first part of the slot, and the nrofUplinkSymbols may indicate the number of uplink symbols located in the last part of the corresponding slot. If the nrofDownlinkSymbols or the nrofUplinkSymbols is omitted, the corresponding parameter may be regarded as indicating a value of 0. The remaining symbols within the slot become flexible symbols.

Similarly to the above-mentioned normal terminal, the IAB-MT may also receive the DCI format 2_0, and through this, may receive configuration information of a slot format from the base station of the IAB-DU of the parent node. In the case of DCI format 2_0 received by the IAB-MT, candidate values of each SFI field may not be limited to the values shown in Table 14. For example, the candidate values of each SFI field of the DCI format 2_0 received by the IAB-MT may further include values shown in Table 16.

TABLE 16

| Slot for- | Symbol number within a slot | | | | | | | | | | | | | |
|---|---|---|---|---|---|---|---|---|---|---|---|---|---|---|
| mat | 0 | 1 | 2 | 3 | 4 | 5 | 6 | 7 | 8 | 9 | 10 | 11 | 12 | 13 |
| 56 | U | U | U | U | U | U | U | U | U | U | U | U | U | F |
| 57 | U | U | U | U | U | U | U | U | U | U | U | U | F | F |
| 58 | U | U | U | U | U | U | U | U | U | U | F | F | F | F |
| 59 | U | U | U | U | U | U | U | U | U | F | F | F | F | F |
| 60 | U | U | U | U | U | U | U | U | F | F | F | F | F | F |
| 61 | U | U | U | U | U | U | U | F | F | F | F | F | F | F |
| 62 | U | U | U | U | U | U | F | F | F | F | F | F | F | F |
| 63 | U | U | U | U | U | F | F | F | F | F | F | F | F | F |
| 64 | U | U | U | U | F | F | F | F | F | F | F | F | F | F |
| 65 | U | U | U | F | F | F | F | F | F | F | F | F | F | F |
| 66 | U | U | F | F | F | F | F | F | F | F | F | F | F | F |
| 67 | U | F | F | F | F | F | F | F | F | F | F | F | F | F |
| 68 | U | F | F | F | F | F | F | F | F | F | F | F | F | F |
| 69 | U | F | F | F | F | F | F | F | F | F | F | F | F | D |
| 70 | U | F | F | F | F | F | F | F | F | F | F | F | F | D |
| 71 | U | U | F | F | F | F | F | F | F | F | F | F | F | D |
| 72 | U | F | F | F | F | F | F | F | F | F | F | F | D | D |
| 73 | U | U | F | F | F | F | F | F | F | F | F | F | D | D |
| 74 | U | U | F | F | F | F | F | F | F | F | F | D | D | D |
| 75 | U | F | F | F | F | F | F | F | F | F | D | D | D | D |
| 76 | U | U | F | F | F | F | F | F | F | F | D | D | D | D |
| 77 | U | U | U | F | F | F | F | F | F | F | D | D | D | D |
| 78 | U | U | U | U | U | U | U | U | U | U | U | U | F | D |
| 79 | U | U | U | U | U | U | U | U | U | U | U | F | F | D |
| 80 | U | U | U | U | U | U | U | U | U | U | F | F | F | D |
| 81 | U | U | U | U | U | U | U | U | U | U | F | D | D | D |
| 82 | U | U | U | U | U | U | U | U | U | F | F | D | D | D |

TABLE 16-continued

| Slot format | Symbol number within a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 83 | U | U | U | U | U | U | U | U | F | F | F | D | D |
| 84 | U | F | D | D | D | D | D | D | D | D | D | D | D | D |
| 85 | U | U | F | D | D | D | D | D | D | D | D | D | D | D |
| 86 | U | U | U | F | D | D | D | D | D | D | D | D | D | D |
| 87 | U | F | F | D | D | D | D | D | D | D | D | D | D | D |
| 88 | U | U | F | F | D | D | D | D | D | D | D | D | D | D |
| 89 | U | U | U | F | F | D | D | D | D | D | D | D | D | D |
| 90 | U | F | F | F | D | D | D | D | D | D | D | D | D | D |
| 91 | U | U | F | F | F | D | D | D | D | D | D | D | D | D |
| 92 | U | U | U | F | F | F | D | D | D | D | D | D | D | D |
| 93 | U | U | U | U | U | U | U | U | F | F | F | F | D |
| 94 | U | U | U | U | U | F | F | F | F | F | F | D | D |
| 95 | U | U | U | U | U | F | F | D | D | D | D | D | D |
| 96 | U | U | U | U | U | U | D | D | D | D | D | D | D |

The IAB-MT may receive information on symbols not to be used by the IAB-MT for a certain serving cell through a higher layer parameter (e.g., Provided Guard Symbols MAC CE). The IAB-MT may perform a transition (i.e., operation change) between the IAB-MT and the IAB-DU of the IAB node during a time period including the symbols not used by the IAB-MT. The base station may signal a numerology for the symbols to the terminal through a higher layer parameter (e.g., Provided Guard Symbols MAC CE).

In a cell of a certain IAB-DU, a symbol within a slot may be configured as one of three types: 'hard', 'soft', and 'unavailable (or not-available)' (HSNA).

If a certain downlink, uplink, or flexible symbol is configured as the hard type, the cell of the IAB-DU may perform a signal transmit and/or reception operation in the corresponding symbol. This may mean that the fact that a certain symbol is configured as the hard type guarantees the reflection of the downlink, uplink, or flexible symbol configuration of the IAB-DU for the corresponding symbol.

Specifically, in an exemplary embodiment of the communication system, an F1 application protocol (F1AP) signaling as shown in Table 16 may be provided, and the upper IAB node (e.g., IAB donor, parent node, core network, etc.) may configure a DU resource type of the lower IAB node (e.g., IAB node, child node). Referring to Table 17, information of the DU resource type may include one HSNA slot configuration list consisting of one or more HSNA slot configurations. In this case, one HSNA slot configuration list may include HSNA slot configurations according to the maximum number of HSNAs (e.g., maxnoofHSNA). The n-th HSNA slot configuration included in the HSNA slot configuration list may include information on whether to apply the hard type, soft type, or not-available type to each of downlink symbols, uplink symbols, and flexible symbols of the n-th slot according to an application periodicity and a starting time of the HSNA slot configuration list.

TABLE 17

| IE/group name | range | IE type and reference | liminality |
|---|---|---|---|
| HSNA slot configuration list | 0 . . . 1 | | |
| >HSNA slot configuration item | 1 . . . <maxnoofHSNASlots> | | |
| >>HSNA (Downlink) | | Enumerated (H, S, NA) | HSNA value for a downlink symbol of a slot |
| >>HSNA (Uplink) | | Enumerated (H, S, NA) | HSNA value for a uplink symbol of a slot |
| >>HSNA (Flexible) | | Enumerated (H, S, NA) | HSNA value for a flexible symbol of a slot |

If a certain downlink, uplink, or flexible symbol is configured as the soft type, the IAB-DU cell may perform a signal transmission and reception operation in the symbol when at least one of the following conditions is satisfied.

Condition 1: The IAB-MT (co-located/associated with the IAB-DU) does not perform transmission or reception in the corresponding symbol.

Condition 2: The IAB-MT (co-located/associated with the IAB-DU) can perform transmission or reception in the corresponding symbol, but the transmission/reception operation of the IAB-MT does not change due to the use of the symbol at the IAB-DU.

Condition 3: The IAB-MT (co-located/associated with the IAB-DU) receives a DCI format 2_5 indicating the corresponding soft symbols as 'available'.

If a certain downlink, uplink, or flexible symbol is configured as the 'unavailable (or not-available (NA)) type', the IAB-DU (i.e., cell) may not perform transmission or reception in the symbol.

If the IAB-DU transmits one of a cell-specific, periodic, or semi-static signal or channel included in the following list in symbol(s) of a certain slot, the IAB-DU may perform a transmission/reception operation by assuming that the corresponding symbol(s) in the corresponding slot are configured as the hard type regardless of the configured resource type.

SS/PBCH block, CSS set for a type0-PDCCH configured by a system information block 1 (SIB1) for PDCCH configuration (i.e., PDCCHs for a type0-PDCCH CSS sets configured by pdcchConfigSIB1), periodic CSI-RS, and/or the like If the IAB-DU receives one of a cell-specific, periodic, or semi-static signal or channel included in the following list in symbol(s) of a certain slot, the IAB-DU may perform a transmission/reception operation by assuming that the corresponding symbol(s) in the corresponding slot are configured as the hard type regardless of the configured resource type.

PRACH, scheduling request (SR)

Following information may be configured for each cell in the set of cells of the IAB-DU.

IAB-DU cell identifier (i.e., iabDuCellId-AI): Identifier of the IAB-DU cell

AI position within DCI format (i.e., positionInDCI-AI): Position of an availability identifier (AI) index field within the DCI format 2_5.

Availability combinations (i.e., avadabilityCombinations): includes a list of the following two pieces of information for availability combinations.

Resource availability (i.e., resourceAvailability): indicates resource availability for soft symbols included in one or more slots of the IAB-DU cell. The availability of soft symbols within one slot may be determined by referring to values in Table 17.

Availability combination identifier (i.e., avadabilityCombinationId): indicates a mapping between the resource availability (i.e., resourceAvailability) and the AI index field in the DCI format 2_5.

As described above, in the DCI format 2_5, one AI index field may indicate to the IAB-DU the availability of soft symbols included in each slot in a certain slot set. In this case, the slot set may start from the earliest slot among the slots of the IAB-DU overlapping in the time axis with the slot in which the IAB-MT detects the corresponding DCI format 2_5. In addition, the size of the slot set may be greater than or equal to a PDCCH monitoring periodicity of the DCI format 2_5 given from a higher layer parameter SearchSpace. The AI index field of the DCI format 2_5 may include max {⌈log$_2$ (maxAIindex)⌉,1} bits and may be mapped to one of the values of Table 18. In this case, the maximum value of the AI index (i.e., maxAIindex) may mean a maximum value among the provided availability combination identifiers (i.e., availabilityCombinationId). Table 18 may indicate a mapping relationship between the resource availability value and the soft symbol type within one slot.

TABLE 18

| Value | Indication |
| --- | --- |
| 0 | No indication of availability for soft symbols |
| 1 | Indicates that downlink symbols are available. No indication of availability for uplink and flexible soft symbols |
| 2 | Indicates that uplink symbols are available. No indication of availability for downlink and flexible soft symbols |
| 3 | Indicates that downlink and uplink soft symbols are available. No indication of availability for flexible soft symbols |
| 4 | Indicates that flexible soft symbols are available. No indication of availability for downlink and uplink soft symbols |
| 5 | Indicates that downlink and flexible soft symbols are available. No indication of availability for uplink soft symbols |
| 6 | Indicates that uplink and flexible soft symbols are available. No indication of availability for downlink soft symbols |
| 7 | Indicates that downlink, uplink, and flexible soft symbols are available |

As described above, the upper IAB node including the IAB donor may indicate whether the lower IAB node uses the soft symbols based on the DCI format 2_5 and the contents of Table 17. On the other hand, such the function may be designed assuming that the IAB node operates in a half-duplex manner. In other words, such the function may be designed mainly assuming that the MT and DU of the IAB node operate in a time division multiplexing (TDM) scheme or time division duplexing (TDD) scheme.

In an exemplary embodiment of the communication system, the F1AP signaling as shown in Table 19 may be used. Through this, the IAB node may report or deliver, to the upper IAB node (e.g., IAB donor or parent node), multiplexing information on a multiplexing capability between the IAB-DU of the IAB node (or, cell of a gNB-DU) and the IAB-MT of the IAB node (or, a cell configured in a co-located IAB-MT). Referring to Table 19, the multiplexing information may include one IAB-MT cell list composed of information on one or more IAB-MT cells. In this case, one IAB-MT cell list may include IAB-MT cell information according to the maximum number of serving cells (i.e., maxnoofServingCells). The n-th IAB-MT cell information included in the IAB-MT cell list may include a NR cell identity (ID) information of the corresponding cell and information on whether the following four types of multiplexing are supported.

DU_RX/MT_RX multiplexing: informs whether the IAB node supports simultaneous receptions in the DU and the MT DU_TX/MT_TX multiplexing: informs whether the IAB node supports simultaneous transmissions in the DU and the MT DU_TX/MT_RX multiplexing: informs whether the IAB node can simultaneously perform transmission in the DU and reception in the MT DU_RX/MT_TX multiplexing: informs whether the IAB node can simultaneously perform reception in the DU and transmission in the MT

TABLE 19

| IE/ group name | range | IE type and reference | liminality |
| --- | --- | --- | --- |
| >IAB-MT cell list | 1 | | |
| >IAB-MT cell item | 1 ... <maxnoofServingCells> | | |
| >>NR cell identity | | Bit string (size: 36) | Identity of a serving cell configured for a co-located IAB-MT |
| >>DU_RX/ MT_RX | | Enumerated (supported, not-supported) | Indicates whether the IAB node supports simultaneous receptions in DU and MT |
| >>DU_TX/ MT_TX | | Enumerated (supported, not-supported) | Indicates whether the IAB node supports simultaneous transmissions in DU and MT |
| >>DU_TX/ MT_RX | | Enumerated (supported, not-supported) | Indicates whether the IAB node simultaneously supports transmission in DU and reception in MT |
| >>DU_RX/ MT_TX | | Enumerated (supported, not-supported) | Indicates whether the IAB node simultaneously supports reception in DU and transmission in MT |

According to Table 19, the IAB node may semi-statically report the DU/MT multiplexing capability or whether to support the DU/MT simultaneous operations for each cell, but whether the IAB node supports the DU/MT simultaneous operations may depend entirely on the corresponding IAB node itself. The upper IAB node may not support controlling the DU/MT simultaneous operations of the lower IAB node dynamically or semi-statically depending on a situation.

Figure 15:
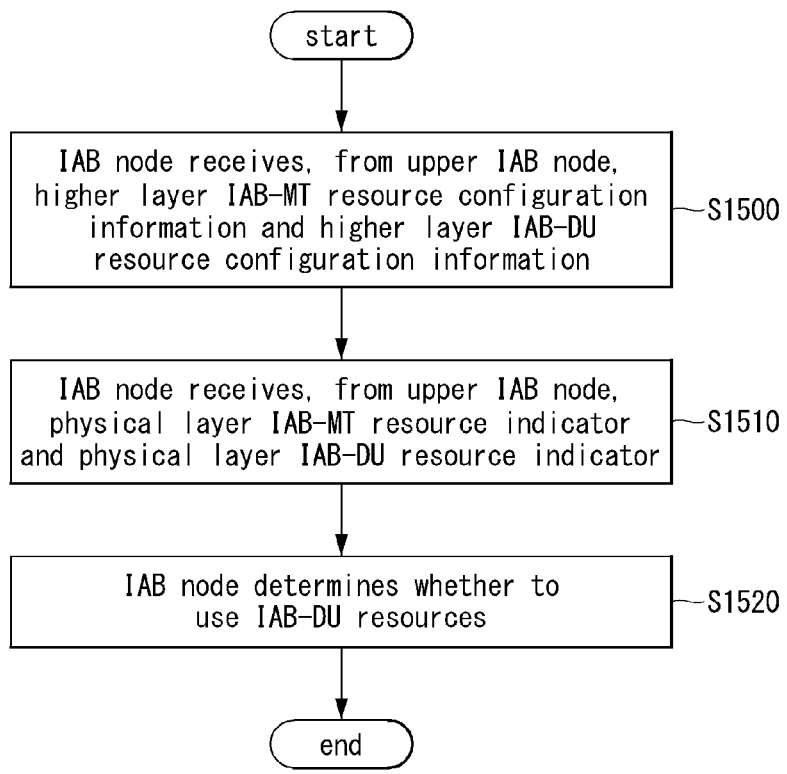
FIG. 15 is a flowchart illustrating a first exemplary embodiment of a method for resource management of an IAB node in a communication system.

FIG. 15 is a flowchart illustrating a first exemplary embodiment of a method for resource management of an IAB node in a communication system.

FIG. 15 shows a first exemplary embodiment of the method for resource management of an IAB node by taking the operation of the IAB node determining whether to use the IAB-DU resources as an example. However, this is only an example for convenience of description, and exemplary embodiments of the present disclosure are not limited thereto. For example, in the present disclosure, configurations described for 'whether to use IAB-DU resources' may be applied similarly or identically also to 'whether to use IAB node resources', 'whether to use IAB-MT resources', 'whether to use DU/MT simultaneous operation resources', and the like.

Referring to FIG. 15, in the order of determining whether to use the IAB-DU resources of the IAB node, the IAB node may identify whether the corresponding IAB-DU resources are available, and in order to determine whether to use the IAB-DU resources, may receive, from the upper IAB node, at least one of higher layer IAB-MT resource configuration information and higher layer IAB-DU resource configuration information (S1500). As an example, the higher layer IAB-MT resource configuration information may include slot configuration (i.e., downlink/uplink/flexible (DUF)) information and symbol configuration information for a cell (or cell group) of the IAB-MT. As another example, the higher layer IAB-DU resource configuration information may include slot configuration (i.e., downlink/uplink/flexible (DUF)) information and symbol configuration information for a cell (or cell group) of the IAB-DU.

The higher layer IAB-DU resource configuration information may include type (i.e., hard, soft, or not-available) information of the IAB-DU resources configured by the upper IAB node. The higher layer IAB-DU resource configuration information may include a part or all of cell-specific/semi-static downlink signals and channels such as SSB(s), type 0-PDCCH CSS set configured by a SIB1 for PDCCH configuration, CSI-RS, etc. configured in a cell (or cell group) configured to the IAB-DU. The higher layer IAB-DU resource configuration information may include a part or all of cell-specific/semi-static downlink signals and channels such as PRACH, SR, etc. configured in a cell (or cell group) configured to the IAB-DU.

In addition to the above-described higher layer configuration, the IAB node may receive at least one of a physical layer (L1 signaling) IAB-MT resource indicator and a physical layer IAB-DU resource indicator from the upper IAB node (S1510). As an example, the physical layer IAB-MT resource indicator may be a DCI format 2_0 including a slot format indicator for a cell (or a set of cells) which is configured to the IAB-MT. As another example, the physical layer IAB-DU resource indicator may be a DCI format 2_5 including a soft resource AI of the IAB-DU.

Finally, the IAB node may finally determine whether to use the IAB-DU resources based on the higher layer signaling (S1500) and the L1 signaling (S1510) (S1520).

Meanwhile, in general, it may not be possible to force all terminals to implement the same feature. The UE capability report may enable an expensive terminal to implement a large amount of features with high performance, and may enable a low-cost terminal to implement a small amount of features with low performance. The UE capability report may make it possible to secure the degree of freedom in terminal implementation for various situations, and when the capability information is reported to the network, the base station may configure each function within the limits supported by each terminal. Certain functions may be promised to be mandatory for all terminals to implement, and in this case, it may be possible to omit the UE capability report for the mandatory functions.

It may be possible for the terminal to perform UE capability reporting of different values for one function for each frequency band or for each duplex scheme. For example, the terminal may support a specific function for a frequency range 1 (FR1), which means a band below 6 GHz, but may report to the base station that the terminal does not support a specific function for a frequency range 2 (FR2), which means a band above 6 GHz. As another example, the terminal may report to the base station that a specific function is supported in the TDD scheme but not supported in the FDD scheme.

When the terminal performs the UE capability reporting, the base station should follow (should not violate) the content of the UE capability report when perform configuration, indication, or scheduling on the terminal. If the base station indicates, to the terminal, configuration, indication or scheduling contrary to the UE capability report, the terminal may ignore it.

Figure 16:
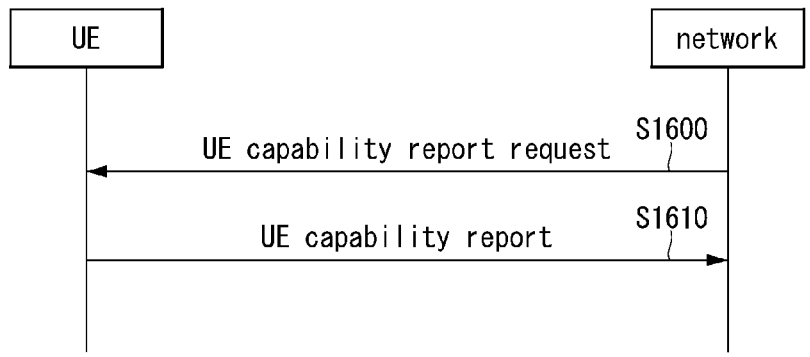
FIG. 16 is a flowchart illustrating an exemplary embodiment of a UE capability reporting procedure in a communication system.

FIG. 16 is a flowchart illustrating an exemplary embodiment of a UE capability reporting procedure in a communication system.

Referring to FIG. 16, in the UE capability reporting procedure, the base station may transmit a UE capability report request signal to the terminal through a higher layer parameter UECapabilityEnquiry when the terminal is in RRC connected mode (i.e., RRC_CONNECTED state) (S1600). In this case, the network may refer to only the UE capability report after access stratum (AS) security activation, and may not retransmit or report the UE capability report before the AS security activation to the core network (CN). Upon receiving the UE capability report request signal, the terminal may compile UE capability information according to a specific procedure, and report it to the base station through a UE capability information signal (e.g., UECapabilityInformation) (S1610).

The specific procedure for compiling the UE capability information signal may include a procedure of generating at least one of a list (i.e., supportedBandCombinationList) of band(s) or band combination(s) (BC(s)) supported by the terminal, feature set (FS) information related to feature sets supported by the terminal, or feature set combination (FSC) information related to feature set combinations supported by the terminal. For example, when the base station requests a UE capability report from the terminal in order to obtain information on band(s) or band combination(s) supported by the terminal, the terminal may report which band(s) it supports for each radio access technology (RAT). To this end, the base station may set a RAT-type in a UE RAT capability report request signal (e.g., UE-CapabilityRAT-Request), which is included in a UE RAT capability report request list signal (e.g., ue-CapabilityRAT-RequestList) that is a higher layer message, to one of 'nr', 'eutra-nr', 'eutra', and 'eutra-fdd'. This may mean that the base station may request a UE capability report for one or more RATs or RAT combinations from the terminal, and in this case, the terminal may respond to each request for a list of support bands for a plurality of RATs or RAT combinations. For example, if the RAT-type is set to 'nr', the terminal may include a list of bands or band combinations to which NR-DC can be applied in the UE capability report. As another example, if the RAT-type is set to 'eutra-nr', the terminal may include a list of bands or band combinations applicable to multi-RAT DC (MR-DC) such as EN-DC, NGEN-DC, NE-DC, or the like in the UE capability report. In addition, when the base station requests a UE capability report, the base station may provide, to the terminal, a list of bands for which the terminal determines whether support is provided, through a higher layer parameter frequencyBandListFilter. For the bands included in the higher layer parameter frequencyBandListFilter, the terminal may determine a candidate band combination by considering 'predetermined RAT types supported for each band', 'information on RAT-types requested by the base station', etc., and may include the candidate band combination in the UE capability report.

Figure 17A:
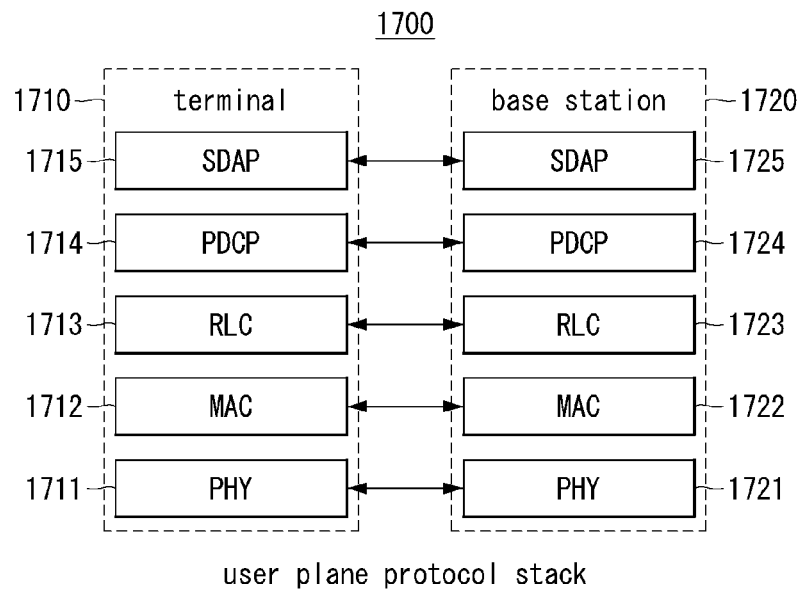
FIGS. 17A and 17B are conceptual diagrams for describing a first exemplary embodiment of a user plane protocol stack structure and a control plane protocol stack structure in a communication system.
Figure 17B:
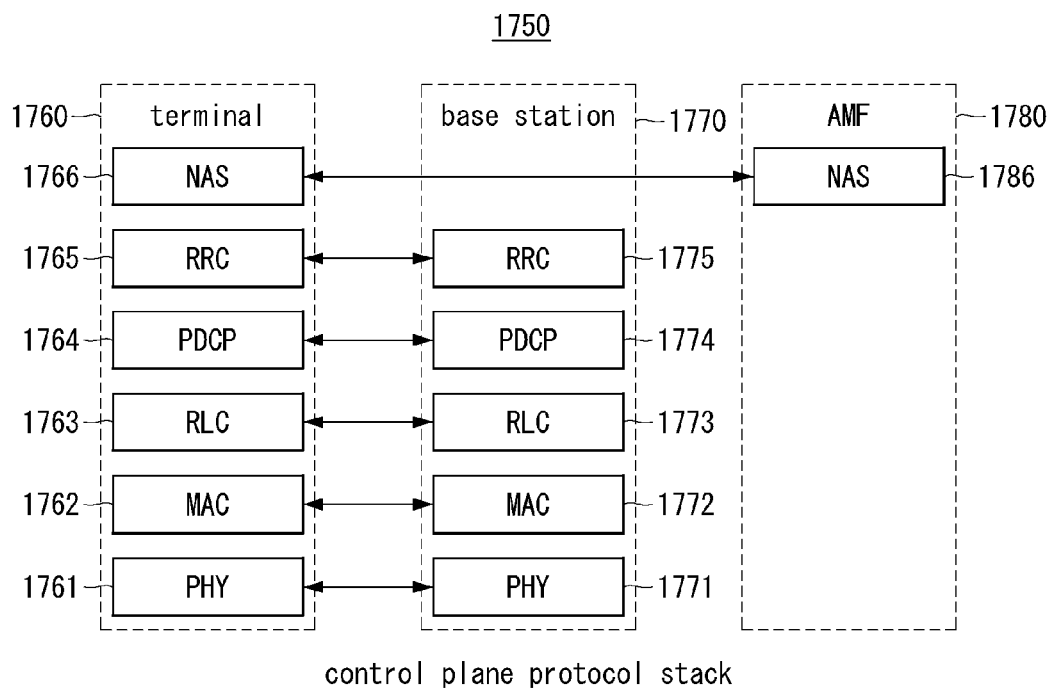

FIGS. 17A and 17B are conceptual diagrams for describing a first exemplary embodiment of a user plane protocol stack structure and a control plane protocol stack structure in a communication system.

Referring to FIGS. 17A and 17B, a radio interface protocol stack or radio interface protocol stack structures 1700 and 1750 may be defined in a radio connection section between communication nodes. For example, the radio interface protocol stack may be divided into a physical layer, a data link layer, a network layer, and the like, which are vertically configured.

The radio interface protocol stack may be divided into the user plane protocol stack 1700 and the control plane protocol stack 1750. Here, the control plane may be a plane for transmitting a control signal. The control signal may be referred to as a signaling signal. The user plane may be a plane for transmitting user data.

Referring to FIG. 17A, the communication system may include a terminal 1710 and a base station 1720. The terminal 1710 may be referred to as a user equipment (UE). The base station 1720 may correspond to an eNB, a gNB, or the like. The terminal 1710 and the base station 1720 may perform mutual data signal transmission/reception based on the user plane protocol stack structure 1700 shown in FIG. 17A.

In the user plane air interface protocol stack structure 1700 of the communication system, the terminal 1710 and the base station 1720 may include PHY layers 1711 and 1721 included in L1, MAC layers 1712 and 1722, RLC layers 1713 and 1723, and packet data convergence protocol (PDCP) layers 1714 and 1724 included in L2, service data adaptation protocol (SDAP) layers 1715 and 1725 included in L3, and the like.

Referring to FIG. 17B, the communication system may include a terminal 1760 and a base station 1770. The terminal 1760 and the base station 1770 may perform mutual control signal transmission/reception based on the control plane protocol stack structure 1750 shown in FIG. 17B.

In the control plane protocol stack structure 1750 of the communication system, the terminal 1760 and the base station 1770 may include PHY layers 1761 and 1771 included in L1, MAC layers 1762 and 1772, RLC layers 1763 and 1773, and PDCP layers 1764 and 1774 included in L2, and RRC layers 1765 and 1775 included in L3, and the like.

The communication system may further include an Access and Management Mobility Function (AMF) 1780. In the control plane protocol stack structure 1750, the terminal 1760 and the AMF 1780 may include non-access stratum (NAS) layers 1766 and 1786. The base station 1770 may not include a NAS layer. In other words, in the control plane protocol stack structure 1750, the NAS layer of the base station 1770 may be transparent.

Figure 18A:
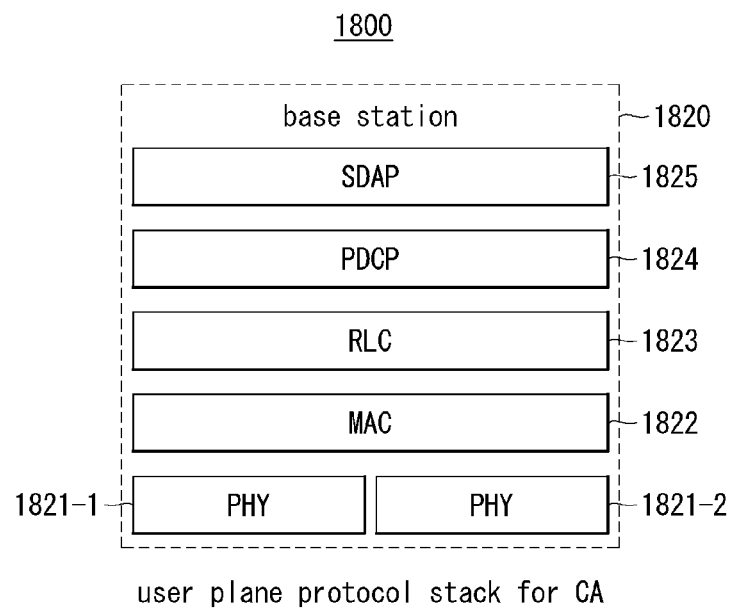
FIGS. 18A and 18B are conceptual diagrams for describing a second exemplary embodiment of a user plane protocol structure in a communication system.
Figure 18B:
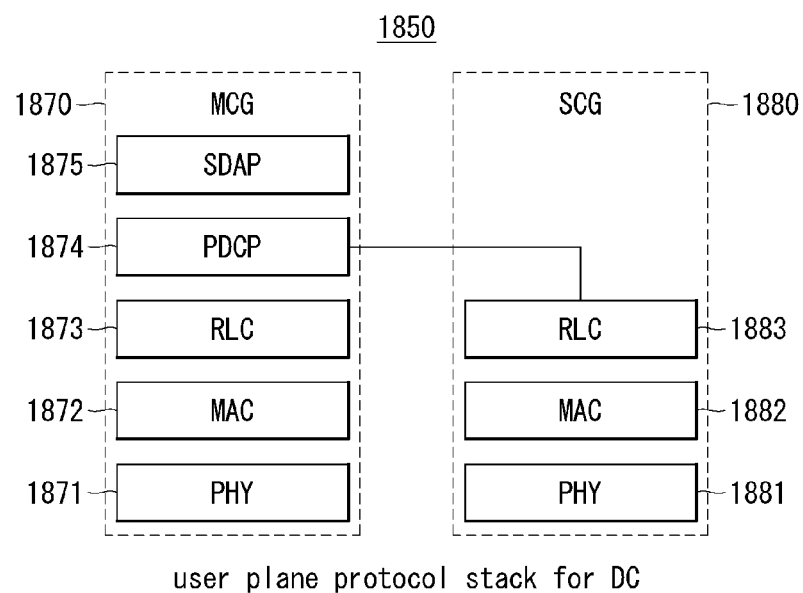

FIGS. 18A and 18B are conceptual diagrams for describing a second exemplary embodiment of a user plane protocol structure in a communication system.

Referring to FIGS. 18A and 18B, a radio interface protocol stacks or radio interface protocol stack structures 1800 and 1850 may be defined in a radio connection section between communication nodes. For example, in the radio connection section between communication nodes, the user plane protocol stack structure 1800 for carrier aggregation (CA) may be defined. Alternatively, in the radio connection section between communication nodes, the user plane protocol stack structure 1850 for dual connectivity (DC) may be defined.

Referring to FIG. 18A, the communication system may include a base station 1820. The base station 1820 may correspond to an eNB, a gNB, or the like. The base station 1820 may perform CA-based data communications with a lower node, such as a terminal, based on the user plane protocol stack structure 1800 for CA shown in FIG. 18A. In the user plane radio interface protocol stack structure 1800 for CA, the base station 1820 may include a plurality of PHY layers 1821-1 and 1821-2 included in L1, a MAC layer 1822, RLC layer 1823, and PDCP layer 1824 included in L2, and an SDAP layer 1825 included in L3, and the like.

Referring to FIG. 18B, the communication system may include a master cell group (MCG 1870) and a secondary cell group (SCG) 1880. A cell or base station of the MCG 1870 and SCG 1880 may configure a DC with a lower node such as a terminal based on the user plane protocol stack structure 1850 for DC. In the user plane radio interface protocol stack structure 1850 for DC, the cell or base station of the MCG 1870 may include a PHY layer 1871 included in L1, a MAC layer 1872, RLC layer 1873, and PDCP layer 1874 included in L2, a SDAP layer 1875 included in L3, and the like. Meanwhile, the cell or base station of the SCG 1880 may include a PHY layer 1881 included in L1, a MAC layer 1882 and RLC layer 1883 included in L2, and the like.

An exemplary embodiment of the communication system supporting 5G wireless communication may support the following various DC types.

EUTRA-NR DC (EN-DC): DC in which the MCG is configured based on 4G Evolved Universal Terrestrial Radio Access (E-UTRA), and the SCG is configured based on the 5G NR. Here, a control plane of the MCG may be configured through a 4G core (i.e., Evolved Packet Core (EPC)).

Next Generation-RAN E-UTRA-NR DC (NGEN-DC): DC in which the MCG is configured based on the E-UTRA and the SCG is configured based on the NR. In this case, a control plane of the MCG may be configured through a 5G core (i.e., Next Generation Core (NGC)).

NR-EUTRA DC (NE-DC): DC in which the MCG is configured based on the NR and the SCG is configured based on the E-UTRA NR DC: DC in which both the MCG and the SCG are configured based on the NR The base station may perform DC-related configuration for the terminal (i.e., UE, MT, etc.) using one or more higher layer parameters. For example, higher layer parameters used by the base station for the DC-related configuration may include at least some of CellGroupConfig, SpCellConfig, ReconfigurationWithSync, and SCellConfig. The higher layer parameter CellGroupConfig may be the same as or similar to that shown in Table 20.

TABLE 20

| | |
|---|---|
| CellGroupConfig ::= | SEQUENCE { |
| cellGroupId | // cell group ID. 0 indicates MCG, and a value of 1 or more indicates SCG |
| rlc-BearerToAddModList | //configure a relation list of MAC logical channel, RLC entity, and radio bearer |
| rlc-BearerToReleaseList | //release a relation list of MAC logical channel, RLC entity, and radio bearer |
| mac-CellGroupConfig | //MAC parameters applicable to the corresponding cell group |
| physicalCellGroupConfig | //configuration of common PHY layer parameters such as HARQ, power control, etc. within a cell group |
| spCellConfig | //configure a SpCell of a cell group by referring to SpCellConfig |
| sCellToAddModList | //configure a list of SCells included in a cell group by referring to SCellConfig |
| sCellToReleaseList | //exclude the Scell from a cell group by referring to SCellIndex |
| ..., | |
| [[ | |
| reportUplinkTxDirectCurrent | //configure whether a UE reports a uplink DC position |
| ]], | |
| [[ | |
| bap-Address-r16 | //configure a backhal adaptation protocol (BAP) address of a parent node in a cell group |
| bh-RLC-ChannelToAddModList-r16 | //configure backhaul RLC entities and a list of corresponding MAC logical channels |
| bh-RLC-ChannelToReleaseList-r16 | //release backhaul RLC entities and a list of corresponding MAC logical channels |
| f1c-TransferPath-r16 | //configure a F1-C transfer path to be used by EN-DC IAB-MT |
| simultaneousTCI-UpdateList1-r16 | //a list 1 of serving cells for which TCI updata can be simultaneously performed through a single MAC CE (corresponding to coresetPoolIndex =0, i.e., corresponding to serving cells of a first TRP for which TCI update can be simultaneouly performed) |
| simultaneousTCI-UpdateList2-r16 | //a list 2 of serving cells for which TCI updata can be simultaneously performed through a single MAC CE (corresponding to coresetPoolIndex =0, i.e., corresponding to serving cells of a first TRP for which TCI update can be simultaneouly performed) |
| simultaneousSpatial-UpdatedList1-r16 | //a list 1 of serving cells for which spatial relation update can be simultaneously performed through a single MAC CE (corresponding to coresetPoolIndex =0, i.e., corresponding to serving cells of a first TRP for which spatial relation update can be simultaneouly performed) |
| simultaneousSpatial-UpdatedList2-r16 | //a list 2 of serving cells for which spatial relation update can be simultaneously performed through a single MAC CE (corresponding to coresetPoolIndex =0, i.e., corresponding to serving cells of a first TRP for which spatial relation update can be simultaneouly performed) |
| uplinkTxSwitchingOption-r16 | //configure a UL TX switching option for inter-band UL CA or (NG)EN-DC |
| uplinkTxSwitchingPowerBoosting-r16 | //configure whether a UE can perform 3dB power boosting for a second carrier when applying inter-band UL CA |
| ]] | |
| } | |

Meanwhile, the higher layer parameter SpCellConfig may be the same as or similar to that shown in Table 21.

TABLE 21

| | |
|---|---|
| SpCellConfig ::= | SEQUENCE { |
| servCellIndex | // servince cell ID of PSCell. PCell of MCG uses ID=0 |
| reconfigurationWithSync | //configuration values used for synchronous reconfiguration of a target SpCell |
| rlf-TimersAndConstants | //configuration of a timer and a constant value for detecting and triggerig cell-level radio link failure |
| rlmInSyncOutOfSyncThreshold | |
| spCellConfigDedicated | //ServingCellConfig of SpCell |
| ... | |
| } | |

Meanwhile, the higher layer parameter ReconfigurationWithSync may be the same as or similar to that shown in Table 22.

TABLE 22

| | |
|---|---|
| ReconfigurationWithSync ::= | SEQUENCE { |
| spCellConfigCommon | // ServingCellConfigCommon of SpCell |
| newUE-Identity | // New RNTI value configuration |
| t304 | // configure a t304 timer value |

TABLE 22-continued

```
rach-ConfigDedicated                CHOICE {
        // RACH configuration used for Reconfiguration with sync
    uplink
    supplementaryUplink
    }
OPTIONAL,    -- Need N
    ...,
    [[
    smtc   //configure a periodicity, offset, and duration of SSB to be used for change of PSCell or PCell,
or addition of PSCell
    ]],
    [[
    daps-UplinkPowerConfig-r16
    ]]
}
```

Meanwhile, the higher layer parameter SCellConfig may be the same as or similar to that shown in Table 23.

TABLE 23

```
SCellConfig ::=                   SEQUENCE {
    sCellIndex                        // SCell index
    sCellConfigCommon                 // ServingCellConfigCommon of SCell
    sCellConfigDedicated              // ServingCellConfig of SCell
    ...,
    [[
    smtc   //configure a periodicity, offset, and duration of SSB to be used for addition of SCell
    ]],
    [[
    sCellState-r16                    // configure whether to activate SCell
    secondaryDRX-GroupConfig-r16
    ]]
}
```

Meanwhile, cell-specific configurations of a serving cell configured as a SpCell or SCell in the MCG or SCG may be performed with reference to a higher layer parameter ServingCellConfigCommon. The higher layer parameter ServingCellConfigCommon may be the same as or similar to that shown in Table 24.

TABLE 24

```
ServingCellConfigCommon ::=          SEQUENCE {
    physCellId                       // physical cell ID of the corresponding serving cell
    downlinkConfigCommon             // cell-specific downlink configuration of the corresponding serving cell
    uplinkConfigCommon               // cell-specific uplink configuration of the corresponding serving cell
    supplementaryUplinkConfig        // cell-specific SUL configuration of the corresponding serving cell
    n-TimingAdvanceOffset            // timing advanced offset configuration
    ssb-PositionsInBurst             CHOICE {
        shortBitmap                  // 4-bit SSB position configuration
        mediumBitmap                 // 8-bit SSB position configuration
        longBitmap                   // 64-bit SSB position configuration
    }
    ssb-periodicityServingCell       // SSB periodicity configuration
    dmrs-TypeA-Position              // first DMRS symbol configuration for Type A DMRS
    lte-CRS-ToMatchAround            // LTE CRS rate matching configuration
    rateMatchPatternToAddModList     // rate matching pattern list additional/new configuration
    rateMatchPatternToReleaseList    // rate matching pattern list release
    ssbSubcarrierSpacing             // subcarrier spacing configuration for SSB
    tdd-UL-DL-ConfigurationCommon    // cell-specific D/F/U configuration for a TDD cell (refer to detail
description on slot formats)
    ss-PBCH-BlockPower               // SSB transmission power (-60dBm ~ 50dBm)
    ...,
    [[
    channelAccessMode-r16            CHOICE {
        dynamic
        semiStatic
    }
    discoveryBurstWindowLength-r16
    ssb-PositionQCL-r16              // configure QCL relation between SSB positions
    highSpeedConfig-r16
    ]]
}
```

Meanwhile, UE-specific configurations or cell-specific configurations of a serving cell configured as a SpCell or SCell in the MCG or SCG may be performed with reference to a higher layer parameter ServingCellConfig. The higher layer parameter ServingCellConfig may be the same as or similar to that shown in Table 25.

TABLE 25

```
ServingCellConfig ::=    SEQUENCE {
   tdd-UL-DL-ConfigurationDedicated   // UE-specific D/F/U configuration for a TDD cell (refer to
   detail description on slot formats)
   initialDownlinkBWP       // UE-specific configuration for an initial BWP (BWP #0)
   downlinkBWP-ToReleaseList    // a list of BWPs to be released
   downlinkBWP-ToAddModList    // a list of new BWPs or BWPs to be added
   firstActiveDownlinkBWP-Id
   bwp-InactivityTimer
   defaultDownlinkBWP-Id
   uplinkConfig
   supplementaryUplink
   pdcch-ServingCellConfig
   pdsch-ServingCellConfig
   csi-MeasConfig
   sCellDeactivationTimer
   crossCarrierSchedulingConfig
   tag-Id
   dummy
   pathlossReferenceLinking
   servingCellMO
   ...,
   [[
   lte-CRS-ToMatchAround
   rateMatchPatternToAddModList
   rateMatchPatternToReleaseList
   downlinkChannelBW-PerSCS-List
   ]],
   [[
   supplementaryUplinkRelease
   tdd-UL-DL-ConfigurationDedicated-IAB-MT-r16   // IAB-MT-specific D/F/U configuration for a
   TDD cell (refer to detail description on slot formats)
   dormantBWP-Config-r16
   ca-SlotOffset-r16        CHOICE {
      refSCS15kHz
      refSCS30KHz
      refSCS60KHz
      refSCS120KHz
   }
   channelAccessConfig-r16
   intraCellGuardBandsDL-List-r16
   intraCellGuardBandsUL-List-r16
   csi-RS-ValidationWith-DCI-r16
   lte-CRS-PatternList1-r16
   lte-CRS-PatternList2-r16
   crs-RateMatch-PerCORESETPoolIndex-r16
   enableTwoDefaultTCI-States-r16
   enableDefaultTCI-StatePerCoresetPoolIndex-r16
   enableBeamSwitchTiming-r16
   cbg-TxDiffTBsProcessingType1-r16
   cbg-TxDiffTBsProcessingType2-r16
   ]]
}
```

The DC or CA may be defined within a specific frequency resource. The DC or CA may operate within one band (e.g., 4G band or 5G band) including one or more CCs. The DC or CA operating within one band may be referred to as 'intra-band DC' or 'in-band CA'. On the other hand, the DC or CA may be applied across one or more bands or may be applied across a band combination configured as a combination of one or more bands. The DC or CA applied across one or more bands or a band combination may be referred to as 'inter-band DC' or 'inter-band CA'.

Meanwhile, the DC or CA may operate within one CC. The DC or CA operating within one CC may be referred to as 'intra-carrier DC' or 'intra-carrier CA'. On the other hand, the DC or CA may be applied across one or more CCs. The DC or CA applied across one or more CCs may be referred to as 'inter-carrier DC' or 'inter-carrier CA'.

Meanwhile, the DC or CA may operate within one frequency range (FR). The DC or CA applied within one FR may be referred to as 'intra-FR DC' or 'intra-FR CA'. On the other hand, the DC or CA may be applied across one or more FRs. For example, some cell groups or CCs may exist in the FR1, and the remaining cell groups or CCs may be configured to exist in the FR2. They may be applied across one or more FRs. The DC or CA may be referred to as 'inter-FR DC' or 'inter-FR CA'.

The intra-FR DC/CA, inter-FR DC/CA, intra-band DC/CA, inter-band DC/CA, intra-carrier DC/CA, inter-carrier DC/CA, or the like may be configured according to how far or close a frequency axis distance between one or more CCs or serving cells is. Hardware of a communication node such as a terminal or a base station may be implemented differently depending on which combination of the DCs/CAs should be supported.

Figure 19:
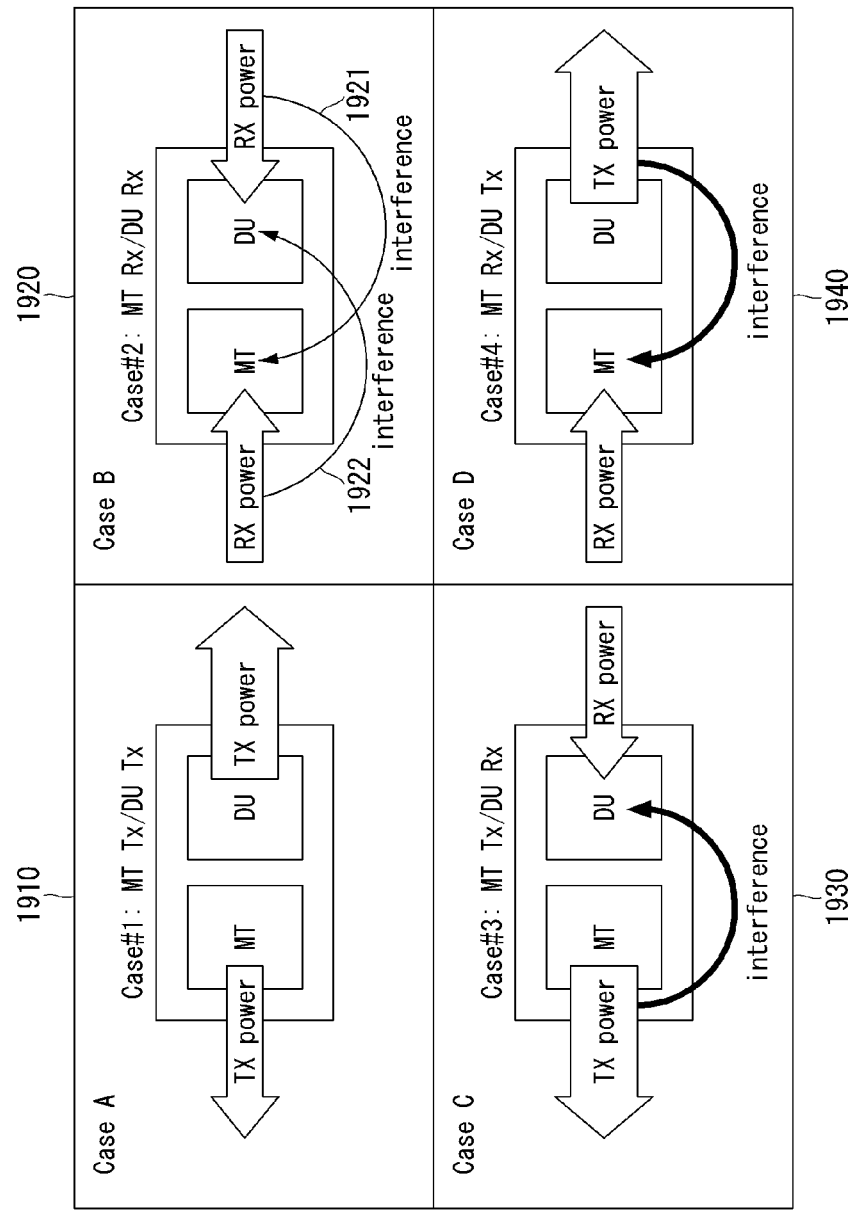
FIG. 19 is a conceptual diagram for describing an exemplary embodiment of a method for measuring and reporting cross link interference (CLI) in an IAB node supporting a simultaneous DU/MT operation mode in a communication system.

FIG. 19 is a conceptual diagram for describing an exemplary embodiment of a method for measuring and reporting cross link interference (CLI) in an IAB node supporting a simultaneous DU/MT operation mode in a communication system.

In an exemplary embodiment of the communication system, an IAB-DU and an IAB-MT within one IAB node may perform simultaneous transmission and reception based on a predetermined multiplexing mode (e.g., non-TDM mode, simultaneous DU/MT operation mode, etc.). When the IAB node supports the simultaneous DU/MT operation mode, the transmission/reception of the IAB-DU and the transmission/reception of the IAB-MT may cause interference (i.e., self-interference).

In other words, cross link interference (CLI) may occur due to the simultaneous transmission/reception operation of uplink and/or downlink in the IAB node performing simultaneous transmission/reception based on the multiplexing mode. The IAB node may measure the CLI that occurs due to the simultaneous transmission and reception operation. The IAB node may report the measured CLI to an upper node (e.g., parent node, base station, core network, etc.).

In an exemplary embodiment of the communication system, a scheme in which a communication node measures and reports CLI occurring in a dynamic time division duplexing (TDD) environment may be used. However, the CLI measurement and reporting scheme assuming the dynamic TDD environment as described above may not be suitable to be applied to a communication node (e.g., IAB node) that further supports various multiplexing modes other than the dynamic TDD. Accordingly, a technique capable of improving interference control performance through CLI measurement and reporting suitable for the communication node that further supports multiplexing modes other than dynamic TDD may be required.

In an exemplary embodiment of the IAB node designed to support simultaneous operations of the IAB-MT and the IAB-DU, the IAB-MT and the IAB-DU may operate based on one simultaneous operation scheme among the following Cases A to F.

Case A (DU Tx/MT Tx): The IAB-DU performs downlink transmission and the IAB-MT performs uplink transmission at the same time point (symbol).
  Case B (DU Rx/MT Rx): The IAB-DU performs uplink reception and the IAB-MT performs downlink reception at the same time point (symbol).
  Case C (DU Rx/MT Tx): The IAB-DU performs uplink reception and the IAB-MT performs uplink transmission at the same time point (symbol).
  Case D (DU Tx/MT Rx): The IAB-DU performs downlink transmission and the IAB-MT performs downlink reception at the same time point (symbol).
  Case E (DU/MT FDM required): For the simultaneous operations of the IAB-DU and the IAB-MT, radio resources of the IAB-DU and the IAB-MT are required to be FDMed.
  Case F (DU/MT SDM required): For the simultaneous operations of the IAB-DU and the IAB-MT, radio resources of the IAB-DU and the IAB-MT are required to be SDMed.

The IAB-DU and the IAB-MT operating simultaneously based on one of Cases A to F may be included in one IAB node, or may be considered to constitute one IAB node. In other words, the IAB-DU and the IAB-MT operating simultaneously based on one of Cases A to F may be regarded as being co-located. Here, when the interference control capability of the IAB-DU and/or IAB-MT is relatively limited, Case E may be applied, and when the interference control capability of the IAB-DU and/or IAB-MT is relatively excellent, Case F may be applied.

In an exemplary embodiment of the communication system, the IAB node (or IAB-DU and IAB-MT) may support at least one or more of the four simultaneous operation schemes of Cases A to D. The IAB node (or IAB-DU and IAB-MT) may report information on the one or more simultaneous operation schemes supported by the IAB node to an upper node of the IAB node. Alternatively, the IAB node (or IAB-DU and IAB-MT) may report information on one or more combinations of a plurality of simultaneous operation schemes supported by the IAB node to an upper node of the IAB node. Here, the 'upper node of the IAB node' may correspond to an upper IAB node, an IAB donor node, a parent node, a central unit (CU), or a core network. The reporting may be performed identically or similarly to that shown in Table 19.

Meanwhile, in another exemplary embodiment of the communication system, the IAB node (or IAB-DU and IAB-MT) may support at least one or more of the six simultaneous operation schemes of Cases A to F. The IAB node (or IAB-DU and IAB-MT) may report information on one or more simultaneous operation schemes supported by the IAB node to the upper node. Alternatively, the IAB node (or IAB-DU and IAB-MT) may report information on one or more combinations of a plurality of simultaneous operation schemes supported by the IAB node to the upper node. The reporting may be performed identically or similarly to that shown in Table 29.

TABLE 26

| IE/ group name | range | IE type and reference | liminality |
| --- | --- | --- | --- |
| IAB-MT cell list | 1 | | |
| >IAB-MT cell item | 1 . . . <maxnoofServ- ingCells> | | |
| >>NR cell identity | | Bit string (size: 36) | Identity of a serving cell configured for a co-located IAB-MT |
| >>DU_RX/ MT_RX | | Enumerated (supported, not-supported) | Indicates whether the IAB node supports simultaneous receptions in DU and MT |
| >>DU_TX/ MT_TX | | Enumerated (supported, not-supported) | Indicates whether the IAB node supports simultaneous transmissions in DU and MT |
| >>DU_TX/ MT_RX | | Enumerated (supported, not-supported) | Indicates whether the IAB node simultaneously supports transmission in DU and reception in MT |

TABLE 26-continued

| IE/<br>group name | range | IE type<br>and<br>reference | liminality |
|---|---|---|---|
| >>DU_RX/<br>MT_TX | | Enumerated<br>(supported,<br>not-<br>supported) | Indicates<br>whether the<br>IAB node<br>simultaneously<br>supports<br>reception<br>in DU and<br>transmission<br>in MT |
| >> DU/MT<br>FDM<br>required | | Enumerated<br>(supported,<br>not-<br>supported) | Indicates<br>whether the<br>IAB node<br>supports (or<br>requires) the<br>FDM scheme |
| >> DU/MT<br>SDM<br>required | | Enumerated<br>(supported,<br>not-<br>supported) | Indicates<br>whether the<br>IAB node<br>supports (or<br>requires) the<br>SDM scheme |

The report according to Table 26 may further include elements corresponding to Cases E and F in addition to the elements constituting the report according to Table 19.

Meanwhile, the upper node (or CU) of the IAB node may identify information on the simultaneous operation scheme (or combination of the simultaneous operation schemes) supported by the IAB node through the reporting according to Table 19 or the reporting according to Table 26. The upper node (or CU) of the IAB node may configure through higher layer signaling or dynamically indicate through L1/L2 signaling which simultaneous operation scheme (or combination of simultaneous operation schemes) to apply in which time-frequency resources to the IAB node.

Hereinafter, 'Case A', 'Case B', 'Case C', 'Case D', 'Case E', or 'Case F' in the present disclosure means the aforementioned Case A, Case B, Case C, Case D, case E, or case F. Meanwhile, the aforementioned Case A, Case B, Case C, Case D, Case E, and Case F may be referred to as 'Case #1', 'Case #2', 'Case #3', 'Case #4', 'Case #5', or 'case #6', respectively.

Referring to FIG. 19, in an exemplary embodiment of the communication system, an IAB node 1900 may support simultaneous operation modes such as Case A 1910, Case B 1920, Case C 1930, and Case D 1940. Here, self-interference and/or CLI may occur according to the simultaneous DU/MT operation (i.e., simultaneous DU/MT transmission/reception) in the IAB node 1900.

For example, when the IAB node 1900 operates according to Case A 1910, self-interference may not occur because both the MT (i.e., IAB-MT) and the DU (i.e., IAB-DU) perform only transmission operations. Therefore, in this case, a nominal maximum transmission power of the MT may be set to be the same as a nominal maximum transmission power when the simultaneous DU/MT operation (i.e., TDM mode) is not performed. On the other hand, when the IAB node 1900 operates according to Case C 1930, a transmission signal of the MT may leak to a reception antenna of the DU, resulting in self-interference. In this case, the nominal maximum transmission power of the MT may be set to be less than or equal to the nominal maximum transmission power in the case of not performing the simultaneous DU/MT operation (i.e., TDM mode). In this manner, uplink power control may be differently performed for each simultaneous DU/MT operation mode.

On the other hand, when the IAB node 1900 operates according to Case A 1910, the MT may perform uplink transmission and the DU may perform downlink transmission so that CLI may occur between uplink and downlink. In this case, since both the MT and the DU of the IAB node 1900 are performing transmissions, the CLI occurring in Case A 1910 may need to be measured by another communication node.

On the other hand, when the IAB node 1900 operates according to Case B 1920, the MT may perform downlink reception and the DU may perform downlink reception so that CLI may occur between uplink and downlink. That is, an uplink signal received at the DU may act as interference 1921 to a downlink signal reception operation in the MT. Alternatively, a downlink signal received at the MT may act as interference 1922 to an uplink signal reception operation in the DU.

Based on the self-interference and/or CLI occurring according to the simultaneous DU/MT operation in the IAB node 1900, transmission/reception power control and/or interference management for the IAB node 1900 may be performed. To this end, the IAB node 1900 may measure the self-interference and/or CLI. The IAB node 1900 may report information on the measured self-interference and/or CLI to an upper node. A technique for the IAB node 1900 to efficiently perform the measurement and reporting of the self-interference and/or CLI may be required.

An exemplary embodiment of the communication system supporting 5G or B5G may support a dynamic TDD, full-duplex mode, IAB DU/MT simultaneous operation mode, and the like. Due to this, CLI may occur between uplink and downlink. An exemplary embodiment of the communication system may support a measurement function and a reporting function for the CLI.

For example, an exemplary embodiment of the communication system may support a CLI measurement scheme such as a CLI-received signal strength indicator (CLI-RSSI) measurement scheme and an SRS-reference signal received power (SRS-RSRP) measurement scheme. L3 filtering may be applied to the CLI-RSSI measurement scheme and the SRS-RSRP measurement scheme. Reporting of information on the measured CLI may be triggered by a predetermined event or performed periodically. The reporting of the CLI may support an event triggered type or periodic reporting. The CLI measurement and/or reporting may be applied during multi-cell operations such as CA and DC. Configuration information related to the CLI measurement and/or reporting may be indicated or delivered based on a higher layer parameter MeasObjectCL1 or the like. The higher layer parameter MeasObjectCL1 may be the same as or similar to that shown in Table 27.

TABLE 27

```
MeasObjectCLI-r16 ::=        SEQUENCE {
    cli-ResourceConfig-r16       CLI-ResourceConfig-r16,
    ...
}
```

TABLE 27-continued

```
CLI-ResourceConfig-r16 ::=              SEQUENCE {
    srs-ResourceConfig-r16                  SetupRelease { SRS-ResourceListConfigCLI-r16 }
    rssi-ResourceConfig-r16                 SetupRelease { RSSI-ResourceListConfigCLI-r16 }
}
SRS-ResourceListConfigCLI-r16 ::=       SEQUENCE (SIZE (1..maxNrofSRS-Resources-r16)) OF
SRS-ResourceConfigCLI-r16
RSSI-ResourceListConfigCLI-r16 ::=      SEQUENCE (SIZE (1..maxNrofCLI-RSSI-Resources-r16)) OF
RSSI-ResourceConfigCLI-r16
SRS-ResourceConfigCLI-r16 ::=           SEQUENCE {
    srs-Resource-r16                        SRS-Resource,
    srs-SCS-r16                             SubcarrierSpacing,
    refServCellIndex-r16                    ServCellIndex
    refBWP-r16                              BWP-Id,
    ...
}
RSSI-ResourceConfigCLI-r16 ::=          SEQUENCE {
    rssi-ResourceId-r16                     RSSI-ResourceId-r16,
    rssi-SCS-r16                            SubcarrierSpacing,
    startPRB-r16                            INTEGER (0..2169),
    nrofPRBs-r16                                INTEGER (4..maxNrofPhysicalResourceBlocksPlus1),
    startPosition-r16                       INTEGER (0..13),
    nrofSymbols-r16                         INTEGER (0..14),
    rssi-PeriodicityAndOffset-r16           RSSI-PeriodicityAndOffset-r16,
    refServCellIndex-r16                    ServCellIndex
    ...
}
RSSI-ResourceId-r16 ::=                 INTEGER (0..maxNrofCLI-RSSI-Resources-r16-1)
RSSI-PeriodicityAndOffset-r16 ::=       CHOICE {
    sl10                                    INTEGER(0..9),
    sl20                                    INTEGER(0..19),
    sl40                                    INTEGER(0..39),
    sl80                                    INTEGER(0..79),
    sl160                                   INTEGER(0..159),
    sl320                                   INTEGER(0..319),
    sl640                                   INTEGER(0..639),
    ...
}
```

In an exemplary embodiment of the communication system, F1AP signaling identical or similar to Table 28 may be used for CLI measurement, reporting, and additional operations accordingly. For example, in an exemplary embodiment of the communication system, the gNB-DU may use the F1AP signaling as shown in Table 28 to report and/or deliver 'intended TDD DL-UL configuration information' including information to be considered for CLI mitigation to the gNB-CU. Alternatively, in an exemplary embodiment of the communication system, the gNB-DU may deliver the intended TDD DL-UL configuration information to another gNB-DU by using the F1AP signaling as shown in Table 28. Alternatively, in an exemplary embodiment of the communication system, the gNB-CU may deliver the intended TDD DL-UL configuration information to the gNB-DU by using the F1AP signaling as shown in Table 28.

TABLE 28

| IE/group name | range | IE type and reference | Description |
|---|---|---|---|
| NR SCS | | Enumerated (scs15, scs30, scs60, scs120, . . .) | Values such as scs15, scs30, scs60, and scs120 correspond to subcarrier spacings. |
| NR cyclic prefix | | Enumerated (normal, extended, . . .) | Type of cyclic prefix determining the number of symbols within one slot |
| NR DL-UL transmission periodicity | | Enumerated (ms0p5, ms0p625, ms1, ms1p25, ms2, ms2p5, ms3, ms4, ms5, ms10, ms20, ms40, ms60, ms80, ms100, ms120, ms140, ms160, . . .) | Periodicity is expressed in a format of msXpYZ, and corresponds to X.YZ milliseconds |
| Slot configuration list | 1 | | |
| >Slot configuration item | 1 . . . <maxnoofSlots> | | |
| >>Slot index | | Integer (0 . . . 5119) | |
| >> CHOICE Symbol Allocation in Slot | | | |
| >>> All DL | | NULL | This means that all symbols within the slot are DL symbols |

TABLE 28-continued

| IE/group name | range | IE type and reference | Description |
| --- | --- | --- | --- |
| >>> All UL | | NULL | This means that all symbols within the slot are UL symbols |
| >>> Both DL and UL | | | |
| >>>> Number of DL symbols | | Integer (0 . . . 13) | |
| >>>> Number of UL symbols | | Integer (0 . . . 13) | |

Referring to Table 28, the intended TDD DL-UL configuration information delivered using the F1AP signaling shown in Table 28 may include information related to a subcarrier spacing, cyclic prefix, TDD UL-DL slot configuration, and the like. Referring to Table 28, the intended TDD DL-UL configuration information may include 'slot configuration list' information including DL/UL symbol information for one or more slots, that is, TDD DL-UL pattern information. When a certain slot includes both DL symbols and UL symbols, the number of DL symbols from a starting part of the corresponding slot and the number of UL symbols from an ending part of the corresponding slot may be indicated by the parameters 'Number of DL symbols', 'Number of UL Symbols', and the like.

Meanwhile, in an exemplary embodiment of the communication system, F1AP signaling identical or similar to Table 29 may be used to deliver information related to resource configuration of the IAB node. For example, in an exemplary embodiment of the communication system, the IAB node may use the F1AP signaling shown in Table 29 to deliver resource configuration information for cell(s) supported by the gNB-DU of the IAB ode (hereinafter, gNB-DU cell resource configuration) to an upper node (e.g., upper IAB node, IAB donor, parent node, gNB-CU, etc.). Alternatively, in an exemplary embodiment of the communication system, the IAB node may deliver the gNB-DU cell resource configuration information to another IAB node by using the F1AP signaling shown in Table 29. Here, the gNB-DU cell resource configuration information may include information on TDD/FDD resource parameters for each active cell.

TABLE 29

| IE/group name | range | IE type and reference | Description |
| --- | --- | --- | --- |
| Subcarrier spacing | | Enumerated (kHz15, kHz30, kHz60, kHz120, kHz240, spare3, spare2, spare1, . . .) | The subcarrier spacing is used for a reference of TDD/FDD slot configuration. |
| DUF transmission periodicity | | Enumerated (ms0p5, ms0p625, ms1, ms1p25, ms2, ms2p5, ms5, ms10, . . .) | |
| DUF slot configuration list | 0 . . . 1 | | |
| >DUF slot configuration item | 1 . . . <maxnoofDUFSlots> | | Corresponds to 'maxNrofSlots' |
| >> CHOICE DUF Slot Configuration | | | |
| >>> explicit format | | | |
| >>>> permutation | | Enumerated (DFU, UFD, . . .) | |
| >>>> Number of DL symbols | | Integer (0 . . . 14) | |
| >>>> Number of UL symbols | | Integer (0 . . . 14) | |
| >>> Implicit format | | | |
| >>>>DUF slot format index | | Integer (0 . . . 254) | Corresponds to an index of a preconfigured table |
| HSNA transmission periodicity | | Enumerated (ms0p5, ms0p625, ms1, ms0p5, ms0p625, ms1, ms1p25, ms2, ms2p5, ms5, ms10, ms20, ms40, ms80, ms160, . . .) | |
| HSNA slot configuration list | 0 . . . 1 | | |
| >HSNA slot configuration item | 1 . . . <maxnoofHSNASlots> | | |
| >>HSNA Downlink | | Enumerated (H, S, NA) | HSNA value for DL symbol of a slot |
| >>HSNA Uplink | | Enumerated (H, S, NA) | HSNA value for UL symbol of a slot |

TABLE 29-continued

| IE/group name | range | IE type and reference | Description |
| --- | --- | --- | --- |
| >>HSNA Flexible | | Enumerated (H, S, NA) | HSNA value for flexible symbol of a slot |

Referring to Table 29, the gNB-DU cell resource configuration information may include downlink/uplink/flexible (DUF) configuration information for one or more slot lists that are repeated based on a DUF transmission periodicity. Referring to Table 29, the gNB-DU cell resource configuration information may include 'DUF slot configuration list' information including information on a TDD DL-UL pattern related to DUF configuration. In Table 29, maxnoofDUFSlots may mean the maximum number of slots within 10 ms, and maxnoofHSNASlots may mean the maximum number of H/S/NA slots within 160 ms. In Table 29, maxnoofDUFSlots may be defined as 320, and maxnoofHSNASlots may be defined as 5120. The number of downlink symbols and the number of uplink symbols within one slot may be configured based on the parameter 'Number of Downlink Symbols' and the parameter 'Number of Uplink Symbols', respectively. In Table 29, when the parameter 'permutation' is set to 'DFU', downlink symbols may be positioned at the starting part of the slot and uplink symbols may be positioned at the ending part of the slot. In Table 29, when the parameter 'permutation' is set to 'UFD', uplink symbols may be positioned at the starting part of the slot and the downlink symbols may be positioned at the ending part of the slot.

Referring to Tables 28 and 29, the 'intended TDD DL-UL configuration' information delivered based on Table 28 and the 'gNB-DU cell resource configuration' information delivered based on Table 29 may indicate TDD DL-UL pattern information, respectively. Here, the TDD DL-UL pattern information indicated by the intended TDD DL-UL configuration information may be referred to as 'first TDD DL-UL pattern information', and the TDD DL-UL pattern information indicated by the gNB-DU cell resource configuration information may be referred to as 'second TDD DL-UL pattern information'. The first TDD DL-UL pattern information indicated by the intended TDD DL-UL configuration information and the second TDD DL-UL pattern information indicated by the gNB-DU cell resource configuration information may not be identical to each other. In other words, the intended TDD DL-UL configuration information and the gNB-DU cell resource configuration information may indicate different TDD DL-UL pattern information. When different TDD DL-DL patterns are configured for one IAB node or gNB-DU, the CLI measurement and/or reporting operation described with reference to FIG. 19 may not be normally performed. For example, when the parameter 'permutation' indicated by the gNB-DU cell resource configuration information is set to 'UFD', uplink symbols may be positioned at the starting part of the corresponding slot and downlink symbols may be positioned at the ending part of the corresponding slot. The TDD DL-UL pattern of the UFD type as described above cannot be configured by the intended TDD DL-UL configuration information that does not support such the DL-UL pattern. That is, a collision may occur in relation to the configuration of the TDD DL-UL pattern. As described above, a technique for solving a collision occurring in relation to the configuration of the TDD DL-UL pattern and improving the efficiency of the CLI measurement and/or reporting operation may be required.

First Exemplary Embodiment of Communication System

The first exemplary embodiment of the communication system proposes configurations for a communication node operating in a multiplexing mode (e.g., IAB node, gNB-DU, or gNB-CU operating in a simultaneous DU/MT operation mode) to efficiently perform CLI measurement and/or reporting when there is a collision between TDD DL-UL patterns indicated by a plurality of signaling. Hereinafter, the first exemplary embodiment of the communication system will be described by taking CLI measurement and/or reporting schemes in consideration of simultaneous DU/MT operations as examples. However, these are only examples for convenience of description, and the first exemplary embodiment of the communication system is not limited thereto.

In the first exemplary embodiment of the communication system, a first communication node may support a simultaneous DU/MT operation mode. For example, the first communication node may correspond to an IAB node, gNB-DU, gNB-CU, or the like. The first communication node may support the simultaneous DU/MT operation according to at least one of Cases A to D described with reference to FIG. 19. Alternatively, the first communication node may support the simultaneous DU/MT operation according to at least one of Cases A to F described with reference to FIG. 19.

The first communication node may receive intended TDD DL-UL configuration information (or CLI F1AP signaling) signaled for CLI mitigation from a second communication node. Here, the intended TDD DL-UL configuration information may be transmitted based on the signaling shown in Table 28. The intended TDD DL-UL configuration information may include first TDD DL-UL pattern information.

The first communication node may receive gNB-DU cell resource configuration information (or IAB F1AP signaling) signaled for IAB operations from the second communication node. Here, the gNB-DU cell resource configuration information may be transmitted based on the signaling shown in Table 29. The gNB-DU cell resource configuration information may include second TDD DL-UL pattern information.

The first TDD DL-UL pattern information included in the intended TDD DL-UL configuration information received by the first communication node and the second TDD DL-UL configuration information included in the gNB-DU cell resource configuration information received by the first communication node may be the same as each other, or may be different from each other. In other words, the first TDD DL-UL pattern information and the second TDD DL-UL pattern information configured for the first communication node may be the same as or different from each other. When the first TDD DL-UL pattern information and the second TDD DL-UL pattern information configured for the first communication node are different from each other, a collision may occur between the first TDD DL-UL pattern information and the second TDD DL information configured for the first communication node. Here, occurrence of a collision between the first TDD DL-UL pattern information and the second TDD DL-UL pattern information may mean that information that the first TDD DL-UL pattern information indicates for a first resource and information that the second TDD DL-UL pattern information indicates for the first resource contradict each other.

In order for the first communication node to efficiently perform the CLI measurement and/or reporting operation, the following schemes may be applied to resolve the collision occurring between the first TDD DL-UL pattern information and the second TDD DL-UL pattern information configured for the first communication node and to determine a TDD DL-UL pattern.

Scheme #1-1: According to Scheme #1-1, the second communication node that provides the signaling, such as the intended TDD DL-UL configuration information and gNB-DU cell resource configuration information, for the first communication node may guarantee that a collision due to a mismatch of the TDD DL-UL pattern information indicated by the signaling does not occur. For example, when each signaling is signaling transmitted from the gNB-CU to the gNB-DU, the second communication node may be the gNB-CU or may correspond to the gNB-CU. On the other hand, when each signaling is signaling transmitted from the gNB-DU to the gNB-CU, the second communication node may be the gNB-DU or may correspond to the gNB-DU.

For example, the second communication node may guarantee that positions of UL symbols or DL symbols determined by the intended TDD DL-UL configuration information within a specific slot for the first communication node coincide with positions of UL symbols or DL symbols determined by the gNB-DU cell resource configuration information. In other words, in generating the intended TDD DL-UL configuration information and gNB-DU cell resource configuration information for the first communication node, the second communication node may guarantee that positions of UL symbols or DL symbols determined by the intended TDD DL-UL configuration information within a specific slot for the first communication node coincide with positions of UL symbols or DL symbols determined by the gNB-DU cell resource configuration information.

According to Scheme #1-1, when the positions of UL symbols or DL symbols determined by the intended TDD DL-UL configuration information transmitted from the second communication node do not coincide with the positions of UL symbols or DL symbols determined by the gNB-DU cell resource configuration information transmitted from the second communication node, the first communication may not perform CLI measurement and/or reporting. According to Scheme #1-1, in a slot in which the first communication node performs CLI measurement and/or reporting, a DL/UL OFDM symbol pattern of the UFD type may not be configured according to the gNB-DU cell resource configuration information.

Scheme #1-2: According to Scheme #1-2, when the first TDD DL-UL pattern information indicated by the intended TDD DL-UL configuration information and the second TDD DL-UL pattern information indicated by the gNB-DU cell resource configuration information contradict each other with respect to a certain slot or certain symbol(s), a priority of the second TDD DL-UL pattern information may be regarded as higher than that of the first TDD DL-UL pattern information. The priorities of the first and second TDD DL-UL pattern information may be defined or set as default values (in other words, basic values). Alternatively, the priorities of the first and second TDD DL-UL pattern information may be separately defined, configured, and/or compared when it is determined that a collision exists between the first and second TDD DL-UL pattern information.

For example, for the first communication node, when the first TDD DL-UL pattern information indicated by the intended TDD DL-UL configuration information indicates a first symbol as a downlink symbol, and the second TDD DL-UL pattern information indicated by the gNB-DU cell resource configuration information indicates the first symbol as an uplink symbol, the first communication node may regard the first symbol as an uplink symbol and perform CLI measurement and/or reporting. This is because the second TDD DL-UL pattern information based on the gNB-DU cell resource configuration information includes information for IAB operations, and a degree of freedom of the first TDD DL-UL pattern information based on the intended TDD DL-UL configuration information is lower than that of the second TDD DL-UL pattern information. The operation of the first communication node based on Scheme #1-2 will be described in more detail with reference to FIG. 20.

Scheme #1-3: According to Scheme #1-3, when the first TDD DL-UL pattern information indicated by the intended TDD DL-UL configuration information and the second TDD DL-UL pattern information indicated by the gNB-DU cell resource configuration information contradict each other with respect to a certain slot or certain symbol(s), the priority of the first TDD DL-UL pattern information may be regarded as higher than that of the second TDD DL-UL pattern information. The priorities of the first and second TDD DL-UL pattern information may be defined or set as default values (in other words, basic values). Alternatively, the priorities of the first and second TDD DL-UL pattern information may be separately defined, configured, and/or compared when it is determined that a collision exists between the first and second TDD DL-UL pattern information.

For example, for the first communication node, when the first TDD DL-UL pattern information indicated by the intended TDD DL-UL configuration information indicates a first symbol as a downlink symbol, and the second TDD DL-UL pattern information indicated by the gNB-DU cell resource configuration information indicates the first symbol as an uplink symbol, the first communication node may regard the first symbol as a downlink symbol and perform CLI measurement and/or reporting. This is because the intended TDD DL-UL configuration information indicating the first TDD DL-UL pattern information is information signaled for the CLI measurement and/or reporting. In other words, this is because the first communication node performs the CLI measurement and/or reporting based on the intended TDD DL-UL configuration information indicating the first TDD DL-UL pattern information. Alternatively, this is because L3 filtering is applied to the CLI measurement and/or reporting performed based on the first TDD DL-UL pattern information and thus it has semi-static characteristics. The operation of the first communication node based on Scheme #1-3 will be described in more detail with reference to FIG. 21.

Scheme #1-4: According to Scheme #1-4, when the first TDD DL-UL pattern information indicated by the intended TDD DL-UL configuration information and the second TDD DL-UL pattern information indicated by the gNB-DU cell resource configuration information contradict each other with respect to a certain slot or certain symbol(s), an interpretation scheme for the intended TDD DL-UL configuration information may be changed based on the second TDD DL-UL pattern information. For example, with respect to the first communication node, when the parameter 'permutation' of the gNB-DU cell resource configuration information indicates a TDD DL-UL pattern of a first slot as a 'DFU' pattern, the first communication node may interpret that the intended TDD DL-UL configuration information indicates that downlink symbols are positioned at the starting part of the first slot and uplink symbols are positioned at the ending part of the first slot. On the other hand, with respect to the first communication node, when the parameter 'permutation' of the gNB-DU cell resource configuration information indicates the TDD DL-UL pattern of a first slot as a 'UFD' pattern, the first communication node may interpret that the intended TDD DL-UL configuration information indicates that uplink symbols are positioned at the starting part of the first slot and downlink symbols are positioned at the ending part of the first slot. This is because the second TDD DL-UL pattern information based on the gNB-DU cell resource configuration information includes information for IAB operations, and a degree of freedom of the first TDD DL-UL pattern information based on the intended TDD DL-UL configuration information is lower than that of the second TDD DL-UL pattern information. The operation of the first communication node based on Scheme #1-4 will be described in more detail with reference to FIG. 22.

The configurations of Schemes #1-1 to #1-4 do not need to be mutually exclusive. At least some of Schemes #1-1 to #1-4 may be combined with each other. The communication system or communication node may support one or more of Schemes #1-1 to #1-4, and which one of Schemes #1-1 to #1-4 is to be applied may be determined according to the type or capability of each communication node, communication situation, or higher layer configuration. For example, when the first communication node does not support the F1AP signaling extended in consideration of the UFD slot pattern as shown in Table 29, the first and second communication nodes may operate based on Scheme #1-1. On the other hand, when the first communication node supports the F1AP signaling extended in consideration of the UFD slot pattern as shown in Table 29, the first and second communication nodes may operate based on any one of Schemes #1-2 to #1-4.

Figure 20:
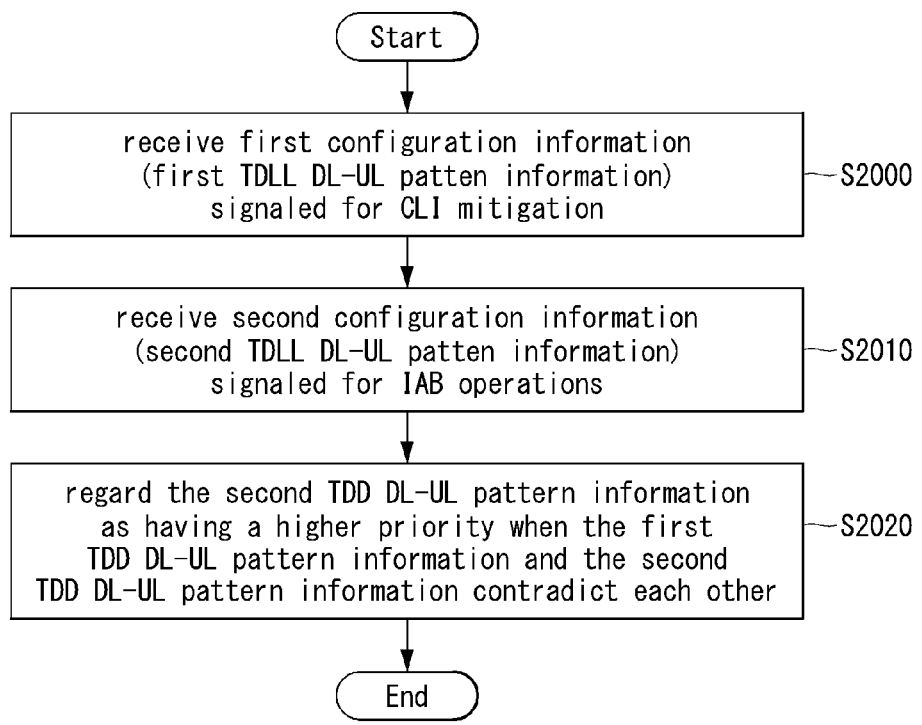
FIG. 20 is a flowchart for describing a first exemplary embodiment of an operation method of a first communication node supporting simultaneous DU/MT operations in a communication system.

FIG. 20 is a flowchart for describing a first exemplary embodiment of an operation method of a first communication node supporting simultaneous DU/MT operations in a communication system.

Referring to FIG. 20, a first communication node in the communication system may support a simultaneous DU/MT operation mode. The first communication node may correspond to an IAB node, gNB-DU, gNB-CU, or the like. The first communication node may operate based on Scheme #1-2 described with reference to the first exemplary embodiment of the communication system. Hereinafter, in describing the first exemplary embodiment of the operation method of the first communication node with reference to FIG. 20, the contents overlapping with those described with reference to FIGS. 1 to 19 and the first exemplary embodiment of the communication system may be omitted.

The first communication node may receive first configuration information from a second communication node (S2000). Here, the first configuration information may correspond to intended TDD DL-UL configuration information signaled for delivering information related to CLI mitigation. The first configuration information may include or indicate first TDD DL-UL pattern information.

The first communication node may receive second configuration information from the second communication node (S2010). Here, the second configuration information may correspond to gNB-DU cell resource configuration information signaled for IAB operations. The second configuration information may include or indicate second TDD DL-UL pattern information.

Although the exemplary embodiment in which the second configuration information reception operation in the step S2010 is performed after the first configuration information reception operation in the step S2000 is performed has been described with reference to FIG. 20, but this is merely an example for convenience of description, and exemplary embodiments of the present disclosure are not limited thereto. For example, in an exemplary embodiment of the communication system, the first configuration information reception operation in the step S2000 and the second configuration information reception operation in the step S2010 may be simultaneously performed. Alternatively, after the second configuration information reception operation in the step S2010 is performed, the first configuration information reception operation in the step S2000 may be performed.

The first communication node may perform operations such as radio signal transmission/reception, CLI measurement, and CLI reporting based on the first configuration information received in the step S2000 and the second configuration information received in the step S2010. Here, the first communication node may identify whether a collision exists between the first TDD DL-UL pattern information indicated by the first configuration information and the second TDD DL-UL pattern information indicated by the second configuration information. When there is no collision between the first TDD DL-UL pattern information and the second TDD DL-UL pattern information, the first communication node may perform operations such as radio signal transmission/reception, CLI measurement, and CLI reporting based on the first TDD DL-UL pattern information and the second TDD DL-UL pattern information.

On the other hand, when there is a collision between the first TDD DL-UL pattern information indicated by the first configuration information and the second TDD DL-UL pattern information indicated by the second configuration information, the first communication node may perform operations such as radio signal transmission/reception, CLI measurement, and CLI reporting based on the second TDD DL-UL pattern information indicated by the second configuration information (S2020). In other words, when a collision exists between the first TDD DL-UL pattern information indicated by the first configuration information and the second TDD DL-UL pattern information indicated by the second configuration information, the first communication node may consider that the second TDD DL-UL pattern information indicated by the second configuration information has a higher priority than the first TDD DL-UL pattern information indicated by the first configuration information.

Figure 21:
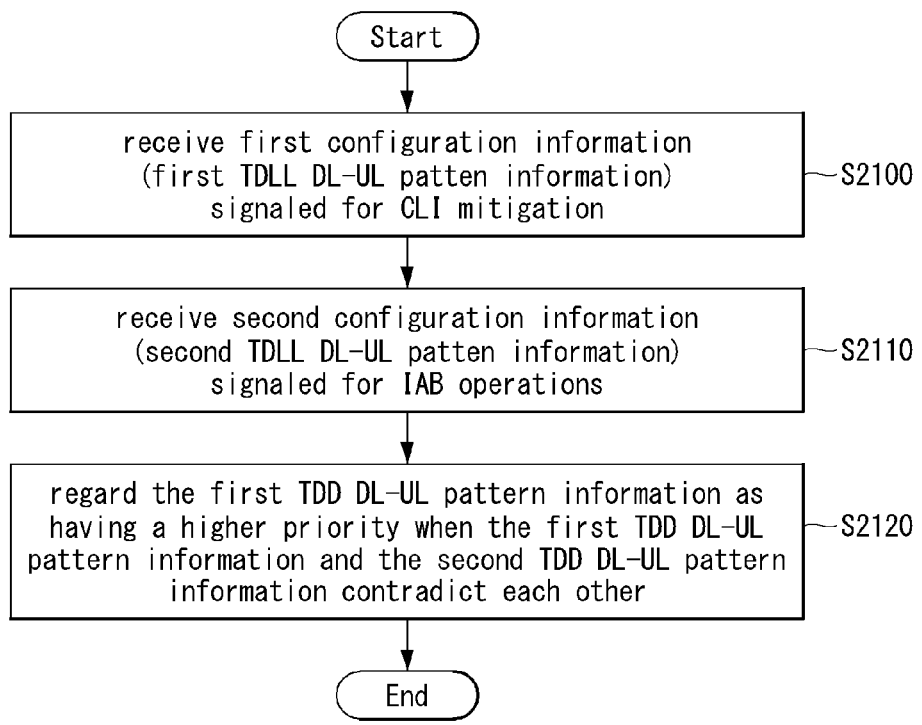
FIG. 21 is a flowchart for describing a second exemplary embodiment of an operation method of a first communication node supporting simultaneous DU/MT operations in a communication system.

FIG. 21 is a flowchart for describing a second exemplary embodiment of an operation method of a first communication node supporting simultaneous DU/MT operations in a communication system.

Referring to FIG. 21, a first communication node in the communication system may support a simultaneous DU/MT operation mode. The first communication node may correspond to an IAB node, gNB-DU, gNB-CU, or the like. The first communication node may operate based on Scheme #1-3 described with reference to the first exemplary embodiment of the communication system. Hereinafter, in describing the second exemplary embodiment of the operation method of the first communication node with reference to FIG. 21, the content overlapping with those described with reference to FIGS. 1 to 20 and the first exemplary embodiment of the communication system may be omitted.

The first communication node may receive first configuration information from a second communication node (S2100). Here, the first configuration information may correspond to intended TDD DL-UL configuration information signaled for delivering information related to CLI mitigation. The first configuration information may include or indicate first TDD DL-UL pattern information. The first communication node may receive second configuration information from the second communication node (S2110). Here, the second configuration information may correspond to gNB-DU cell resource configuration information signaled for IAB operations. The second configuration information may include or indicate second TDD DL-UL pattern information.

The first communication node may perform operations such as radio signal transmission/reception, CLI measurement, and CLI reporting based on the first configuration information received in the step S2100 and the second configuration information received in the step S2110. Here, when there is a collision between the first TDD DL-UL pattern information indicated by the first configuration information and the second TDD DL-UL pattern information indicated by the second configuration information, the first communication node may perform operations such as radio signal transmission/reception, CLI measurement, and CLI reporting based on the first TDD DL-UL pattern information indicated by the first configuration information (S2120).

In other words, when a collision exists between the first TDD DL-UL pattern information indicated by the first configuration information and the second TDD DL-UL pattern information indicated by the second configuration information, the first communication node may consider that the first TDD DL-UL pattern information indicated by the first configuration information has a higher priority than the second TDD DL-UL pattern information indicated by the second configuration information.

Figure 22:
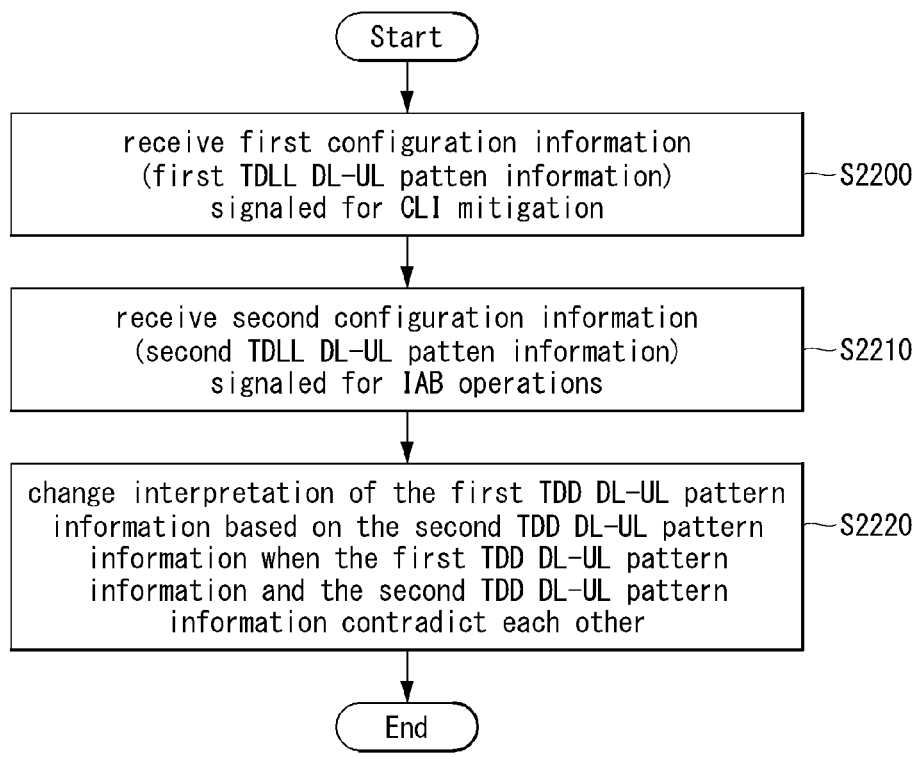
FIG. 22 is a flowchart for describing a third exemplary embodiment of an operation method of a first communication node supporting simultaneous DU/MT operations in a communication system.

FIG. 22 is a flowchart for describing a third exemplary embodiment of an operation method of a first communication node supporting simultaneous DU/MT operations in a communication system.

Referring to FIG. 22, a first communication node in the communication system may support a simultaneous DU/MT operation mode. The first communication node may correspond to an IAB node, gNB-DU, gNB-CU, or the like. The first communication node may operate based on Scheme #1-4 described with reference to the first exemplary embodiment of the communication system. Hereinafter, in describing the third exemplary embodiment of the operation method of the first communication node with reference to FIG. 22, the content overlapping with those described with reference to FIGS. 1 to 21 and the first exemplary embodiment of the communication system may be omitted.

The first communication node may receive first configuration information from a second communication node (S2200). Here, the first configuration information may correspond to intended TDD DL-UL configuration information signaled for delivering information related to CLI mitigation. The first configuration information may include or indicate first TDD DL-UL pattern information. The first communication node may receive second configuration information from the second communication node (S2210).

Here, the second configuration information may correspond to gNB-DU cell resource configuration information signaled for IAB operations. The second configuration information may include or indicate second TDD DL-UL pattern information.

The first communication node may perform operations such as radio signal transmission/reception, CLI measurement, and CLI reporting based on the first configuration information received in the step S2200 and the second configuration information received in the step S2210. Here, when there is a collision between the first TDD DL-UL pattern information indicated by the first configuration information and the second TDD DL-UL pattern information indicated by the second configuration information, the first communication node may change an interpretation of the first TDD DL-UL pattern information based on the second TDD DL-UL pattern information (S2220).

In an exemplary embodiment of the communication system, when the second TDD DL-UL pattern information indicated by the second configuration information indicates a TDD DL-UL pattern for a first slot as a 'UFD' pattern (in other words, the parameter 'permutation' included in the second TDD DL-UL pattern information is set to 'UFD'), the first communication node may change an interpretation of the first TDD DL-UL pattern information based on the second TDD DL-UL pattern information (S2220).

Second Exemplary Embodiment of Communication System

The second exemplary embodiment of the communication system proposes configurations for a communication node operating in a multiplexing mode (e.g., IAB node, gNB-DU, or gNB-CU operating in a simultaneous DU/MT operation mode) to efficiently perform CLI measurement and/or reporting when there is a collision between TDD DL-UL information and HSNA configuration information indicated by a plurality of signaling. Hereinafter, the second exemplary embodiment of the communication system will be described by taking CLI measurement and/or reporting schemes in consideration of DU/MT simultaneous operation as examples. However, these are only examples for convenience of description, and the second exemplary embodiment of the communication system is not limited thereto.

In the second exemplary embodiment of the communication system, a first communication node may support a simultaneous DU/MT operation mode. For example, the first communication node may correspond to an IAB node, gNB-DU, gNB-CU, or the like. The first communication node may support the simultaneous DU/MT operation according to at least one of Cases A to D described with reference to FIG. 19. Alternatively, the first communication node may support the simultaneous DU/MT operation according to at least one of Cases A to F described with reference to FIG. 19.

The first communication node may receive intended TDD DL-UL configuration information (or CLI F1AP signaling) signaled for CLI mitigation from a second communication node. Here, the intended TDD DL-UL configuration information may be transmitted based on the signaling shown in Table 28. The intended TDD DL-UL configuration information may include first TDD DL-UL pattern information.

The first communication node may receive gNB-DU cell resource configuration information (or IAB F1AP signaling) signaled for IAB operations from the second communication node. Here, the gNB-DU cell resource configuration information may be transmitted based on the signaling shown in Table 29. The gNB-DU cell resource configuration information may include first HSNA configuration information.

There may or may not be a collision between the first TDD DL-UL pattern information included in the intended TDD DL-UL configuration information received by the first communication node and the first HSNA configuration information included in the gNB-DU cell resource configuration information received by the first communication node. Here, a fact that a collision exists between the first TDD DL-UL pattern information included in the intended TDD DL-UL configuration information and the first HSNA configuration information included in the gNB-DU cell resource configuration information means, for example, that the first TDD DL-UL pattern information explicitly indicates DL and/or UL for a specific resource, and at the same time, the first HSNA configuration information indicates the specific resource as a soft (S) resource or 'not available (NA)' resource (i.e., does not indicate the specific resource as a hard (H) resource).

In order for the first communication node to efficiently perform the CLI measurement and/or reporting operation, the following schemes may be applied to resolve the collision occurring between the first TDD DL-UL pattern information and the first HSNA configuration information configured for the first communication node and to determine a TDD DL-UL pattern.

Scheme #2-1: According to Scheme #2-1, an agreement may be made to exclude resources configured as S or NA resource (i.e., soft resources or not-available resources) based on the first HSNA configuration information included in the gNB-DU cell resource configuration information from targets of the CLI measurement, CLI reporting, and/or CLI mitigation procedures regardless of indication of the intended TDD DL-UL configuration information. In other words, an agreement may be made to perform the CLI measurement, CLI reporting and/or CLI mitigation procedures only on resources configured as H resources (i.e., hard resources) based on the first HSNA configuration information included in the gNB-DU cell resource configuration information. This is because the first HSNA configuration information included in the gNB-DU cell resource configuration includes information for IAB operations, and implementation complexity can be lowered by excluding the soft resources whose use for CLI measurement is dynamically indicated by an AI. In other words, when the first TDD DL-UL pattern information indicated by the intended TDD DL-UL configuration information contradicts the first HSNA configuration information indicated by the gNB-DU cell resource configuration information, the first communication node may consider that the priority of the first HSNA configuration information is higher than that of the first TDD DL-UL pattern information. Priorities of the first TDD DL-UL pattern information and the first HSNA configuration information may be defined or set as default values (in other words, basic values). Alternatively, the priorities of the first TDD DL-UL pattern information and the first HSNA configuration information may be separately defined, configured, and/or compared when it is determined that a collision exists between the first TDD DL-UL pattern information and the first HSNA configuration information. The operation of the first communication node based on Scheme #2-1 will be described in more detail with reference to FIG. 23.

Scheme #2-2: According to Scheme #2-2, the first communication node may operate to use resources for CLI measurement, CLI reporting, and/or CLI mitigation procedures only when receiving an AI allowing use of the resources configured as S resources (i.e., soft resources) based on the first HSNA configuration information included in the gNB-DU cell resource configuration information. As described above, by enabling CLI-related procedures (i.e., CLI measurement, CLI reporting, and/or CLI mitigation procedures, etc.) to be performed even in soft resources, the efficiency and accuracy of the CLI-related procedures may be improved. The operation of the first communication node based on Scheme #2-2 will be described in more detail with reference to FIG. 24.

Scheme #2-3: According to Scheme #2-3, the first communication node may regard resources configured as UL resources based on the intended TDD DL-UL configuration information as H resources regardless of indication of the gNB-DU cell resource configuration information. Through this, the number of resources on which the CLI measurement and/or reporting is performed may be maximized, and the accuracy of the CLI measurement and/or reporting procedure may be improved. The operation of the first communication node based on Scheme #2-3 will be described in more detail with reference to FIG. 25.

The configurations of the first and second exemplary embodiments of the communication system need not to be mutually exclusive. At least some of the configurations of the first and second exemplary embodiments of the communication system may be combined with each other. The communication system or communication node may support at least one of Schemes #1-1 to #1-4 described with reference to the first exemplary embodiment and Schemes #2-1 to #2-3 described with reference to the second exemplary embodiment, and which one of Schemes #1-1 to #1-4 and Schemes #2-1 to #2-3 is to be applied may be determined according to the type or capability of each communication node, communication situation, or higher layer configuration. At least some of the configurations of the first and second exemplary embodiments of the communication system may be applied complementary to each other. For example, in resolving the collision between TDD DL-UL patterns according to the first exemplary embodiment of the communication system, the HSNA configuration information processing method according to the second exemplary embodiment of the communication system may be additionally considered.

Figure 23:
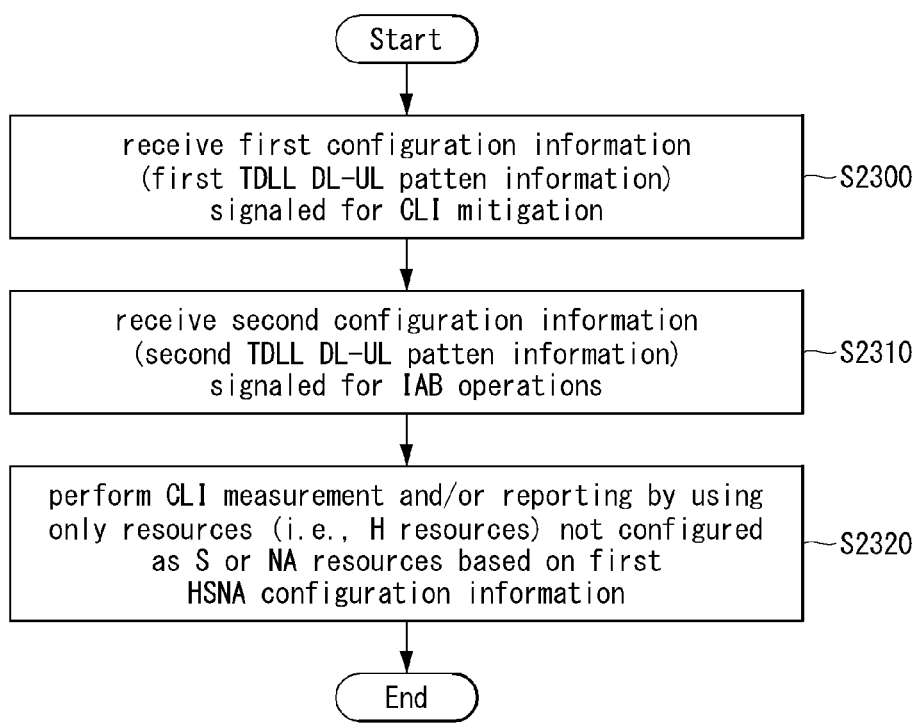
FIG. 23 is a flowchart for describing a fourth exemplary embodiment of an operation method of a first communication node supporting simultaneous DU/MT operations in a communication system.

FIG. 23 is a flowchart for describing a fourth exemplary embodiment of an operation method of a first communication node supporting simultaneous DU/MT operations in a communication system.

Referring to FIG. 23, a first communication node in the communication system may support a simultaneous DU/MT operation mode. The first communication node may correspond to an IAB node, gNB-DU, gNB-CU, or the like. The first communication node may operate based on Scheme #2-1 described with reference to the second exemplary embodiment of the communication system. Hereinafter, in describing the fourth exemplary embodiment of the method of the operating the first communication node with reference to FIG. 23, the contents overlapping with those described with reference to FIGS. 1 to 22 and the first and second exemplary embodiments of the communication system may be omitted.

The first communication node may receive first configuration information from a second communication node (S2300). Here, the first configuration information may correspond to intended TDD DL-UL configuration information signaled for delivering information related to CLI mitigation. The first configuration information may include or indicate first TDD DL-UL pattern information. The first communication node may receive second configuration information from the second communication node (S2310). Here, the second configuration information may correspond to gNB-DU cell resource configuration information signaled for IAB operations. The second configuration information may include or indicate first HSNA configuration information.

The first communication node may perform operations such as radio signal transmission/reception, CLI measurement, and CLI reporting based on the first configuration information received in the step S2300 and the second configuration information received in the step S2310. Here, the first communication node may identify whether a collision exists between the first TDD DL-UL pattern information indicated by the first configuration information and the first HSNA configuration information indicated by the second configuration information. When there is no collision between the first TDD DL-UL pattern information and the first HSNA configuration information, the first communication node may perform operations such as radio signal transmission/reception, CLI measurement, and CLI reporting based on the first TDD DL-UL pattern information and the first HSNA configuration information.

On the other hand, when a collision exists between the first TDD DL-UL pattern information indicated by the first configuration information and the first HSNA configuration information indicated by the second configuration information, the first communication node may consider that the first HSNA configuration information indicated by the second configuration information has a higher priority than the first TDD DL-UL pattern information indicated by the first configuration information.

For example, the first communication node may not use resources configured as S or NA resources (i.e., soft resources or not-available resources) configured based on the first HSNA configuration information for the CLI measurement and/or reporting, regardless of indication of the first HSNA configuration information. In other words, the first communication node may perform the CLI measurement and/or reporting only on resources (i.e., hard resources) configured as H resources based on the first HSNA configuration information (S2320).

Figure 24:
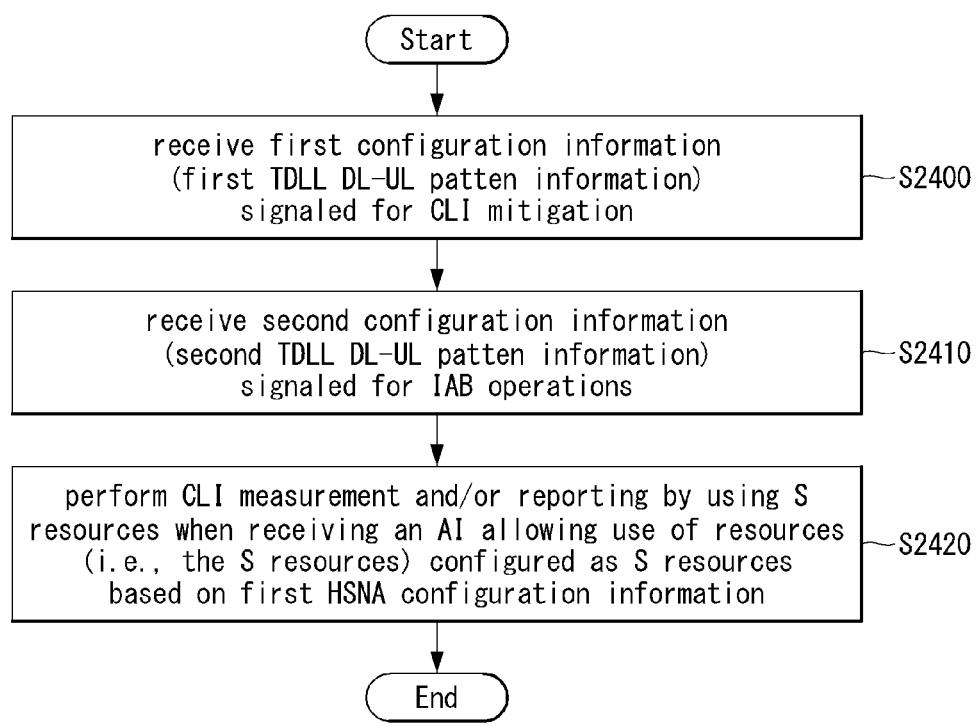
FIG. 24 is a flowchart for describing a fifth exemplary embodiment of an operation method of a first communication node supporting simultaneous DU/MT operations in a communication system.

FIG. 24 is a flowchart for describing a fifth exemplary embodiment of an operation method of a first communication node supporting simultaneous DU/MT operations in a communication system.

Referring to FIG. 24, a first communication node in the communication system may support a simultaneous DU/MT operation mode. The first communication node may correspond to an IAB node, gNB-DU, gNB-CU, or the like. The first communication node may operate based on Scheme #2-2 described with reference to the second exemplary embodiment of the communication system. Hereinafter, in describing the fifth exemplary embodiment of the method of the operating the first communication node with reference to FIG. 24, the contents overlapping with those described with reference to FIGS. 1 to 23 and the first and second exemplary embodiments of the communication system may be omitted.

The first communication node may receive first configuration information from a second communication node (S2400). Here, the first configuration information may correspond to intended TDD DL-UL configuration information signaled for delivering information related to CLI mitigation. The first configuration information may include or indicate first TDD DL-UL pattern information. The first communication node may receive second configuration information from the second communication node (S2410). Here, the second configuration information may correspond to gNB-DU cell resource configuration information signaled for IAB operations. The second configuration information may include or indicate first HSNA configuration information.

The first communication node may perform operations such as radio signal transmission/reception, CLI measurement, and CLI reporting based on the first configuration information received in the step S2400 and the second configuration information received in the step S2410. Here, when receiving an AI allowing use of resources configured as S resources (i.e., soft resources) based on the first TDD DL-UL pattern information and the first HSNA configuration information, the first communication node may use the resources for the CLI measurement and/or reporting (S2420). On the other hand, when the AI allowing use of resources configured as S resources (i.e., soft resources) based on the first HSNA configuration information is not received, the first communication node may not use the resources for the CLI measurement and/or reporting. Meanwhile, the first communication node may perform DL or UL configuration based on the first TDD DL-UL pattern information regardless of whether an AI is received for resources configured as H resources (i.e., hard resources) based on the first HSNA configuration information.

Figure 25:
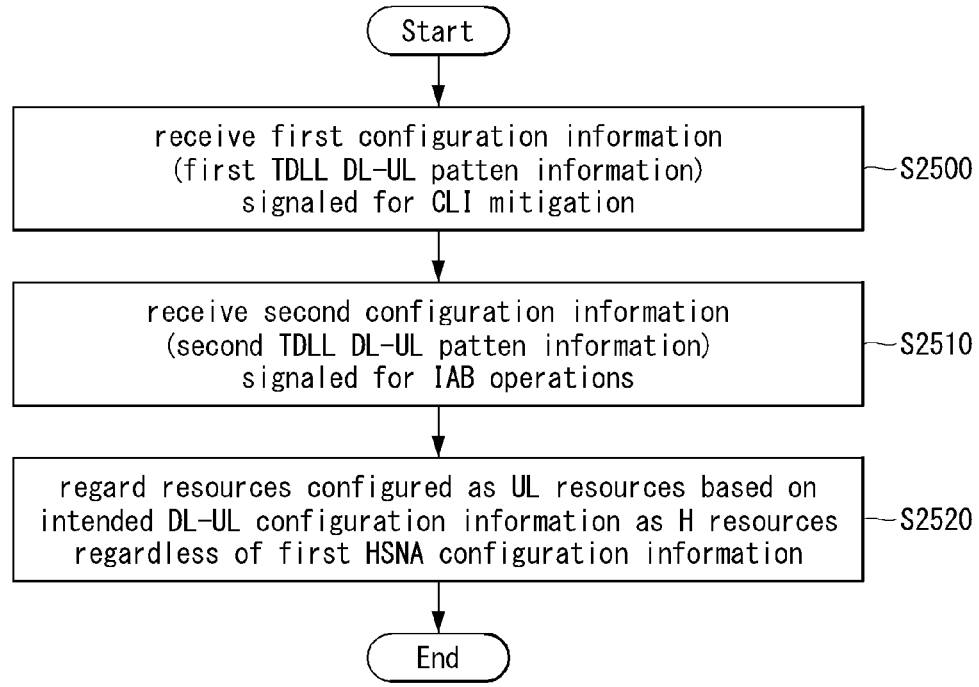
FIG. 25 is a flowchart for describing a sixth exemplary embodiment of an operation method of a first communication node supporting simultaneous DU/MT operations in a communication system.

FIG. 25 is a flowchart for describing a sixth exemplary embodiment of an operation method of a first communication node supporting simultaneous DU/MT operations in a communication system.

Referring to FIG. 25, a first communication node in the communication system may support a simultaneous DU/MT operation mode. The first communication node may correspond to an IAB node, gNB-DU, gNB-CU, or the like. The first communication node may operate based on Scheme #2-3 described with reference to the second exemplary embodiment of the communication system. Hereinafter, in describing the sixth exemplary embodiment of the method of the operating the first communication node with reference to FIG. 25, the contents overlapping with those described with reference to FIGS. 1 to 24 and the first and second exemplary embodiments of the communication system may be omitted.

The first communication node may receive first configuration information from a second communication node (S2500). Here, the first configuration information may correspond to intended TDD DL-UL configuration information signaled for delivering information related to CLI mitigation. The first configuration information may include or indicate first TDD DL-UL pattern information. The first communication node may receive second configuration information from the second communication node (S2510). Here, the second configuration information may correspond to gNB-DU cell resource configuration information signaled for IAB operations. The second configuration information may include or indicate first HSNA configuration information.

The first communication node may perform operations such as radio signal transmission/reception, CLI measurement, and CLI reporting based on the first configuration information received in the step S2500 and the second configuration information received in the step S2510. Here, when a collision exists between the first TDD DL-UL pattern information indicated by the first configuration information and the first HSNA configuration information indicated by the second configuration information, the first communication node may consider that the first TDD DL- UL pattern information indicated by the first configuration information has a higher priority than the first HSNA configuration information indicated by the second configuration information. For example, the first communication node may consider that resources configured as UL resources based on the first TDD DL-UL pattern information are hard resources regardless of indication of the first HSNA configuration information (S2520).

Third Exemplary Embodiment of Communication System

The third exemplary embodiment of the communication system proposes configurations regarding report and/or indication (hereinafter, report/indication) to facilitate adaptation between one or more multiplexing operation modes.

An exemplary embodiment of the communication system may support dynamic report/indication regarding information of condition and/or parameter (hereinafter, condition/parameter) to facilitate adaptation between one or more multiplexing operation modes. On the other hand, an exemplary embodiment of the communication system may support semi-static report/indication regarding information of condition/parameter to facilitate adaptation between one or more multiplexing operation modes.

In an exemplary embodiment of the communication system, at least a portion of following specific configurations may be required for dynamic report/indication regarding information of condition/parameter to facilitate adaptation between one or more multiplexing operation modes.

Channel(s) and/or signal(s) conveying the dynamic report/indication.

Contents of the dynamic report/indication.

Regarding the channel(s) and/or signal(s) conveying the dynamic report/indication, for example, at least a portion of following two options may be considered as candidates.

L2 (MAC layer) based report/indication (such as MAC CE)

L1 (PHY layer) based report/indication (such as PUCCH)

When a condition/parameter needs to be dynamically changed at the millisecond (ms) level, an L1-based report/instruction may be applied. On the other hand, when the condition/parameter does not need to be dynamically changed at the millisecond (ms) level, the L2-based report/instruction may be applied. When L2-based signaling with a periodicity of several tens of ms or more is used, the dynamic report/indication regarding information of condition/parameter to facilitate adaptation between one or more multiplexing operation modes may include at least a portion of following detailed information.

Supported multiplexing mode (for example, FDM and/or SDM).

Required timing mode.

Required DL/UL power control support.

Information on the "non-preferred" beam.

Required number of guard symbols for switching of multiplexing mode.

Required guard band for FDM

On the other hand, an exemplary embodiment of the communication system may support semi-static report/indication regarding information of condition/parameter to facilitate adaptation between one or more multiplexing operation modes. In an upper node perspective, at least a portion of following features may be required.

Management of report/indication periodicity or timing: Detailed design of signaling to make the communication system support both dynamic report/indication and semi-static report/indication regarding information of condition/parameter to facilitate adaptation between one or more multiplexing operation modes may be required. For example, a higher layer signaling for configuration of periodicity or timing of report/indication regarding information of condition/parameter to facilitate adaptation between one or more multiplexing operation modes may be required. On the other hand, a higher layer signaling for configuration of minimum of the periodicity of report/indication regarding information of condition/parameter to facilitate adaptation between one or more multiplexing operation modes may be required.

Recommendations on the conditions/parameters from upper node perspectives: Considering the implementation flexibility of upper node (for example, parent node), it may be inefficient for a report/indication regarding information of condition/parameter to facilitate adaptation between one or more multiplexing operation modes to include all the above-mentioned detailed information. For example, upper node may utilize (or implement or support) only a part of the above-mentioned detailed information. Here, a upper layer signaling may be utilized to indicate information on range of detailed information which is to be utilized by the upper node.

In the third exemplary embodiment of the communication system, at least one of following two schemes may be applied.

Scheme #3-1: a dynamic report/indication or a semi-static report/indication regarding information of condition/parameter to facilitate adaptation between one or more multiplexing operation modes may include at least a portion of following detailed information.

1) Supported multiplexing mode (for example, FDM and/or SDM).

2) Required timing mode.

3) Required DL/UL power control support.

4) Information on the "non-preferred" beam.

5) Required number of guard symbols for switching of multiplexing mode.

6) Required guard band for FDM

Scheme #3-2: For an efficient operation of report/indication regarding conditions/parameters (for example, L2-based condition/parameter) to facilitate adaptation between one or more multiplex operation modes, higher layer parameters (or higher layer signaling) may be used. Such higher layer parameters may indicate at least a portion of following information.

Information on periodicity or timing of report/indication regarding information of condition/parameter to facilitate adaptation between one or more multiplexing operation modes Information on detailed information which is to be utilized or implemented by a upper node among all available (or candidate) detailed information (for example, above mentioned detailed information 1) to 6) included in report/indication according to Scheme #3-1).

Figure 26:
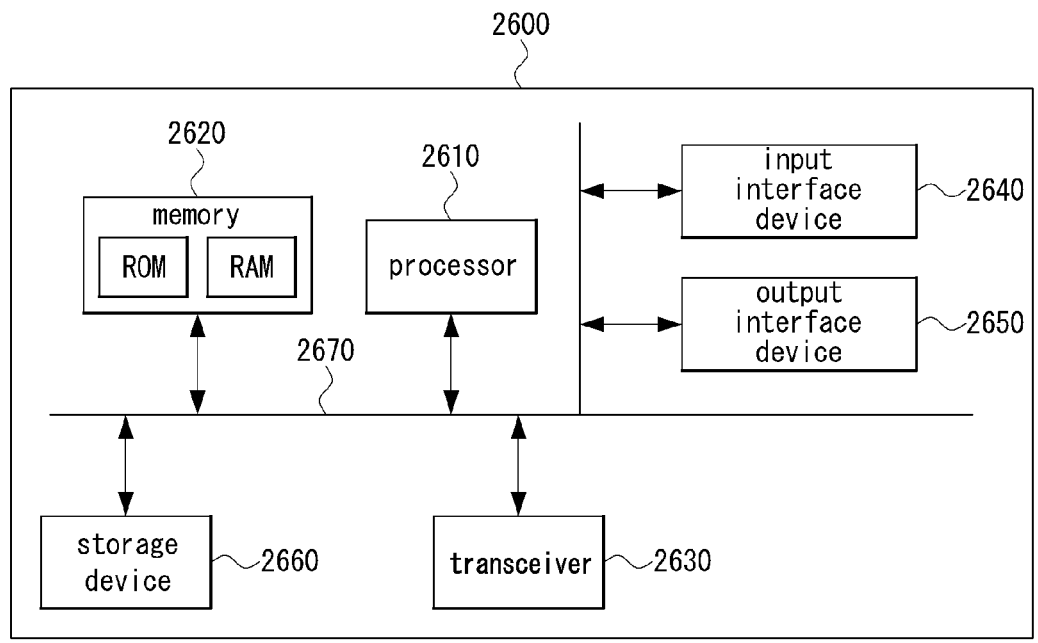
FIG. 26 is a block diagram illustrating an exemplary embodiment of a communication node constituting a communication system.

FIG. 26 is a block diagram illustrating an exemplary embodiment of a communication node constituting a communication system.

Referring to FIG. 26, a communication node 2600 may comprise at least one processor 2610, a memory 2620, and a transceiver 2630 connected to the network for performing communications. Also, the communication node 2600 may further comprise an input interface device 2640, an output interface device 2650, a storage device 2660, and the like. The respective components included in the communication node 2600 may communicate with each other as connected through a bus 2670.

However, each component included in the communication node 2600 may be connected to the processor 2610 via an individual interface or a separate bus, rather than the common bus 2670. For example, the processor 2610 may be connected to at least one of the memory 2620, the transceiver 2630, the input interface device 2640, the output interface device 2650, and the storage device 2660 via a dedicated interface.

The processor 2610 may execute instructions stored in at least one of the memory 2620 and the storage device 2660. The processor 2610 may refer to a central processing unit (CPU), a graphics processing unit (GPU), or a dedicated processor on which methods in accordance with embodiments of the present disclosure are performed. Each of the memory 2620 and the storage device 2660 may be constituted by at least one of a volatile storage medium and a non-volatile storage medium. For example, the memory 2620 may comprise at least one of read-only memory (ROM) and random access memory (RAM).

The communication node 2600 may correspond to any one of communication nodes constituting the exemplary embodiments of the communication system described with reference to FIGS. 1 to 25. In an exemplary embodiment of the communication system, the communication node 2600 may correspond to an IAB node. Alternatively, on the other hand, in an exemplary embodiment of the communication system, the communication node 2600 may correspond to an IAB-DU or IAB-MT constituting the IAB node. The communication node 2600 may correspond to a gNB-CU or gNB-DU. The communication node 2600 may perform the same or similar operations to the operations of the IAB node, IAB-MT, IAB-DU, upper node of the IAB node, lower node of the IAB node, gNB-CU, and gNB-DU described with reference to at least one of FIGS. 13 to 25.

The processor 2610 of the communication node 2600 may perform operations for communications with other communication node such as an upper node or lower node. The processor 2610 of the communication node 2600 may cause the communication node 2600 to perform communications based on the operations of the first communication node or the second communication node described with reference to the first to sixth exemplary embodiments of the operation method of the first communication node.

Although the first and second embodiments of the communication system have been described focusing on configurations related to the IAB node, this is merely an example for convenience of description and the exemplary embodiments of the interference management method and apparatus are not limited thereto. For example, the first and second exemplary embodiments of the communication system are also provided for wireless communication between wireless communication devices that are not IAB nodes (e.g., wireless communication between a base station (gNB) and a terminal operating in simultaneous transmission/reception or full-duplex mode). In this case, the terminal may correspond to the IAB node or the IAB-MT of the IAB node, and the base station may correspond to the upper node or the IAB-DU of the upper node.

In the present disclosure, the configurations described with reference to at least one of FIGS. 1 to 26 may be implemented by a predetermined apparatus. For example, the communication node 2600 described with reference to FIG. 26 may be referred to as a device (e.g., first device, second device, etc.). The operations of the communication nodes described with reference to FIGS. 13 to 26 may be performed by the first device, the second device, or the like. When the first device corresponds to the IAB node, the first device may be configured with a first transceiver and a second transceiver. Here, the first transceiver and the second transceiver may correspond to the IAB-MT and the IAB-DU, respectively.

According to the exemplary embodiments of the interference management method and apparatus in the communication system, when a collision occurs between configurations indicated by intended TDD DL-UL configuration information signaled for CLI mitigation and gNB-DU cell resource configuration information signaled for IAB operations, a communication node operating in a simultaneous DU/MT operation mode may apply a predetermined priority or change an interpretation scheme for some of the configurations. Accordingly, the collision between the signaling for CLI mitigation and the signaling for IAB operations can be efficiently resolved without a separate signaling burden, and interference management performance based on CLI measurement and/or reporting can be improved.

However, the effects that can be achieved by the exemplary embodiments of the interference management method and apparatus in the communication system are not limited to those mentioned above, and other effects not mentioned may be clearly understood by those of ordinary skill in the art to which the present disclosure belongs from the configurations described in the present disclosure.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the exemplary embodiments of the present disclosure and their advantages have been described in detail, it should be understood that various changes, substitutions and alterations may be made herein without departing from the scope of the present disclosure.

What is claimed is:

1. An operation method of a first device, comprising:
  receiving, from a second device, first configuration information signaled for cross link interference (CLI)-related procedures;
  receiving, from the second device, second configuration information signaled for operating a multiplexing operation of the first device;
  in response to recognizing, with respect to a first resource, a collision between first downlink (DL)-uplink (UL) configuration information indicated by the first configuration information and second DL-UL configuration information indicated by the second configuration information, comparing priorities of the first DL-UL configuration information and the second DL-UL configuration information; and determining a DL-UL configuration applied to the first resource based on the compared priorities.

2. The operation method according to claim 1, wherein the comparing of the priorities comprises determining that the priority of the second DL-UL configuration information is higher than the priority of the first DL-UL configuration information, wherein the DL-UL configuration applied to the first resource is determined based on the second DU-UL configuration information.

3. The operation method according to claim 2, wherein the determining of the DL-UL configuration applied to the first resource comprises changing interpretation of the first DL-UL configuration information based on the second DL-UL configuration information.

4. The operation method according to claim 2, wherein the determining of the DL-UL configuration applied to the first resource comprises, when the second DL-UL configuration information indicates an uplink-flexible-downlink (UFD) pattern for the first resource, changing the interpretation of the first DL-UL configuration information to indicate that UL symbol(s) are positioned in a staring part of the first resource and DL symbol(s) are positioned in an ending part of the first resource.

5. The operation method according to claim 1, wherein the comparing of the priorities comprises determining that the priority of the first DL-UL configuration information is higher than the priority of the second DL-UL configuration information.

6. The operation method according to claim 1, wherein the first configuration information is intended DL-UL configuration information, and the second configuration information is gNodeB (gNB)-distributed unit (DU) cell resource configuration information.

7. An operation method of a first device, comprising:
receiving, from a second device, first configuration information signaled for cross link interference (CLI)-related procedures;
receiving, from the second device, second configuration information signaled for operating a multiplexing operation of the first device;
in response to recognizing, with respect to a first resource, a collision between first downlink (DL)-uplink (UL) configuration information indicated by the first configuration information and first 'hard, soft, not-available (HSNA)' configuration information indicated by the second configuration information, comparing priorities of the first DL-UL configuration information and the first HSNA configuration information; and
performing configuration for the first resource based on the compared priorities.

8. The operation method according to claim 7, wherein the comparing of the priorities comprises determining that the priority of the first HSNA configuration information is higher than the priority of the first DL-UL configuration information, wherein the configuration for the first resource is performed at least based on the first HSNA configuration information.

9. The operation method according to claim 8, wherein the performing of the configuration for the first resource comprises, when the first resource is configured as a hard resource based on the first HSNA configuration information, determining to perform the CLI-related procedures based on the first resource.

10. The operation method according to claim 8, wherein the performing of the configuration for the first resource comprises, when the first resource is configured as a soft resource or a not-available resource based on the first HSNA configuration information, determining not to perform the CLI-related procedures based on the first resource.

11. The operation method according to claim 8, wherein the performing of the configuration for the first resource comprises:
when the first resource is configured as a soft resource based on the first HSNA configuration information, identifying whether an availability indicator (AI) for allowing use of the first resource is received; and
in response to identifying that the AI for allowing use of the first resource is received, determining to perform the CLI-related procedures based on the first resource.

12. The operation method according to claim 7, wherein the comparing of the priorities comprises determining that the priority of the first DL-UL configuration information is higher than the priority of the first HSNA configuration information.

13. The operation method according to claim 12, wherein the performing of the configuration for the first resource comprises, when the first resource is configured as a UL resource based on the first DL-UL configuration information, determining that the first resource is a hard resource regardless of the first HSNA configuration information.

14. A first device comprising:
a processor;
a memory electronically communicating with the processor; and
instructions stored in the memory,
wherein when executed by the processor, the instructions cause the first device to:
receive, from a second device, first configuration information signaled for cross link interference (CLI)-related procedures;
receive, from the second device, second configuration information signaled for operating a multiplexing operation of the first device;
in response to recognizing, with respect to a first resource, a collision between first downlink (DL)-uplink (UL) configuration information indicated by the first configuration information and second DL-UL configuration information indicated by the second configuration information, compare priorities of the first DL-UL configuration information and the second DL-UL configuration information; and
determine a DL-UL configuration applied to the first resource based on the compared priorities.

15. The first device according to claim 14, wherein in the comparing of the priorities, the instructions further cause the first device to determine that the priority of the second DL-UL configuration information is higher than the priority of the first DL-UL configuration information, wherein the DL-UL configuration applied to the first resource is determined based on the second DU-UL configuration information.

16. The first device according to claim 15, wherein in the determining of the DL-UL configuration applied to the first resource, the instructions further cause the first device to change interpretation of the first DL-UL configuration information based on the second DL-UL configuration information.

17. The first device according to claim 15, wherein in the determining of the DL-UL configuration applied to the first resource, the instructions further cause the first device to, when the second DL-UL configuration information indicates an uplink-flexible-downlink (UFD) pattern for the first resource, change the interpretation of the first DL-UL configuration information to indicate that UL symbol(s) are positioned in a staring part of the first resource and DL symbol(s) are positioned in an ending part of the first resource.

18. The first device according to claim 14, wherein in the comparing of the priorities, the instructions further cause the first device to determine that the priority of the first DL-UL configuration information is higher than the priority of the second DL-UL configuration information.

* * * * *